(12) United States Patent
Miyamoto et al.

(10) Patent No.: US 10,945,160 B2
(45) Date of Patent: Mar. 9, 2021

(54) MANAGEMENT DEVICE, COMMUNICATION TERMINAL, AND METHOD FOR COMMUNICATION TERMINAL

(71) Applicant: KDDI CORPORATION, Tokyo (JP)

(72) Inventors: Atsushi Miyamoto, Tokyo (JP); Takashi Saitou, Tokyo (JP); Masato Andou, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/329,526

(22) PCT Filed: Sep. 25, 2017

(86) PCT No.: PCT/JP2017/034432
§ 371 (c)(1),
(2) Date: Feb. 28, 2019

(87) PCT Pub. No.: WO2018/062065
PCT Pub. Date: Apr. 5, 2018

(65) Prior Publication Data
US 2019/0261223 A1    Aug. 22, 2019

(30) Foreign Application Priority Data

Sep. 30, 2016 (JP) .............................. JP2016-193578
Sep. 30, 2016 (JP) .............................. JP2016-193579
(Continued)

(51) Int. Cl.
*H04W 28/14* (2009.01)
*H04L 7/00* (2006.01)
(Continued)

(52) U.S. Cl.
CPC ............ *H04W 28/14* (2013.01); *H04L 7/0037* (2013.01); *H04Q 9/00* (2013.01); *H04W 88/06* (2013.01); *H04Q 2209/43* (2013.01)

(58) Field of Classification Search
CPC ........ H04W 28/14; H04W 88/06; H04Q 9/00; H04Q 2209/43; H04L 7/0037
See application file for complete search history.

(56) References Cited

U.S. PATENT DOCUMENTS

2007/0099614 A1*  5/2007  Parekh .............. H04W 36/0083
                                                                455/436
2007/0116024 A1*  5/2007  Zhang ..................... H04L 47/56
                                                                370/412

(Continued)

FOREIGN PATENT DOCUMENTS

EP       2667576 A1    11/2013
EP       2991364 A1     3/2016
(Continued)

OTHER PUBLICATIONS

U.S. Appl. No. 16/328,567 to Atsushi Miyamoto et al., filed Feb. 26, 2019.
(Continued)

*Primary Examiner* — Walli Z Butt
(74) *Attorney, Agent, or Firm* — Greenblum & Bernstein, P.L.C.

(57) ABSTRACT

The present invention provides a data management apparatus for managing a plurality of data items output by a plurality of communication devices that output data. The data management apparatus includes a storage section configured to store device identification information of each of the plurality of communication devices in association with charge identification information including either contractor identification information of a contractor of a contract for using a relay apparatus that is configured to transfer the
(Continued)

plurality of data items to the data management apparatus or acquirer identification information of a data acquirer who acquires the data from the data management apparatus, and a charge amount determination section configured to determine a charge amount for each item of the charge identification information on the basis of data communication traffic volumes corresponding to data output from the communication devices of one or more device identification information items stored in association with the charge identification information.

19 Claims, 30 Drawing Sheets

(30) Foreign Application Priority Data

Sep. 30, 2016 (JP) .............................. JP2016-193580
Sep. 30, 2016 (JP) .............................. JP2016-193581
Sep. 30, 2016 (JP) .............................. JP2016-193582
Sep. 30, 2016 (JP) .............................. JP2016-193583

(51) Int. Cl.
*H04Q 9/00* (2006.01)
*H04W 88/06* (2009.01)

(56) References Cited

U.S. PATENT DOCUMENTS

| 2012/0185560 | A1* | 7/2012 | Mera ...................... H04L 43/08 709/217 |
| 2014/0106727 | A1 | 4/2014 | Velusamy et al. |
| 2014/0114614 | A1 | 4/2014 | Ito et al. |
| 2017/0041897 | A1* | 2/2017 | Pitigoi-Aron ............. G06F 1/14 |
| 2017/0214620 | A1* | 7/2017 | Haleem ............... H04L 45/7453 |

FOREIGN PATENT DOCUMENTS

| JP | 2000-196678 A | 7/2000 |
|---|---|---|
| JP | 2008-054127 A | 3/2008 |
| JP | 2009-124294 A | 6/2009 |
| JP | 2012-221206 A | 11/2012 |
| JP | 2013-543289 A | 11/2013 |
| JP | 2013-544545 A | 12/2013 |
| JP | 2014-068285 A | 4/2014 |
| JP | 2014-082694 A | 5/2014 |
| JP | 2014-120811 A | 6/2014 |
| JP | 2015-050634 A | 3/2015 |
| JP | 2015-093123 A | 5/2015 |
| JP | 2015-126349 A | 7/2015 |
| JP | 2015-159979 A | 9/2015 |
| JP | 2015-201698 A | 11/2015 |
| JP | 2016-001425 A | 1/2016 |
| JP | 2016-032258 A | 3/2016 |
| WO | 2009/112937 A1 | 9/2009 |
| WO | 2012/022966 A1 | 2/2012 |
| WO | 2012/042437 A2 | 4/2012 |
| WO | 2013/014847 A1 | 1/2013 |
| WO | 2013/103010 A1 | 7/2013 |
| WO | 2013-152659 A | 8/2013 |
| WO | 2015/137412 A1 | 9/2015 |
| WO | 2015/199805 A1 | 12/2015 |

OTHER PUBLICATIONS

International Search Report issued in International Bureau of WIPO Patent Application No. PCT/JP217/034432, dated Dec. 12, 2017, along with an English translation thereof.
Notice of Reasons for Rejection issued in Japanese family member Patent Appl. No. 2016-193583, dated Jun. 19, 2018, along with an English translation thereof.
Notice of Reasons for Rejection issued in Japanese family member Patent Appl. No. 2016-193578, dated Jun. 19, 2018, along with an English translation thereof.
Notice of Reasons for Rejection issued in Japanese Patent Application No. 2016-193580, dated Jun. 19, 2018, along with an English translation thereof.
Notice of Reasons for Rejection issued in Japanese Patent Application No. 2016-193581, dated Jun. 19, 2018, along with an English translation thereof.
Search Report issued in European Patent Office (EPO) Patent Application No. 17856018.1, dated May 4, 2020.

* cited by examiner

FIG. 5

| BASE STATION ID | NUMBER OF ACCOMMODATED TERMINALS | COMMUNICATION TERMINAL ID |
|---|---|---|
| K001 | 250 | 9001, 9003, 9004, 9010, ... |
| K002 | 100 | 9011, 9005, 9031, 9022, ... |
| K003 | 400 | 9041, 9050, 9061, 9066, ... |
| K004 | 320 | 9007, 9010, 9021, 9025, ... |
| ... | ... | ... |

FIG. 6

| COMMUNICATION TERMINAL ID | DEVICE ID | APPLICATION ID | AMOUNT OF TRANSMISSION DATA |
|---|---|---|---|
| 9001 | 1001 | a51 | 10 |
| | 1001 | a52 | 20 |
| | 1002 | a51 | 10 |
| | 1002 | a53 | 45 |
| 9002 | 1001 | a55 | 25 |
| | 2002 | a55 | 25 |
| | 2005 | a55 | 25 |
| 9003 | 1001 | a51 | 50 |
| | 1001 | a52 | 20 |
| | 1001 | a53 | 45 |
| | 3001 | a54 | 15 |
| | 3002 | a54 | 15 |
| 9004 | 4003 | a52 | 35 |
| ... | ... | ... | ... |

FIG. 7

| COMMUNICATION TERMINAL ID | SCHEDULED TRANSMISSION CLOCK TIME | AMOUNT OF TRANSMISSION DATA |
|---|---|---|
| 9001 | 0:00 | 10 |
| | 1:00 | 20 |
| | 2:00 | 10 |
| | ... | ... |
| 9002 | 0:00 | 25 |
| | 2:00 | 25 |
| | 4:00 | 25 |
| | ... | ... |
| 9003 | 0:00 | 50 |
| | 6:00 | 20 |
| | 12:00 | 45 |
| | ... | ... |
| ... | ... | ... |

FIG. 16

| BASE STATION ID | COMMUNICATION TERMINAL ID | RRC IDLE TRANSITION CLOCK TIME | RRC IDLE CONTINUATION TIME (SEC) |
|---|---|---|---|
| K001 | 9001 | 2016/9/25 10:15:00 | 10 |
| | 9003 | 2016/9/25 13:20:25 | 10 |
| | 9004 | 2016/9/25 6:30:10 | 10 |
| | ... | ... | ... |
| K002 | 9005 | 2016/9/25 10:00:20 | 3 |
| | 9011 | 2016/9/25 11:23:44 | 3 |
| | ... | ... | ... |
| K003 | 9041 | 2016/9/25 8:20:30 | 6 |
| | 9050 | 2016/9/25 11:20:25 | 6 |
| | ... | ... | ... |
| ... | ... | ... | ... |

FIG. 17

| COMMUNICATION TERMINAL ID | DEVICE ID | APPLICATION ID | AMOUNT OF TRANSMISSION DATA |
|---|---|---|---|
| 9001 | 1001 | a51 | 10 |
| | | a52 | 20 |
| | 1002 | a51 | 10 |
| | | a53 | 45 |
| 9002 | 1001 | a55 | 25 |
| | 2002 | a55 | 25 |
| | 2005 | a55 | 25 |
| 9003 | 1001 | a51 | 50 |
| | | a52 | 20 |
| | | a53 | 45 |
| | 3001 | a54 | 400 |
| | 3002 | a54 | 400 |
| 9004 | 4003 | a52 | 200 |
| ... | ... | ... | ... |

FIG. 20

| DEVICE ID | INITIAL STATE/NON-INITIAL STATE |
|---|---|
| 1001 | 0 |
| 1002 | 1 |
| 1003 | 1 |
| 1004 | 0 |
| 1005 | 1 |
| 1006 | 0 |
| ... | ... |

| AMOUNT OF BUFFERING (NUMBER) | TRANSMISSION INTERVAL (SEC) | NUMBER OF TRANSMISSIONS/ HOUR | RADIO RESOURCE OCCUPANCY RATE (%) |
|---|---|---|---|
| 1 | 15 | 240.0 | 71.2 |
| 8 | 170 | 20.8 | 6 |
| 20 | 460 | 7.8 | 2.4 |
| 40 | 950 | 3.8 | 1.2 |
| 60 | 1400 | 2.5 | 0.8 |
| 80 | 2000 | 1.7 | 0.5 |
| 100 | 2700 | 1.3 | 0.4 |

| TRANSMISSION METHOD | TRANSMISSION INTERVAL (SEC) | NUMBER OF TRANSMISSIONS/ HOUR | RADIO RESOURCE OCCUPANCY RATE (%) |
|---|---|---|---|
| NORMAL | 15 | 240 | 71.2 |
| TRANSMISSION AT CHANGE TIME | 47 | 76 | 23.3 |

MANAGEMENT DEVICE, COMMUNICATION TERMINAL, AND METHOD FOR COMMUNICATION TERMINAL

TECHNICAL FIELD

The present invention relates to a communication terminal, a communication method, a program for communication, a communication system, a management device, a management method, and a communication control method.

Priority is claimed on Japanese Patent Application Nos. 2016-193578, 2016-193579, 2016-193580, 2016-193581, 2016-193582, and 2016-193583, filed Sep. 30, 2016, the contents of which are incorporated herein by reference.

BACKGROUND ART

Conventionally, systems for collecting data output by sensors installed in various places via a wireless communication circuit are known. In Patent Document 1, a data collection system capable of indicating a timing at which a sensor transmits data in a control unit is disclosed.

CITATION LIST

Patent Literature

[Patent Document 1]
Japanese Unexamined Patent Application, First Publication No. 2012-221206

SUMMARY OF INVENTION

Problem to be Solved by the Invention

For example, a data processing technique in which data is transmitted from a communication terminal collecting data output by a sensor to a server via a wireless communication circuit is known. However, if data processing is not performed at an appropriate timing, there is a problem in that the data processing may be affected by congestion in the wireless communication circuit.

Therefore, the present invention has been made in view of the above circumstances and an objective of the present invention is to provide a communication terminal, a communication method, a program for communication, a communication system, a management device, a management method, and a communication control method for minimizing congestion in a wireless communication circuit.

Means for Solving the Problem

According to a first aspect of the present invention, there is provided a communication terminal for transmitting device data output by a communication device via a wireless communication circuit, the communication terminal including: a device communication unit configured to receive the device data output by the communication device; and a communication control unit configured to transmit the device data received by the device communication unit to the wireless communication circuit at a timing based on a state of at least one of the communication terminal, the wireless communication circuit, the communication device, and the device data or information indicating a timing of transmission of the device data received from a management device that is configured to externally manage the communication terminal.

The communication terminal may further include a movement detection unit configured to detect whether or not the communication terminal is moving and the communication control unit may transmit the device data when a first time has elapsed from reception of device data transmitted by the communication device if the movement detection unit determines that the communication terminal is moving and execute a delay mode in which the device data is transmitted when a second time longer than the first time has elapsed from the reception of the device data or an erase mode in which the transmission of the device data is stopped if the movement detection unit determines that the communication terminal is stopped, on the basis of the state of the communication terminal.

The communication control unit may execute the delay mode when the device data has a first attribute and execute the erase mode when the device data has a second attribute different from the first attribute, if the movement detection unit determines that the communication terminal is stopped.

The communication control unit may execute the delay mode when the device data has the first attribute in which a transmission frequency is less than or equal to a prescribed threshold value and execute the erase mode when the device data has the second attribute in which the transmission frequency is greater than the prescribed threshold value if the movement detection unit determines that the communication terminal is stopped.

The communication control unit may execute the delay mode or the erase mode on condition that an instruction has been received from the management device that is configured to manage the communication terminal via the wireless communication circuit.

The communication control unit may determine whether or not to switch a process between when the movement detection unit is configured to determine that the communication terminal is moving and when the movement detection unit is configured to determine that the communication terminal is stopped, if a sector to which the communication terminal belongs has been switched in the wireless communication circuit.

The communication control unit may transmit position information including a current position and a moving direction of the communication terminal to the management device that is configured to manage a degree of congestion in the wireless communication circuit and determine whether to execute the delay mode or the erase mode on the basis of information indicating the degree of congestion in the wireless communication circuit received from the management device after the position information is transmitted, if the movement detection unit determines that the communication terminal is stopped.

The communication control unit may transmit position information including a current position and a moving direction of the communication terminal to the management device that is configured to manage a degree of congestion in the wireless communication circuit and transmit the device data at a timing indicated by timing information received from the management device after the position information is transmitted, if the movement detection unit determines that the communication terminal is stopped.

The communication control unit may transmit the position information including information for identifying a sector of the wireless communication circuit to which the communication terminal belongs to the management device and transmit the device data at the timing indicated by the timing information, received from the management device, for use after switching of the sector if the sector of the wireless communication circuit to which the communication terminal belongs has been switched.

The communication control unit may acquire a disconnection timing that is a timing at which a base station for providing the wireless communication circuit disconnects the wireless communication circuit on the basis of the state of the wireless communication circuit and transmit the device data via the wireless communication circuit at a timing other than the acquired disconnection timing.

The communication control unit may acquire the state of the communication device and transmit the device data received by the device communication unit to the wireless communication circuit with a priority according to the state on the basis of the acquired state.

The communication control unit may determine whether the communication device is in an initial state or a non-initial state on the basis of the device data received from the communication device and transmit the device data at a timing earlier than that when it is determined that the communication device is in the non-initial state when it is determined that the communication device is in the initial state.

The communication terminal may further include a storage unit configured to store a reception history indicating that the device communication unit has received prescribed data transmitted by the communication device in the initial state and the communication control unit may determine that the communication device is in the initial state if the reception history is not stored in the storage unit at a point in time at which the prescribed data has been received from the communication device.

The communication control unit may identify an application that transmitted the device data and determine that the communication device is in the initial state if the identified application is an application to be executed by the communication device in the initial state.

The communication control unit may transmit the device data, which is output by an application to be executed by the communication device in the initial state, with a priority higher than that of the device data output by an application to be executed by the communication device in the non-initial state.

The communication control unit may determine the priority on the basis of a combination of identification information of the communication device and identification information of the application outputting the device data.

The communication control unit may determine the priority on the basis of a time period during which the device data is transmitted.

The communication control unit may determine whether to transmit the device data with the priority according to the state of the communication device during each time period on the basis of a degree of congestion during each time period of the wireless communication circuit.

The communication control unit may sequentially transmit a plurality of pieces of device data at a random timing in a prescribed time range if the plurality of pieces of device data having the same priority have been received.

The communication control unit may determine the priority on the basis of a radio wave state of a frequency band for use in the wireless communication circuit until the device data is transmitted after reception of the device data.

The communication terminal may further include a storage unit configured to store the device data received by the device communication unit and the communication control unit may transmit the stored device data after the device data is stored in the storage unit until a prescribed amount set in association with at least either the communication device outputting the device data or an attribute of the device data has been reached on the basis of the state of the device data stored in the storage unit.

The communication control unit may transmit the stored device data after the device data is stored in the storage unit until a total amount of device data of a plurality of packets stored in the storage unit or the total number of packets including the device data stored in the storage unit reaches the prescribed amount.

The communication control unit may transmit the stored device data after the device data is stored in the storage unit until the prescribed amount set on the basis of a frequency at which the communication device outputs the device data has been reached.

The communication control unit may transmit the stored device data after the device data is stored in the storage unit until the prescribed amount set on the basis of an attribute of the device data has been reached.

The communication control unit may determine the prescribed amount on the basis of details of the device data received by the device communication unit.

The device communication unit may receive a plurality of pieces of device data from a plurality of communication devices and the communication control unit may transmit the plurality of pieces of device data before the device data is stored until the prescribed amount has been reached if device data having high-priority is included in the plurality of pieces of device data received within a prescribed period by the device communication unit.

The communication control unit may transmit the stored device data after the device data is stored in the storage unit until the prescribed amount determined for each of a plurality of applications executable by the communication device has been reached.

The communication control unit may also transmit the device data output by another application among the plurality of applications if the device data output by one application is stored in the storage unit until the prescribed amount corresponding to the one application among the plurality of applications has been reached.

The communication control unit may transmit the device data output by two or more applications preset among the plurality of applications if the device data output by the two or more applications is stored in the storage unit until the prescribed amount corresponding to each of the two or more applications has been reached.

The communication control unit may transmit the stored device data after the device data is stored in the storage unit until the prescribed amount corresponding to a transmission destination of the device data has been reached.

The communication control unit may transmit the stored device data after the device data is stored in the storage unit until the prescribed amount corresponding to a time period during which the device data has been received has been reached.

The communication terminal may further include a storage unit configured to store the device data received by the device communication unit in association with the communication device and the communication control unit may transmit, via the wireless communication circuit, latest device data received by the device communication unit if a difference between the latest device data and immediately previous device data, which is stored in the storage unit, associated with the same communication device as that of the latest device data is greater than a prescribed transmission determination threshold value on the basis of the state of the device data stored in the storage unit.

The communication control unit may transmit data for which the difference is less than or equal to the transmission determination threshold value stored in the storage unit before the device data is transmitted when transmitting the latest device data for which the difference is greater than the transmission determination threshold value.

The communication control unit may determine the transmission determination threshold value on the basis of at least any one of a time period, a day of the week, and a date. Also, the communication control unit may determine the transmission determination threshold value on the basis of a degree of congestion in the wireless communication circuit. The communication control unit may determine the transmission determination threshold value on the basis of a degree of congestion in a base station that is configured to provide the wireless communication circuit.

Also, the communication control unit may determine the transmission determination threshold value on the basis of a statistical value of a plurality of pieces of device data stored in association with the same communication device in the storage unit. Also, the communication control unit may determine the transmission determination threshold value on the basis of a state of the communication device indicated by the device data.

The storage unit may store the transmission determination threshold value in association with the communication device. Also, the storage unit may store the transmission determination threshold value in association with an application executable by the communication device.

The communication control unit may acquire, via the wireless communication circuit, the transmission determination threshold value transmitted from a device that is configured to acquire the device data. The communication control unit may receive a specified frequency at which the device data is transmitted via the wireless communication circuit and determine the transmission determination threshold value on the basis of the specified frequency.

According to a second aspect of the present invention, there is provided a communication method of transmitting device data output by a communication device to be executed by a computer provided in a communication terminal via a wireless communication circuit, the communication method including: receiving the device data output by the communication device; and transmitting the received device data to the wireless communication circuit at a timing based on a state of at least one of the communication terminal, the wireless communication circuit, the communication device, and the device data or information indicating a timing of transmission of the device data received from a management device that is configured to externally manage the communication terminal.

It may be further detected whether or not the communication terminal is moving, and the transmitting may include transmitting the device data when a first time has elapsed from reception of device data transmitted by the communication device if it is detected that the communication terminal is moving on the basis of the state of the communication terminal and executing a delay mode in which the device data is transmitted when a second time longer than the first time has elapsed from reception of the device data or an erase mode in which the transmission of the device data is stopped if it is detected that the communication terminal is stopped.

The state of the communication device may be further acquired and the transmitting may include transmitting the received device data to the wireless communication circuit with a priority according to the state on the basis of the acquired state.

The received device data may be further stored in the storage unit and the transmitting may include transmitting the stored device data after the device data is stored in the storage unit until a prescribed amount set in association with at least either the communication device outputting the device data or an attribute of the device data has been reached on the basis of the state of the device data stored in the storage unit.

The device data received from the device communication unit may be further stored in the storage unit in association with the communication device and the transmitting may include transmitting, via the wireless communication circuit, latest device data received from the communication device if a difference between the latest device data and immediately previous device data, that is stored in the storage unit, associated with the same communication device as that of the latest device data is greater than a prescribed transmission determination threshold value on the basis of the state of the device data stored in the storage unit.

According to a third aspect of the present invention, there is provided a program for communication for causing a computer provided in a communication terminal to execute a process of: receiving device data output by a communication device connected with the communication terminal via a wireless communication circuit; and transmitting the received device data to the wireless communication circuit at a timing based on a state of at least one of the communication terminal, the wireless communication circuit, the communication device, and the device data or information indicating a timing of transmission of the device data received from a management device that is configured to externally manage the communication terminal.

The state of the communication device may be further acquired and the transmitting may include transmitting the received device data to the wireless communication circuit with a priority according to the state on the basis of the acquired state.

The received device data may be further stored in the storage unit and the transmitting may include transmitting the stored device data after the device data is stored in a storage unit until a prescribed amount set in association with at least either the communication device outputting the device data or an attribute of the device data has been reached, on the basis of the state of the device data stored in the storage unit.

The device data received from the communication device may be further stored in the storage unit in association with the communication device, and the transmitting may include transmitting, via the wireless communication circuit, latest device data received from the device communication device if a difference between the latest device data and immediately previous device data, which is stored in the storage unit, associated with the same communication device as that of the latest device data is greater than a prescribed transmission determination threshold value on the basis of the state of the device data stored in the storage unit.

According to a fourth aspect of the present invention, there is provided a communication system including: a communication terminal configured to transmit device data output by a communication device via a wireless communication circuit; and a management device configured to receive the device data transmitted by the communication terminal, wherein the communication terminal includes a device communication unit configured to receive the device data output by the communication device; and a communication control unit configured to transmit the device data received by the device communication unit to the wireless communication circuit at a timing based on a state of at least one of the communication terminal, the wireless communication circuit, the communication device, and the device data, and wherein the management device includes a transmission unit configured to acquire information related to the communication terminal and provide the acquired information to the communication terminal.

The communication terminal may further include a terminal transmission unit configured to transmit position information indicating a position of the communication terminal to the management device; and a movement detection unit configured to detect whether or not the communication terminal is moving, and the communication control unit may transmit the device data when a first time has elapsed from reception of device data transmitted by the communication device if the movement detection unit determines that the communication terminal is moving and execute a delay mode in which the device data is transmitted when a second time longer than the first time has elapsed from the reception of the device data or an erase mode in which the transmission of the device data is stopped if the movement detection unit determines that the communication terminal is stopped, on the basis of the state of the communication terminal, the management device may further include an information reception unit configured to receive the position information from the communication terminal; an acquisition unit configured to acquire a degree of congestion in the wireless communication circuit on the basis of the position information; and a determination unit configured to determine the first time and the second time on the basis of the degree of congestion acquired by the acquisition unit, and the transmission unit may transmit the information including the first time and the second time to the communication terminal.

The communication terminal may further include a storage unit configured to store the device data received by the device communication unit in association with the communication device, the communication control unit may transmit, via the wireless communication circuit, latest device data received by the device communication unit if a difference between the latest device data and immediately previous device data, which is stored in the storage unit, associated with the same communication device as that of the latest device data is greater than a prescribed transmission determination threshold value, and the transmission unit may determine the transmission determination threshold value used by the communication terminal and provides the information including the determined transmission determination threshold value to the communication terminal.

According to a fifth aspect of the present invention, there is provided a management device for managing a timing at which a communication terminal, which transmits device data output by a communication device to a base station via a wireless communication circuit, transmits the device data, the management device including: an acquisition unit configured to acquire a timing related to communication of the device data; and a communication control unit configured to transmit timing information indicating the timing to the communication terminal.

The acquisition unit may acquire the timing at which each of a plurality of communication terminals is configured to transmit a plurality of pieces of device data and the communication control unit may transmit the timing information indicating the timing acquired by the acquisition unit to the plurality of communication terminals.

For example, the acquisition unit may acquire the timing on the basis of a number of communication terminals within a sector of the same base station that is configured to provide the wireless communication circuit. The acquisition unit may acquire the timing on the basis of a number of communication devices with which the plurality of communication terminals within a sector of the same base station that is configured to provide the wireless communication circuit communicate.

Also, the acquisition unit may acquire the timing on the basis of a priority of an application outputting data to be transmitted, via the wireless communication circuit, by the communication device with which the communication terminal communicates.

The acquisition unit may acquire a scheduled transmission clock time at which each of the plurality of communication terminals is scheduled to transmit data and acquire the timing on the basis of the scheduled transmission clock time.

The acquisition unit may acquire a scheduled transmission clock time at which each of the plurality of communication terminals is scheduled to transmit data and a scheduled amount of transmission that is an amount of data scheduled to be transmitted and acquire the timing on the basis of a relationship between an allowable amount of transmission corresponding to a time period including the scheduled transmission clock time and a total value of the scheduled amount of transmission corresponding to the same time period.

The transmission unit may transmit the timing information updated in accordance with a change in the scheduled amount of transmission corresponding to the same time period to at least one communication terminal among the plurality of communication terminals. Also, the transmission unit may transmit the timing information to the communication terminal during a prescribed time period on condition that a prescribed number (≥2) of communication terminals or more are scheduled to transmit data during the prescribed time period.

The transmission unit may acquire a priority of data scheduled to be transmitted by each of the plurality of communication terminals and transmit the timing information to the communication terminal during a time period when a proportion of data having the priority higher than a prescribed priority is greater than a prescribed value.

The acquisition unit may acquire a deadline in which the communication terminal transmits data and acquire the timing so that the communication terminal is able to transmit data before the acquired deadline. Also, the acquisition unit may acquire the timing on the basis of an attribute of the communication terminal.

The acquisition unit may further acquire the timing on the basis of the number of communication terminals using a relay network in which a plurality of base stations are accommodated. Also, the acquisition unit may acquire timings, at which at least two communication terminals among the plurality of communication terminals transmit data for requesting updating of firmware, as different timings.

The acquisition unit may acquire a disconnection timing that is the timing at which the base station disconnects the wireless communication circuit, and the communication control unit may transmit the timing information including the disconnection timing acquired by the acquisition unit to the communication terminal.

According to a sixth aspect of the present invention, there is provided a management method for managing a plurality of communication terminals that transmit a plurality of pieces of data output by a plurality of communication devices via a wireless communication circuit, the management method including: acquiring timings at which each of the plurality of communication terminals transmits the plurality of pieces of data; and transmitting timing information indicating the timings that have been determined to the plurality of communication terminals.

According to a seventh aspect of the present invention, there is provided a communication control method of controlling a timing at which a communication terminal transmits, via a wireless communication circuit, device data output by a communication device, the communication control method including: acquiring, by a computer, a disconnection timing that is a timing at which a base station for providing the wireless communication circuit used by the communication terminal disconnects the wireless communication circuit; transmitting the disconnection timing acquired by the computer to the communication terminal; and transmitting, by the communication terminal receiving a notification of the disconnection timing, the device data received from the communication device via the wireless communication circuit at a timing other than the disconnection timing.

According to an eighth aspect of the present invention, there is provided a communication system including: a communication terminal configured to transmit device data output by a communication device via a wireless communication circuit; and a management device configured to manage a timing at which the communication terminal transmits the device data, wherein the management device includes an acquisition unit configured to acquire a timing related to communication of the device data; and a communication control unit configured to transmit timing information indicating the timing to the communication terminal, and wherein the communication terminal includes a device communication unit configured to receive the device data; a terminal reception unit configured to receive the timing information transmitted by the communication control unit; and a terminal control unit configured to transmit, via the wireless communication circuit, the device data received by the device communication unit on the basis of the timing information.

The acquisition unit may acquire the timing at which each of a plurality of communication terminals transmits a plurality of pieces of device data, the communication control unit may transmit the timing information indicating the timing acquired by the acquisition unit to the plurality of communication terminals, and the terminal control unit may transmit data on the basis of a timing indicated by the timing information received by the terminal reception unit.

The acquisition unit may acquire a disconnection timing that is a timing at which a base station disconnects the wireless communication circuit, the communication control unit may transmit the timing information including the disconnection timing acquired by the acquisition unit to the communication terminal; and the terminal control unit may transmit the device data received by the device communication unit via the wireless communication circuit at a timing other than the disconnection timing included in the timing information received by the terminal reception unit.

The terminal control unit may transmit sector information for identifying the base station to which the communication terminal belongs to the management device, and the communication control unit may notify the communication terminal of the disconnection timing in the base station acquired on the basis of the sector information.

The communication control unit may further notify the communication terminal of a disconnection period during which the base station disconnects the wireless communication circuit, and the terminal control unit may transmit the device data via the wireless communication circuit during a period other than the disconnection period.

The communication control unit may provide a notification of the disconnection timing using connection control information used in connection control of the wireless communication circuit.

The terminal control unit may temporarily hold the device data in a storage unit without transmitting the device data during a prescribed period before the disconnection timing that is notified from the communication control unit. The terminal control unit may determine the prescribed period on the basis of a communication delay time between the communication terminal and the base station.

The terminal control unit may determine the prescribed period on the basis of an amount of device data received from the communication device. The terminal control unit may determine the prescribed period in a length differing for each application in which the communication device transmits the device data.

The terminal control unit may transmit the device data held in the storage unit when a random time has elapsed after an end of the disconnection timing.

Advantageous Effects of Invention

According to the present invention, it is possible to minimize congestion in a wireless communication circuit.

BRIEF DESCRIPTION OF DRAWINGS

FIG. 5 is a diagram showing an example of a base station DB according to the first embodiment.

FIG. 6 is a diagram showing an example of a communication terminal DB according to the first embodiment.

FIG. 7 is a diagram showing an example of a table showing scheduled transmission clock times for each communication terminal stored in a storage unit by a timing determination unit of the first embodiment.

FIG. 16 is a diagram showing an example of a disconnection timing DB according to the third embodiment.

FIG. 17 is a diagram showing an example of a communication terminal DB according to the third embodiment.

FIG. 20 is a diagram showing an example of a reception history DB according to the fifth embodiment.

DESCRIPTION OF EMBODIMENTS

[Configuration of Communication System S]

Figure 1:
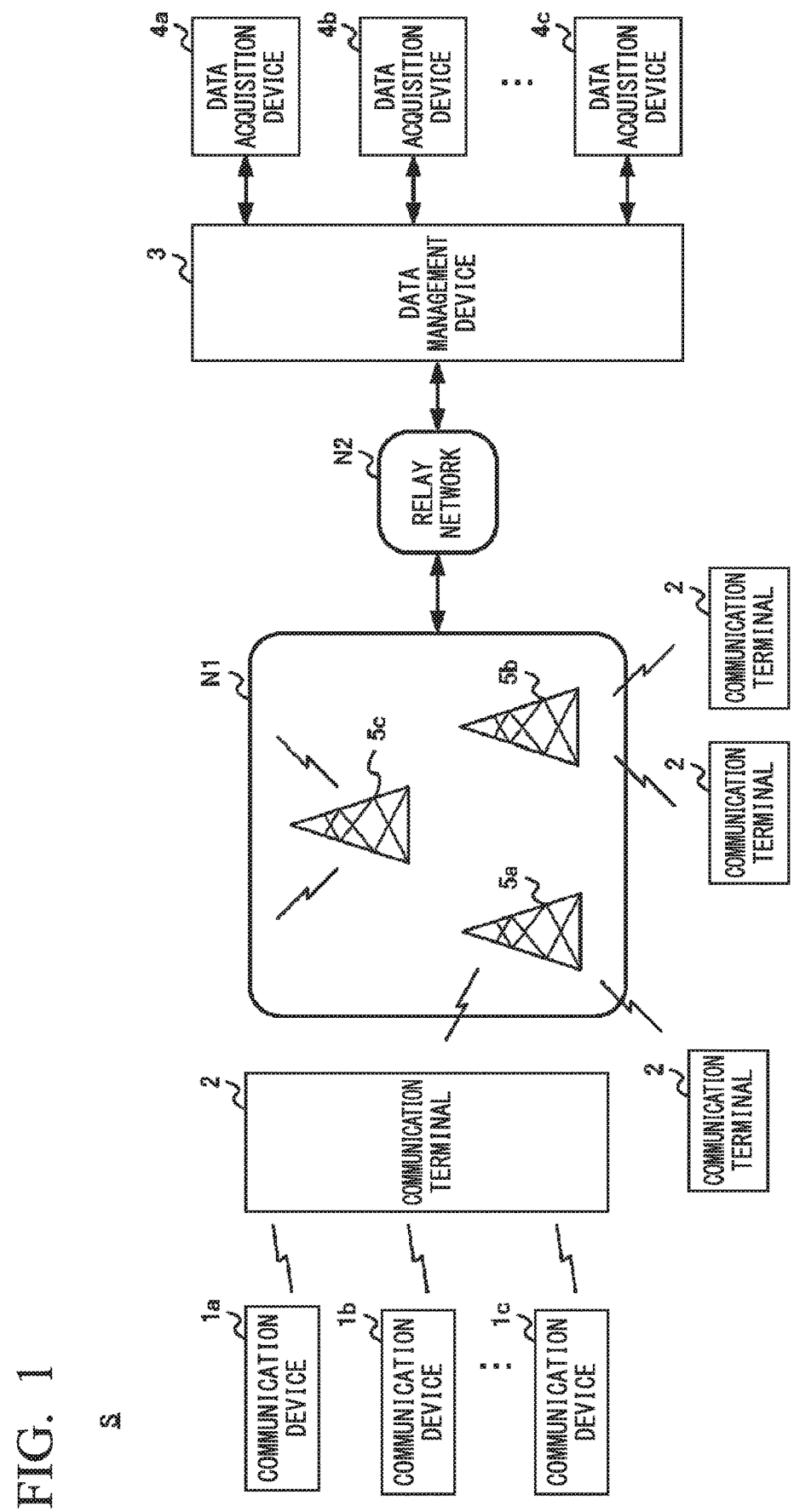
FIG. 1 is a diagram showing a configuration of a communication system according to an embodiment.

FIG. 1 is a diagram showing a configuration of a communication system S according to an embodiment. The communication system S includes a plurality of communication devices 1 (shown as communication devices 1a, 1b, and 1c in FIG. 1), a communication terminal 2, a data management device 3, and data acquisition devices 4 (shown as data acquisition devices 4a, 4b, and 4c in FIG. 1). The communication terminal 2 can transmit device data received from the plurality of communication devices 1 to the data management device 3 via a communication network N1 and a relay network N2.

The communication network N1 is a portable phone network and includes a plurality of base stations 5 (base stations 5a, 5b, and 5c in FIG. 1). Each of the plurality of base stations 5 is, for example, an eNodeB in Long Term Evolution (LTE). Each of the plurality of base stations 5 are connected to a plurality of communication terminals 2 via a wireless communication circuit. The communication terminal 2 can transmit device data received from the communication device 1 to the data management device 3 using the wireless communication circuit provided from the base station 5.

The relay network N2 is a network including an evolved packet core (EPC) such as a packet data network gateway (PGW) or a mobility management entity (MME) of LTE. A plurality of base stations 5 are connected to the relay network N2. For example, the relay network N2 is connected to the data management device 3 via the Internet.

The communication device 1 includes, for example, a sensor, and transmits device data according to an output signal of the sensor to the communication terminal 2. The communication device 1 transmits and receives data to and from the communication terminal 2 through a wireless communication channel suitable for communication over a relatively short distance such as Wi-Fi (registered trademark) or Bluetooth (registered trademark).

The communication device 1 is installed in a vending machine, a vehicle, an office, a factory, or the like and transmits device data including various types of information capable of being collected in an installation place to the data management device 3 via the communication terminal 2. When the communication device 1 is installed in, for example, a vending machine, the communication device 1 collects information about a temperature, the remaining change, the inventory of products, the presence of surrounding people, and the like and transmits device data including the collected information to the communication terminal 2.

A volume of device data transmitted by the communication device 1 is less than a volume of data of audio and image data transmitted and received in the communication terminal such as a smartphone or a tablet and a length of one piece of device data is, for example, 100 bytes or less. The device data transmitted by the communication device 1 includes a device ID that is identification information allocated to each communication device 1 and data including collected information.

The communication terminal 2 receives a plurality of pieces of device data from a plurality of communication devices 1. The communication terminal 2 temporarily stores the received device data and transfers the device data to the data management device 3 by transmitting the stored device data to the communication network N1 at a timing indicated in a notification provided from the data management device 3.

The data management device 3 is, for example, a server managed by a communication carrier that provides a service using the communication network N1. Also, the data management device 3 is a server that externally manages the communication terminal 2. The data management device 3 provides the device data received from the communication terminal 2 to the data acquisition device 4 via the communication network N1 and the relay network N2.

Specifically, the data management device 3 collects device data transmitted from the plurality of communication devices 1 via the communication terminal 2 and the communication network N1. The data management device 3 stores the received device data in a storage medium such as a hard disk and transmits the device data itself or information generated on the basis of the device data to the data acquisition device 4 in response to a request from the data acquisition device 4 (4a, 4b, or 4c).

The data management device 3 determines a timing at which each of the plurality of communication terminals 2 transmits the device data and notifies the plurality of communication terminals 2 of the determined timing. The data management device 3 can prevent congestion from occurring because it is possible to prevent a large number of communication terminals 2 from simultaneously transmitting device data to the same base station 5 or the same relay network N2 by appropriately determining the timing at which the plurality of communication terminals 2 transmit the device data.

The data acquisition device 4 is a computer that can access the data management device 3. The data acquisition device 4 is, for example, a personal computer (PC) used by a data acquirer who accesses the device data transmitted from the communication device 1 to the data management device 3 and the data acquirer can read details of the device data transmitted by the communication device 1 in his/her PC.

Here, when the communication device 1 is installed in a vending machine, the data acquirer is, for example, a management company of a vending machine, a beverage maker that manufactures products of a vending machine, a company that provides marketing information, or the like. The data acquirer makes a contract for acquiring data output by a desired application of a desired communication device 1 with a communication carrier that manages the data management device 3. The data management device 3 stores an acquirer ID of each data acquirer, device IDs of one or more communication devices 1 selected by each data acquirer, application IDs of one or more applications selected by each data acquirer in association.

Figure 2:
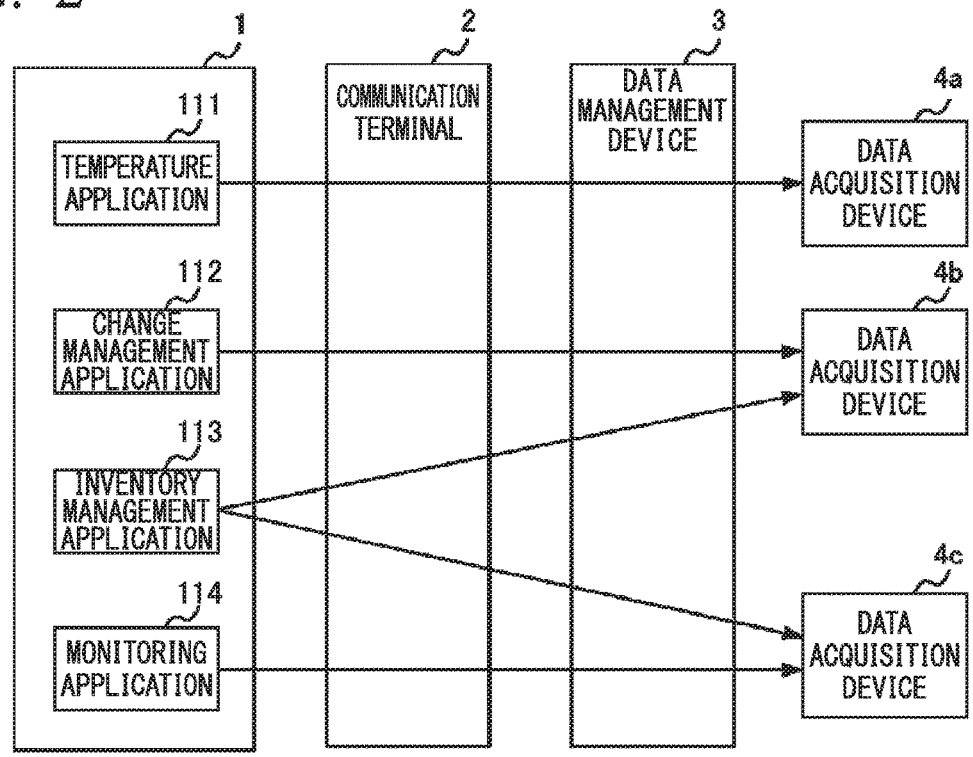
FIG. 2 is a diagram schematically showing a flow of data in the communication system.

FIG. 2 is a diagram schematically showing a flow of data in the communication system S. One communication device 1 can execute a plurality of applications corresponding to a plurality of types of information. The communication device 1 shown in FIG. 2 is installed in a vending machine and can execute a temperature application 111, a change management application 112, an inventory management application 113, and a monitoring application 114.

The temperature application 111 can transmit temperature information indicating an internal temperature of the vending machine. The change management application 112 can transmit change information indicating the balance of change of the vending machine. The inventory management application 113 can transmit inventory information indicating the number of inventory products to be sold in the vending machine. The monitoring application 114 can transmit person detection information indicating a time when a person within a prescribed distance from the vending machine has been detected.

Information to be transmitted by each application is allocated to the data acquisition device 4 pre-registered by the data management device 3. In the example shown in FIG. 2, the temperature information output by the temperature application 111 is transmitted to the data acquisition device 4a of the data acquirer who maintains the vending machine. The change information output by the change management application 112 is transmitted to the data acquisition device 4b of the data acquirer that manages products. The inventory information output by the inventory management application 113 is transmitted to the data acquisition device 4b and the data acquisition device 4c of the data acquirer that provides the marketing information. The person detection information output by the monitoring application 114 is transmitted to the data acquisition device 4c.

Also, a place where the communication device 1 is installed is able to be selected and the communication device 1 may be installed within, for example, a car. When the communication device 1 is installed within the car, the communication device 1 can transmit the remaining amount of gasoline, the remaining amount of battery power, traveling data (a traveling distance, an average speed, fuel consumption, a frequency of sudden braking, and the like), position information, fault information of the body of a car, and the like to the data processing device 3.

First Embodiment

[Configuration of Communication Terminal 2]

Next, a configuration and an operation of the communication terminal 2 will be described.

Figure 3:
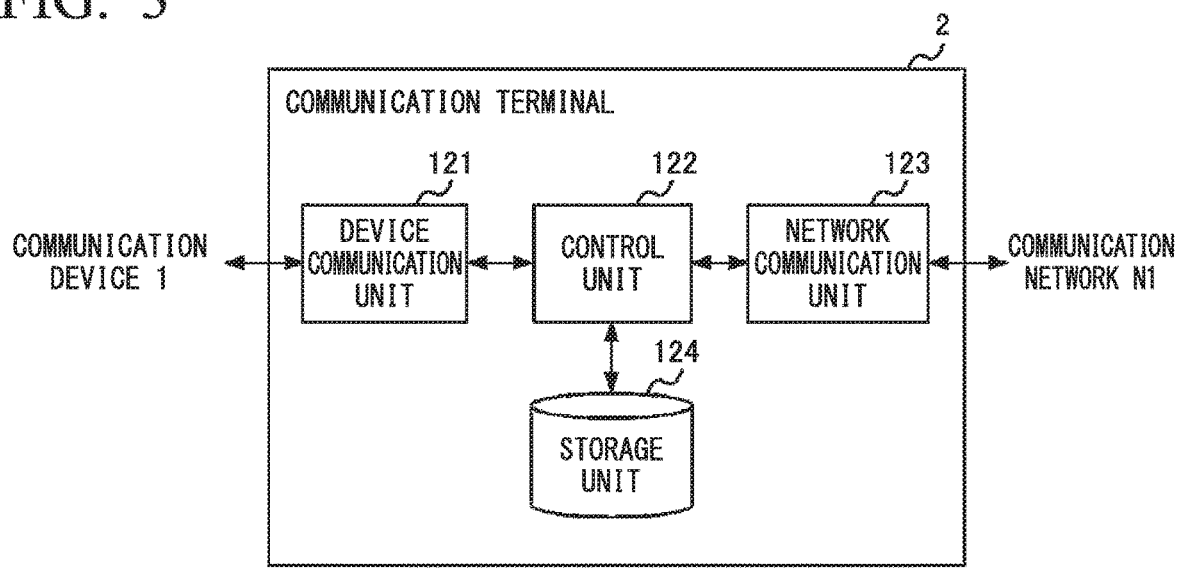
FIG. 3 is a diagram showing a configuration of a communication terminal according to a first embodiment.

FIG. 3 is a diagram showing the configuration of the communication terminal 2 according to a first embodiment. The communication terminal 2 includes a device communication unit 121, a control unit 122, a network communication unit 123, and a storage unit 124.

The device communication unit 121 is a wireless communication interface for receiving data transmitted by the communication device 1.

The control unit 122 is, for example, a central processing unit (CPU), and causes the storage unit 124 to store device data received via the device communication unit 121. Also, the control unit 122 reads the device data stored in the storage unit 124 at a timing indicated in a notification provided from the data management device 3 and transmits the read device data to the communication network N1 via the network communication unit 123.

The control unit 122 may transmit the device data received from the communication device 1 at a clock time set by the data acquirer received via the data management device 3. For example, the data acquirer can set a clock time at which device data is transmitted to the communication terminal 2 for each communication device 1 or each application. If the notification of the transmission timing is not received from the data management device 3, the control unit 122 transmits the device data when a preset scheduled transmission clock time has been reached.

The network communication unit 123 is a wireless communication interface for transmitting data received from the communication device 1 to the communication network N1. For example, the network communication unit 123 can transmit and receive data to and from the base station 5 of the communication network N1 in accordance with an LTE standard.

The storage unit 124 includes a storage medium such as a read only memory (ROM), a random access memory (RAM), or a hard disk. The storage unit 124 stores a program to be executed by the control unit 122. Also, the storage unit 124 stores the device data received from the communication device 1 in association with a device ID of the communication device 1 and a date and time received from the communication device 1 on the basis of control of the control unit 122.

[Configuration of Data Management Device 3]

Figure 4:
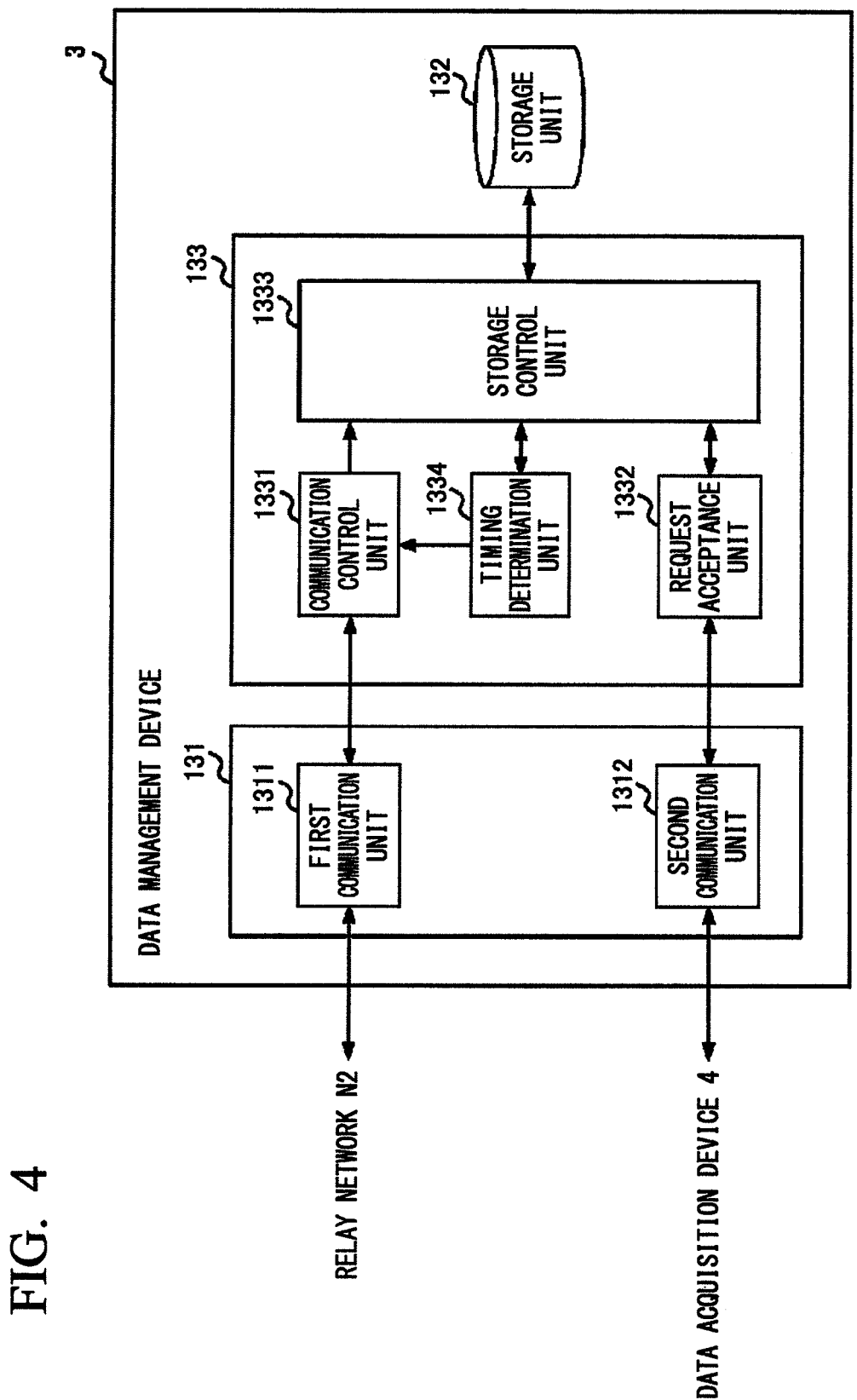
FIG. 4 is a diagram showing a configuration of a data management device according to the first embodiment.

FIG. 4 is a diagram showing a configuration of the data management device 3 according to the first embodiment.

The data management device 3 includes a communication unit 131, a storage unit 132, and a control unit 133.

The communication unit 131 includes a first communication unit 1311 and a second communication unit 1312. The first communication unit 1311 is a communication interface for transmitting and receiving data to and from the communication terminal 2 via the communication network N1 and has, for example, a termination interface of a portable phone network. The first communication unit 1311 may have a local area network (LAN) interface for establishing a connection with a termination device of the portable phone network.

The second communication unit 1312 has a communication interface for transmitting and receiving data to and from the data acquisition device 4 via the relay network N2. The second communication unit 1312 is, for example, a LAN interface.

The storage unit 132 has storage media such as a ROM, a RAM, and a hard disk. The storage unit 132 stores a base station database (hereinafter referred to as base station DB) in which identification information of the base station 5 (hereinafter referred to as a base station ID), the number of communication terminals 2 accommodated by each base station 5, and communication terminal IDs which are identification information of the communication terminals 2 accommodated by the base station 5 are associated.

FIG. 5 is a diagram showing an example of a base station DB according to the first embodiment. The number of accommodated terminals is the number of communication terminals 2 in a state in which the wireless communication circuit provided by each base station 5 is used. The number of accommodated terminals is updated under the control of the storage control unit 1333 to be described below. For example, the communication terminal 2 moves and the number of accommodated terminals is sequentially updated in accordance with a change in the number of communication terminals 2 that communicate with the base station 5.

Also, the storage unit 132 stores a communication terminal database (hereinafter referred to as a "communication terminal DB") in which a communication terminal ID is associated with a device ID that is identification information of the communication device 1 with which each communication terminal 2 can directly communicate without involving the base station 5.

FIG. 6 is a diagram showing an example of the communication terminal DB according to the first embodiment. In the communication terminal DB, an application ID that is identification information of an application executable by the communication device 1 with which the communication terminal 2 can communicate and an amount of transmission data that is transmitted by each application during one data transmission operation are stored in association with the communication terminal ID.

In the example shown in FIG. 6, a case in which the communication terminal 2 having a communication terminal ID of 9001 receives data output by a communication device 1a having a device ID of 1001 and a communication device 1b having a device ID of 1002 is received is shown. The communication device 1a can execute an application having an application ID of a51 in which an amount of transmitted data is 10 bytes and an application having an application ID of a52 in which an amount of transmitted data is 20 bytes. The communication device 1b can execute an application having an application ID of a51 in which an amount of transmitted data is 10 bytes and an application having an application ID of a53 in which an amount of transmitted data is 45 bytes.

Also, the storage unit 132 stores the data, which is transmitted by the plurality of communication devices 1, received from the communication terminal 2 in association with the device ID of the communication device 1. Furthermore, the storage unit 132 may store a data provision database (hereinafter referred to as a data provision DB) in which an acquirer ID of a data acquirer who accesses the data management device 3 via the data acquisition device 4 and the device ID and the application ID of the communication device 1 and the application registered as targets from which the data acquirer acquires data are associated.

The control unit 133 is, for example, a CPU, and determines a timing at which each communication terminal 2 transmits data by executing the program stored in the storage unit 132.

The control unit 133 includes a communication control unit 1331, a request acceptance unit 1332, a storage control unit 1333, and a timing determination unit 1334.

The communication control unit 1331 controls transmission and reception of data to and from the communication terminal 2. The communication control unit 1331 starts the reception of data from the communication terminal 2 by providing a notification of an access point name (APN) that is an address of a gateway of the communication network N1 to the communication terminal 2 capable of communicating with the communication device 1 that outputs the data to be provided to the data acquisition device 4. Also, the communication control unit 1331 functions as a transmission unit that transmits timing information indicating a timing determined by the timing determination unit 1334 to the communication terminal 2 via the first communication unit 1311.

The request acceptance unit 1332 accepts a request for selecting a communication device 1 and an application that are targets from which data is acquired from the data acquisition device 4. The request acceptance unit 332 transmits a list of communication devices 1 and applications that are targets from which data is collected by the data management device 3 to the data acquisition device 4 via the second communication unit 1312.

When the data acquirer selects the communication device 1 and the application from which data is desired to be acquired from the list of communication devices 1 and applications displayed via the data acquisition device 4, the data acquisition device 4 transmits a data acquisition request including information (e.g., a device ID and an application ID) for identifying the selected communication device 1 and the selected application and an acquirer ID, to the data management device 3. When the data acquisition request is received from the data acquisition device 4, the request acceptance unit 1332 performs registration in the data provision DB within the storage unit 132 by notifying the storage control unit 1333 of the acquirer ID, the device ID and the application ID included in the data acquisition request.

If a request for acquiring data from the data acquisition device 4 has been accepted, the request acceptance unit 1332 provides data which is transmitted by an application indicated in the request, received via the communication network N1, by transmitting the data to the data acquisition device 4 with reference to the data provision DB stored in the storage unit 132. In the data provision DB, the acquirer ID corresponding to the data acquisition device 4 transmitting the data acquisition request and the device ID of the communication device from which the data is provided to the data acquisition device 4 of the acquirer ID are associated. In the data provision DB, an application ID of an application that is a target from which data is provided to the data acquisition device 4 of the acquirer ID may further be associated.

The request acceptance unit 1332 may accept requests for selecting the same application to be executed by the same communication device 1 from the plurality of data acquisition devices 4. When the request acceptance unit 1332 has accepted requests for selecting the same application to be executed by the same communication device 1 from the plurality of data acquisition devices 4, the communication control unit 1331 provides the plurality of data acquisition devices 4 with data transmitted by the application indicated in the request among pieces of data received via the communication network N1.

The storage control unit 1333 writes data to the storage unit 132 or reads data stored in the storage unit 132 on the basis of instructions from the communication control unit 1331 and the request acceptance unit 1332. For example, the storage control unit 1333 causes the storage unit 132 to store device data received from the communication terminal 2 by the communication control unit 1331 in association with the device ID and the application ID.

The timing determination unit 1334 determines a timing at which each of the plurality of communication terminals 2 transmits a plurality of pieces of data. The timing determination unit 1334 determines a clock time or a cycle at which each of the plurality of communication terminals 2 transmits the plurality of pieces of data and notifies the communication terminal 2 of timing information indicating the determined clock time or cycle via the communication control unit 1331. For example, the timing determination unit 1334 determines a timing on the basis of the number of communication terminals 2 within a sector of the same base station 5 that provides a wireless communication circuit. The timing determination unit 1334 may determine a clock time at which the communication terminal 2 transmits data as the timing or may determine a cycle at which the communication terminal 2 transmits data as the timing.

By referring to the base station DB stored in the storage unit 132, for example, the timing determination unit 1334 identifies the number of communication terminals 2 located within the sector of each base station 5. When the number of the communication terminals 2 located within the sector of the base station 5 is greater than or equal to a prescribed threshold value for which a congestion state can be reached, the timing determination unit 1334 determines a timing at which each communication terminal transmits data so that the number of communication terminals 2 that transmit data at the same time is less than or equal to a prescribed value. The timing determination unit 1334 determines timings so that the timings at which a plurality of communication terminals 2 transmit data are dispersed for a long time as the number of communication terminals 2 within the sector of the same base station 5 increases.

The timing determination unit 1334 may determine the timings on the basis of the number of communication devices 1 with which a plurality of communication terminals 2 within a sector of the same base station 5 that provides a wireless communication circuit can communicate without involving the base station 5. In this case, the timing determination unit 1334 identifies the number of communication devices 1 with which each of the communication terminals 2 located in the sector of each base station 5 can communicate by referring to the base station DB and the communication terminal DB stored in the storage unit 132.

Then, the timing determination unit 1334 identifies the number of communication devices 1 within the sector of each base station 5 by summing the number of communication devices 1 with which each of the communication terminal 2 can communicate. When the number of communication devices 1 located within the sector of the base station 5 is greater than or equal to a prescribed threshold value for which a congestion state can be reached, the timing determination unit 1334 determines a timing at which each communication terminal 2 transmits data so that the number of communication terminals 2 that transmit data at the same time is less than a prescribed number.

The timing determination unit 1334 may determine a timing on the basis of a priority of the application of the communication device 1 that outputs the data when the timing at which each communication terminal 2 transmits data is determined. For example, the timing determination unit 1334 sets a priority of an application that outputs data for which real-time property is required so that the priority is higher than a priority of an application that outputs data for which the real-time property is not required. Then, the timing determination unit 1334 specifies a timing at which data is transmitted for a communication terminal 2 capable of communicating with the communication device 1 that cannot execute a high-priority application without specifying a timing at which data is transmitted for a communication terminal 2 that can execute a high-priority application.

For the communication terminal 2 capable of communicating with both the communication device 1 that can execute a high-priority application and the communication device 1 that cannot execute a high-priority application, the timing determination unit 1334 may specify a timing at which data output by a low-priority application is transmitted and may not specify a timing at which data output by a high-priority application is transmitted. In this manner, the timing determination unit 1334 can prevent a transmission delay of data for which the real-time property is required from being caused while minimizing occurrence of congestion by determining a timing on the basis of a priority of the application.

Also, the timing determination unit 1334 may acquire the scheduled transmission clock time at which each of the plurality of communication terminals 2 is scheduled to transmit data and determine a timing on the basis of the scheduled transmission clock time. For example, the timing determination unit 1334 may determine a timing on the basis of the number of communication terminals 2 scheduled to transmit data at the same clock time (or time period) on the basis of the scheduled transmission clock time. The timing determination unit 1334 acquires a scheduled clock time at which the communication terminal 2 transmits data in advance, stores the acquired clock time in the storage unit 132, and determines a changed scheduled transmission clock time for at least some communication terminals 2 for a clock time matching a scheduled transmission clock time (or time period) of a prescribed number of communication terminals 2 or more.

The timing determination unit 1334 may acquire information about a radio wave state in the vicinity of the communication terminal 2 from the communication terminal 2 and preferentially change a scheduled transmission clock time of the communication terminal 2 for which a radio wave state is good to an early clock time if there are a plurality of communication terminals scheduled to transmit data at the same clock time. Thereby, because the communication terminal 2 having a good radio wave state can quickly complete data transmission, the present invention is suitable for a case in which it is necessary to perform data communication as quickly as possible (e.g., when firmware is updated).

FIG. 7 is a diagram showing an example of a table showing a scheduled transmission clock time for each communication terminal 2 stored in the storage unit 132 by the timing determination unit 1334 of the first embodiment. In FIG. 7, a plurality of communication terminals 2 having communication terminal IDs of 9001, 9002, and 9003 are scheduled to transmit data at 0:00. In this case, for example, the timing determination unit 1334 determines to change the scheduled transmission clock time of the communication terminal 2, which has the communication terminal ID of 9001 and a relatively short interval of the scheduled transmission clock time, to 0:01 and notifies the communication terminal 2 having the communication terminal ID of 9001 of the changed scheduled transmission clock time.

The timing determination unit 1334 may acquire the scheduled transmission clock time at which each of the plurality of communication terminals 2 is scheduled to transmit data and an amount of scheduled transmission data which is an amount of data scheduled to be transmitted and determine a timing on the basis of a relationship between an allowable amount of transmission corresponding to a time period including the acquired scheduled transmission clock time and a sum of amounts of scheduled transmission data corresponding to the same time period. In the example shown in FIG. 7, the sum of amounts of data scheduled to be transmitted at 0:00 is 125+50=85 bytes. 7, the sum of amounts of data scheduled to be transmitted at 0:00 is 10+25+5=385 bytes. The sum of amounts of data scheduled to be transmitted at 2:00 is 10+25=35 bytes. When the allowable amount of transmission in a midnight time period from 0:00 to 6:00 is 50 bytes, the timing determination unit 1334 changes a timing at which at least any one communication terminal 2 of a plurality of communication terminals 2 scheduled to transmit data at 0:00 transmits data because a sum of amounts of scheduled transmission data at 0:00 is larger than the allowable amount of transmission.

The timing determination unit 1334 sequentially updates the table shown in FIG. 7. Specifically, the timing determination unit 1334 updates the table shown in FIG. 7 every time update data of a scheduled transmission clock time and an amount of scheduled transmission data is acquired from the communication terminal 2.

When the update data of the scheduled transmission clock time and the amount of scheduled transmission data is acquired, the timing determination unit 1334 recalculates the number of communication terminals 2 that transmit data at the same clock time and an amount of scheduled transmission data at the same clock time. The timing determination unit 1334 transmits timing information updated in accordance with a change in an amount of scheduled transmission data corresponding to the same time period, to at least one communication terminal 2 among the plurality of communication terminals 2. For example, when a result of recalculation indicates that the number of communication terminals 2 that transmit data at the same clock time exceeds a threshold value or that a sum of amounts of data that is likely to be simultaneously transmitted exceeds an allowable amount of transmission, the timing determination unit 1334 changes timings at which at least some communication terminals 2 transmit data and notifies the changed timings to the communication terminals 2.

The timing determination unit 1334 may acquire a deadline in which the communication terminal 2 transmits data and determine a timing so that the communication terminal 2 transmits data before the acquired deadline. For example, the timing determination unit 1334 acquires a transmission deadline in association with the scheduled transmission clock time from the communication terminal 2. When a timing at which the communication terminal 2 transmits data is determined, the timing determination unit 1334 determines the timing so that the data can be transmitted at a clock time before the transmission deadline. Thereby, for example, even when the timing determination unit 1334 determines to transmit data at a later timing than the scheduled transmission clock time of the communication terminal 2, it is possible to prevent a timing at which data to be transmitted within a prescribed time is transmitted from being excessively late.

Also, the timing determination unit 1334 may determine a timing on the basis of an attribute of the communication terminal 2 stored in the storage unit 132. For example, when the attribute of the communication terminal 2 indicates that it is possible to communicate with the communication device 1 that outputs data for which real-time property is required, the timing determination unit 1334 determines a timing so that data can be preferentially transmitted and lowers the priority when the attribute of the communication terminal 2 indicates that it is impossible to communicate with the communication device 1 that outputs data for which real-time property is required.

The timing determination unit 1334 may determine a timing on the basis of details of a contract with the communication carrier associated with the communication terminal 2 as the attribute of the communication terminal 2. For example, when the attribute of the communication terminal 2 indicates contract details of a high charge, the timing determination unit 1334 determines a timing so that data can be preferentially transmitted.

Meanwhile, a core network such as an MME or a PGW provided in the relay network N2 is required to process data transmitted from a plurality of base stations 5. Therefore, when a large amount of data is simultaneously transmitted from a large number of base stations 5, the relay network N2 is congested. Therefore, the timing determination unit 1334 may determine a timing further on the basis of the number of communication terminals 2 using the relay network N2 in which the plurality of base stations 5 are accommodated.

For this, the timing determination unit 1334 refers to the base station DB shown in FIG. 5, sums the number of communication terminals 2 accommodated in the base station 5 using the relay network N2, and determines a timing so that the number of communication terminals 2 that transmit data simultaneously is less than or equal to an allowable number when a value of the sum is greater than or equal to a prescribed value. The timing determination unit 1334 may assign a timing at which the communication terminal 2 can transmit data to a different time period for each base station 5 so that the number of communication terminals 2 that transmit data simultaneously is less than or equal to the allowable number.

Also, when it is necessary for the communication terminal 2 to update the firmware, there is a possibility that congestion will occur in the communication network N1 and the relay network N2 when updating is started simultaneously. Therefore, the timing determination unit 1334 may determine timings at which at least two communication terminals 2 among the plurality of communication terminals 2 transmit data for requesting updating of the firmware as different timings. For example, when the firmware of the communication terminal 2 is required to be updated, the timing determination unit 1334 sets an update timing of the firmware to be indicated in a notification provided to the communication terminal 2 to a different timing for each communication terminal 2. Thereby, the timing determination unit 1334 can prevent a plurality of communication terminals 2 from simultaneously transmitting data for requesting updating of the firmware.

Here, the communication control unit 1331 may be configured to transmit timing information to the communication terminal 2 during a prescribed time period when a possibility that the communication network N1 will be congested is high and prevent the timing information from being transmitted to a plurality of communication terminals 2 during a time period other than the prescribed time period. That is, the communication control unit 1331 may transmit the timing information to the communication terminal 2 during the prescribed time period on condition that a prescribed number ($\geq 2$) of communication terminals 2 or more are scheduled to transmit data during the prescribed time period. Specifically, the communication control unit 1331 may be configured to transmit timing information indicating a timing determined by the timing determination unit 1334 to the communication terminal 2 during a time period when a prescribed number of communication terminals 2 or more are scheduled to transmit data and prevent the timing information from being transmitted during other time periods. Thereby, the communication control unit 1331 can avoid transmission of the timing information with a low effect during a time period when the possibility of congestion is low.

Also, the communication control unit 1331 may acquire a priority of data scheduled to be transmitted by each of the plurality of communication terminals 2 and transmit the timing information to the communication terminal 2 during a time period when a proportion of data having a priority higher than a prescribed priority is greater than a prescribed value. Thereby, the communication control unit 1331 can reduce a probability of occurrence of congestion because it is possible to disperse timings at which the communication terminals 2 transmit data as much as possible during a time period where a possibility of occurrence of congestion is high and a proportion of data with a high priority is large.

[Communication Sequence]

Figure 8:
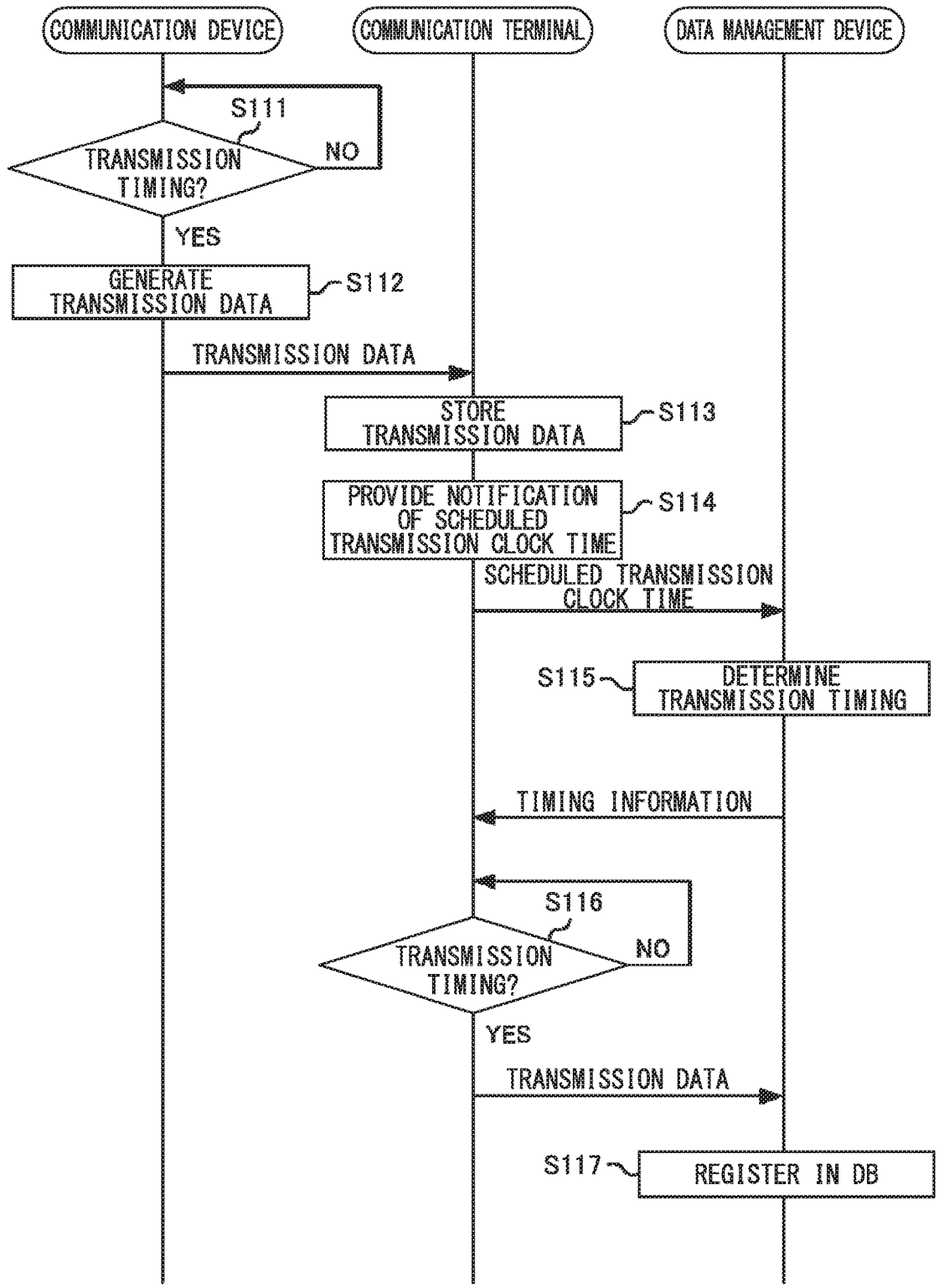
FIG. 8 is a diagram showing a communication sequence in the communication system of the first embodiment.

FIG. 8 is a diagram showing a communication sequence in the communication system S of the first embodiment.

First, when a timing at which collected information is transmitted has been reached (YES in S11), the communication device 1 generates transmission data (S112) and transmits the transmission data to the communication terminal 2. When the transmission data is received, the communication terminal 2 stores the received transmission data in the storage unit 124 (S113). Then, the communication terminal 2 notifies the data management device 3 of a scheduled transmission clock time (S114). At this time, the communication terminal 2 may also notify the data management device 3 of a device ID of the communication device 1 outputting the data scheduled to be transmitted and an application ID of an application executed by the communication device 1.

Subsequently, in the data management device 3, the timing determination unit 1334 determines a timing at which each communication terminal 2 transmits data on the basis of the scheduled transmission clock time received from the plurality of communication terminals 2 (S115). The communication control unit 1331 transmits timing information indicating the timing determined by the timing determination unit 1334 to the communication terminal 2.

Subsequently, when a timing at which data is transmitted to the data management device 3 has been reached (YES in S116), the communication terminal 2 transmits stored data to the data management device 3. When the data is received, the communication control unit 1331 registers the received data in the data provision DB within the storage unit 132 in association with a communication terminal ID.

[Advantageous Effects of Communication System S]

In a conventional system, a control unit is required to indicate data transmission timings to individual sensors in order to prevent the congestion in a wireless communication circuit. There is a problem in that control becomes complicated when the control unit transmits instructions to individual sensors as the number of installed sensors increases with the spread of Internet Of Things (IoT). According to the first embodiment described above, control efficiency for preventing the congestion in the wireless communication circuit can be improved.

The data management device 3 according to the first embodiment acquires a timing related to the communication of device data and transmits timing information indicating the timing to the communication terminal 2. Also, the communication terminal 2 receives the device data and the timing information and transmits the received device data via the wireless communication circuit on the basis of the timing information.

More specifically, in the communication system S of the first embodiment, the data management device 3 includes a timing determination unit 1334 configured to determine a timing at which each of the plurality of communication terminals 2 transmits a plurality of pieces of data and a communication control unit 1331 configured to transmit timing information indicating the timing determined by the timing determination unit 1334 to the plurality of communication terminals 2. When the data management device 3 has the above-described configuration, the data management device 3 can control a timing at which the communication terminal 2 transmits data transmitted by a plurality of communication devices 1 by only notifying the plurality of communication terminals 2 of the timing information. Therefore, in the communication system S, the data management device 3 can control the timing at which data transmitted by a large number of communication devices 1 is transmitted to the communication network N1 without controlling individual communication devices 1. As a result, it is possible to efficiently reduce a probability that the communication network N1 and the relay network N2 will be congested.

Second Embodiment

[Configuration of Communication System S]

The drawing showing the configuration of the communication system S according to the second embodiment is similar to FIG. 1 according to the first embodiment. The communication system S includes a plurality of communication devices 1, a communication terminal 2, a data management device 3, and a data acquisition device 4. The communication terminal 2 can transmit device data received from the plurality of communication devices 1 to the data management device 3 via a communication network N1 and a relay network N2.

A base station 5, the communication network N1, and the relay network N2 are as described in the first embodiment.

The communication device 1 includes, for example, a sensor, and transmits device data on the basis of an output signal of the sensor to the communication terminal 2. The communication device 1 transmits and receives data to and from the communication terminal 2 through a wireless communication channel suitable for communication over a relatively short distance such as Wi-Fi (registered trademark) or Bluetooth (registered trademark).

The communication device 1 is installed in movable facilities such as cars, trains, and aircrafts and transmits device data including various types of information capable of being collected in an installation place of the communication device 1 to the data management device 3 via the communication terminal 2. When the communication device 1 is installed in, for example, a car, the communication device 1 collects information about the remaining amount of gasoline, the remaining amount of battery power, a traveling distance, a temperature of each part, and the like and transmits the device data including the collected information to the communication terminal 2.

A volume of the device data transmitted by the communication device 1 is less than a volume of audio or image data to be transmitted and received in the communication terminal such as a smartphone or a tablet and a length of one piece of device data is, for example, 100 bytes or less. The device data transmitted by the communication device 1 includes a device ID that is identification information allocated to each communication device 1 and data including collected information.

The communication terminal 2 receives a plurality of pieces of device data from a plurality of communication devices 1. The communication terminal 2 temporarily stores the received device data and transmits the stored device data to the communication network N1, thereby transferring the device data to the data management device 3. The communication terminal 2 is installed in the same facility as a facility in which the plurality of communication devices 1 are installed and the communication terminal 2 is assumed to be mounted in a car in the present embodiment. The communication terminal 2 determines a timing at which the temporarily stored device data is transmitted according to whether or not the communication terminal 2 is moving.

As will be described below in detail, the communication terminal 2 transmits the device data at a point in time when the first time has elapsed from the reception of the device data when the communication terminal 2 is moving and the communication terminal 2 transmits the device data at a point in time when a second time longer than the first time has elapsed from the reception of the device data or erases the device data without transmitting the device data when the communication terminal 2 is stopped. Thereby, it is possible to reduce a probability that the communication terminal 2 will transmit device data simultaneously with another communication terminal 2 using the same base station 5 while a car equipped with the communication terminal 2 is stopped.

The data management device 3 is, for example, a server managed by a communication carrier that provides a service using the communication network N1. The data management device 3 provides device data received from the communication terminal 2 to the data acquisition device 4 via the communication network N1 and the relay network N2.

The data management device 3 collects device data transmitted from the plurality of communication devices 1 via the communication terminal 2 and the communication network N1. The data management device 3 stores the received device data in a storage medium such as a hard disk and transmits the device data itself or information generated on the basis of the device data to the data acquisition device 4 in response to a request from the data acquisition device 4 (4a, 4b, or 4c).

The data acquisition device 4 is as described in the first embodiment.

Figure 9:
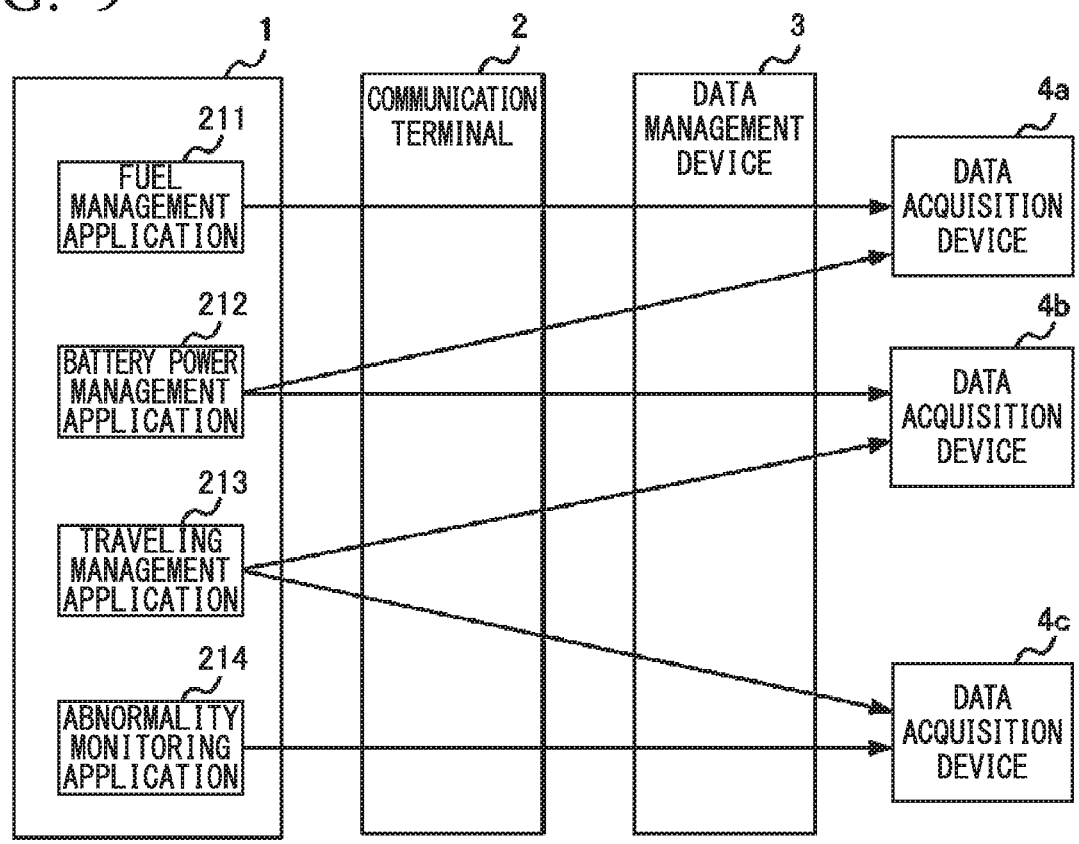
FIG. 9 is a diagram schematically showing a flow of data in a communication system of a second embodiment.

FIG. 9 is a diagram schematically showing a flow of data in the communication system S of the second embodiment. One communication device 1 can execute a plurality of applications corresponding to a plurality of types of information. The communication device 1 shown in FIG. 9 is installed in a car and can execute a fuel management application 211, a battery management application 212, a traveling management application 213, and an abnormality monitoring application 214.

The fuel management application 211 can transmit information about fuel such as information about the remaining amount of gasoline and fuel consumption. The battery management application 212 can transmit information about a battery such as the remaining amount of battery power and electric current consumption. The traveling management application 213 can transmit information about traveling such as a traveling distance and a traveling speed. The abnormality monitoring application 214 can transmit information indicating the presence or absence of an abnormality such as an abnormality in a temperature of each part in a vehicle.

The information transmitted by each application is allocated to the data acquisition device 4 pre-registered by the data management device 3. In the example shown in FIG. 9, information output by the fuel management application 211 is transmitted to the data acquisition device 4a of the gas station located in a prescribed range from a position of the communication terminal 2. Information output by the battery management application 212 is transmitted to the data acquisition device 4a of the gas station that sells a battery for use in a vehicle and the data acquisition device 4b of a company or the like that manages a vehicle. Information output by the traveling management application 213 is transmitted to the data acquisition device 4b and the data acquisition device 4c of the manufacturer of the vehicle. Information output by the abnormality monitoring application 214 is transmitted to the data acquisition device 4c.

[Configuration of Communication Terminal 2]

Subsequently, a configuration and an operation of the communication terminal 2 will be described.

Figure 10:
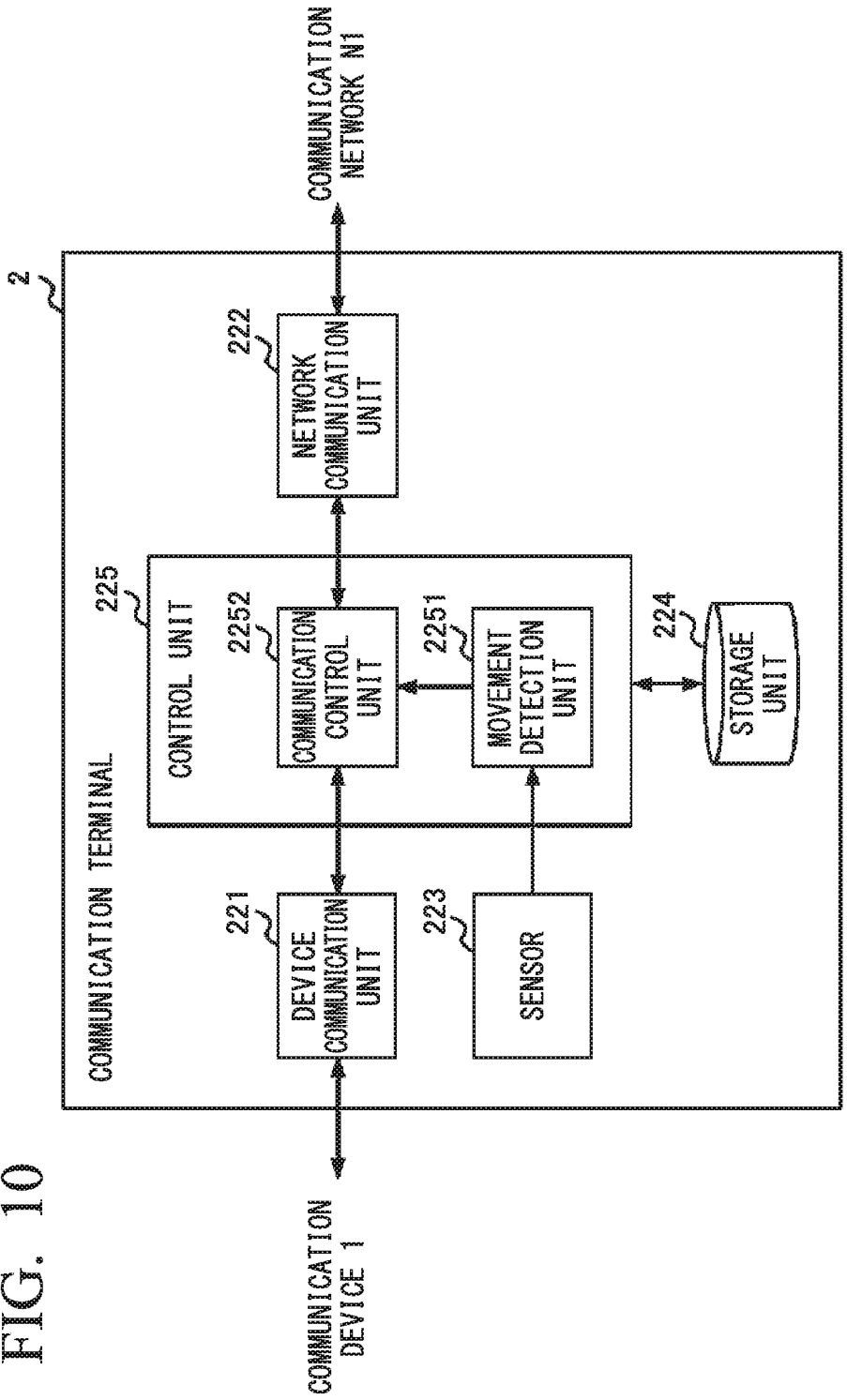
FIG. 10 is a diagram showing a configuration of a communication terminal according to the second embodiment.

FIG. 10 is a diagram showing the configuration of the communication terminal 2 according to the second embodiment. The communication terminal 2 includes a device communication unit 221, a network communication unit 222, a sensor 23, a storage unit 224, and a control unit 225. The control unit 225 is, for example, a CPU, and functions as a movement detection unit 2251 and a communication control unit 2252 by executing a program stored in the storage unit 224.

The device communication unit 221 is a wireless communication interface for receiving the device data transmitted by the communication device 1.

The network communication unit 222 is a wireless communication interface for transmitting data received from the communication device 1 to the communication network N1. The network communication unit 222 can transmit and receive data to and from the base station 5 of the communication network N1 in accordance with, for example, an LTE standard.

The sensor 23 is, for example, an acceleration sensor and outputs a detection signal indicating the acceleration for detecting whether the communication terminal 2 is moving or stopped. The sensor 23 notifies the movement detection unit 2251 of the detection signal.

The storage unit 224 has storage media such as a ROM, a RAM, and a hard disk. The storage unit 224 stores programs to be executed by the control unit 225. Also, the storage unit 224 stores the device data received from the communication device 1 in association with a device ID of the communication device 1 and a date and time received from the communication device 1 on the basis of control of the communication control unit 2252.

The movement detection unit 2251 detects whether or not the communication terminal 2 is moving on the basis of the detection signal of the notification provided from the sensor 23. The movement detection unit 2251 generates movement information indicating whether the communication terminal 2 is moving or stopped and notifies the communication control unit 2252 of the movement information. For example, the movement detection unit 2251 determines that the communication terminal 2 is moving when a moving speed of the communication terminal 2 is 10 km/h or more and determines that the mobile terminal 2 is stopped when the moving speed is less than 10 km/h The communication control unit 2252 causes the storage unit 224 to temporarily store the device data received by the device communication unit 221. The communication control unit 2252 transmits the device data stored in the storage unit 224 to the data management device 3 via the network communication unit 222 at a timing suitable for a movement state of the communication terminal 2 on the basis of the movement information of a notification provided from the movement detection unit 2251.

When the movement detection unit 2251 determines that the communication terminal 2 is moving, the communication control unit 2252 transmits the device data when the first time has elapsed from reception of the device data transmitted by the communication device 1. When the movement detection unit 2251 determines that the communication terminal 2 is stopped, the communication control unit 2252 executes a delay mode in which the device data is transmitted when a second time longer than the first time has elapsed from reception of the device data. The second time is, for example, a time until the communication terminal 2 restarts the movement. The first time and the second time may be pre-stored in the storage unit 224 or may be received by the communication control unit 2252 from the data management device 3. In this manner, the communication control unit 2252 transmits the device data at a different timing from that of movement while the communication terminal 2 is stopped, so that it is possible to prevent a large number of communication terminals 2 from simultaneously transmitting data in advance when a car equipped with the communication terminal 2 is stopped during traffic signal waiting or driven at a low speed due to traffic congestion and a possibility that a large number of communication terminals 2 will be located in the vicinity of the communication terminal 2 is high.

When the communication terminal 2 is stopped, the communication control unit 2252 may execute an erase mode in which the transmission of the device data is stopped instead of the delay mode. For example, when the erase mode is executed, the communication control unit 2252 executes the erase mode at a point in time when a prescribed time has elapsed from the stopped state of the communication terminal 2.

If the movement detection unit 2251 determines that the communication terminal 2 is stopped, the communication control unit 2252 may execute the delay mode when the device data has a first attribute and execute the erase mode when the device data has a second attribute different from the first attribute. For example, the device data of the first attribute is data that is not steadily generated or data in which all device data is required to be transmitted and corresponds to data indicating abnormality. The device data of the second attribute is, for example, steadily generated data and corresponds to data indicating the remaining amount of fuel or battery power.

For example, if the movement detection unit 2251 determines that the communication terminal 2 is stopped, the communication control unit 2252 executes the delay mode when the device data is data having the first attribute that is necessarily required to be transmitted and executes the erase mode when the device data is data having the second attribute that is not necessarily required to be transmitted. The communication control unit 2252 may execute the delay mode when the device data has the first attribute having a transmission frequency less than or equal to a prescribed threshold value and execute the erase mode when the device data has the second attribute having the transmission frequency greater than the prescribed threshold value. In this manner, the communication control unit 2252 can reduce an amount of data transmission in a state in which the communication terminal 2 is stopped without erasing the device data that is not desired to be erased by determining whether or not to erase the device data on the basis of the attribute of the device data.

The communication control unit 2252 may execute the delay mode or the erase mode on condition that an instruction has been received from the data management device 3 that manages the communication terminal 2 via the communication network N1. For example, even if the movement detection unit 2251 determines that the communication terminal 2 is moving, there is a possibility that congestion will occur when there are a large number of communication terminals 2 within a sector of one base station 5. Therefore, when there is a possibility that congestion will occur, the data management device 3 instructs the communication terminal 2 to operate in the delay mode or the erase mode and the communication control unit 2252 operates in the delay mode or the erase mode in accordance with the instruction. In contrast, the data management device 3 instructs the communication terminal 2 not to operate in the delay mode or the erase mode if there is no possibility that congestion will occur and the communication control unit 2252 operates in the same manner as that when the communication terminal 2 is moving even when the communication terminal 2 is stopped.

Meanwhile, when the communication terminal 2 moves and therefore a sector to which the communication terminal 2 belongs changes, a degree of congestion in the wireless communication circuit changes. Therefore, if the sector to which the communication terminal 2 belongs has been switched in the communication network N1, the communication control unit 2252 may determine whether or not to switch a process between when the movement detection unit 2251 determines that the communication terminal 2 is moving and when the movement detection unit 2251 determines that the communication terminal 2 is stopped.

For example, the communication control unit 2252 inquires the data management device 3 about a degree of congestion in the sector after switching at a point in time when the sector has been switched. The communication control unit 2252 is configured so that a process is switched between a case in which the communication terminal 2 is moving and a case in which the communication terminal 2 is stopped if the degree of congestion in the sector after switching is greater than or equal to a prescribed threshold value and the process is not switched between the case in which the communication terminal 2 is moving and the case in which the communication terminal 2 is stopped if the degree of congestion in the sector after switching is less than the prescribed threshold value. Thereby, the device data is transmitted to the data management device 3 as quickly as possible when the communication terminal 2 is located in a non-congested sector and it is possible to prevent congestion from occurring in advance when the communication terminal 2 is located in a congested sector.

The communication control unit 2252 may transmit position information including information for identifying a sector of the communication network N1 to which the communication terminal 2 belongs (e.g., identification information of the base station 5) to the data management device 3. At this time, information about the moving direction of the communication terminal 2 may be transmitted so that the data management device 3 can check that the sector is not frequently switched.

Also, the communication control unit 2252 may transmit position information to the data management device 3 when a prescribed time has elapsed from switching of the sector. Also, the communication control unit 2252 may transmit the position information on condition that the communication terminal 2 is moving in a fixed direction during a prescribed period after the sector is switched. Thereby, it is possible to prevent the communication control unit 2252 from frequently transmitting data for inquiring about the degree of congestion when the communication terminal 2 is located at a position where the sector is frequently switched.

The data management device 3 determines a timing at which the communication terminal 2 transmits the device data on the basis of the received information and transmits timing information indicating the determined timing to the communication terminal 2. Then, when the sector of the communication network N1 to which the communication terminal 2 belongs has been switched, the communication control unit 2252 transmits the device data at the timing indicated by the timing information, which is received from the data management device 3, for use after switching of the sector. Thereby, because the data management device 3 can accurately ascertain a position where the communication terminal 2 is scheduled to move, it is possible to determine a transmission timing suitable for a movement schedule of the communication terminal 2.

The communication control unit 2252 may transmit position information including a current position and a moving direction of the communication terminal 2 to the data management device 3 that manages the degree of congestion in the communication network N1 and acquire information indicating a degree of congestion in the wireless communication circuit in a movement destination of the communication terminal 2 identified on the basis of the position information from the data management device 3. Then, when the movement detection unit 2251 determines that the communication terminal 2 is stopped, the communication control unit 2252 may determine whether to execute the delay mode or the erase mode on the basis of information indicating a degree of congestion received from the data management device 3.

For example, when the degree of congestion is less than the threshold value, the communication control unit 2252 determines that a possibility that congestion will occur is low even when the device data is transmitted after transmission is delayed and executes the delay mode. When the congestion degree is greater than or equal to the threshold value, the communication control unit 2252 determines that there is a possibility that congestion will occur when the device data is transmitted after the transmission is delayed, and executes the erase mode in order to reduce the amount of data to be transmitted by erasing erasable data. Thereby, because it is possible to perform control in consideration of the degree of congestion in the wireless communication circuit at a movement destination of a car equipped with the communication terminal 2, it is possible to effectively prevent congestion from occurring.

The communication control unit 2252 may transmit the position information including the current position and the moving direction of the communication terminal 2 to the data management device 3 and acquire timing information including an instruction related to a timing at which the device data is transmitted from the data management device 3. Then, when the movement detection unit 2251 determines that the communication terminal 2 is stopped, the communication control unit 2252 may transmit device data at a timing indicated by the timing information transmitted from the data management device 3 in accordance with the transmission of the position information. Thereby, the data management device 3 can control a timing at which each communication terminal 2 transmits device data so that congestion does not occur on the basis of a result of estimating a degree of congestion in the future using scheduled movement positions of a large number of communication terminals 2.

In this case, the communication control unit 2252 may transmit, to the data management device 3, an attribute of device data scheduled to be transmitted or identification information of an application that outputs the device data. For example, the communication control unit 2252 transmits the presence or absence of real-time property of the device data to the data management device 3 and therefore the data management device 3 can set a transmission timing of the communication terminal 2 in which transmission of device data having real-time property is scheduled so that the transmission timing is earlier than a transmission timing of the communication terminal 2 in which transmission of device data having real-time property is not scheduled.

[Configuration of Data Management Device 3]

Figure 11:
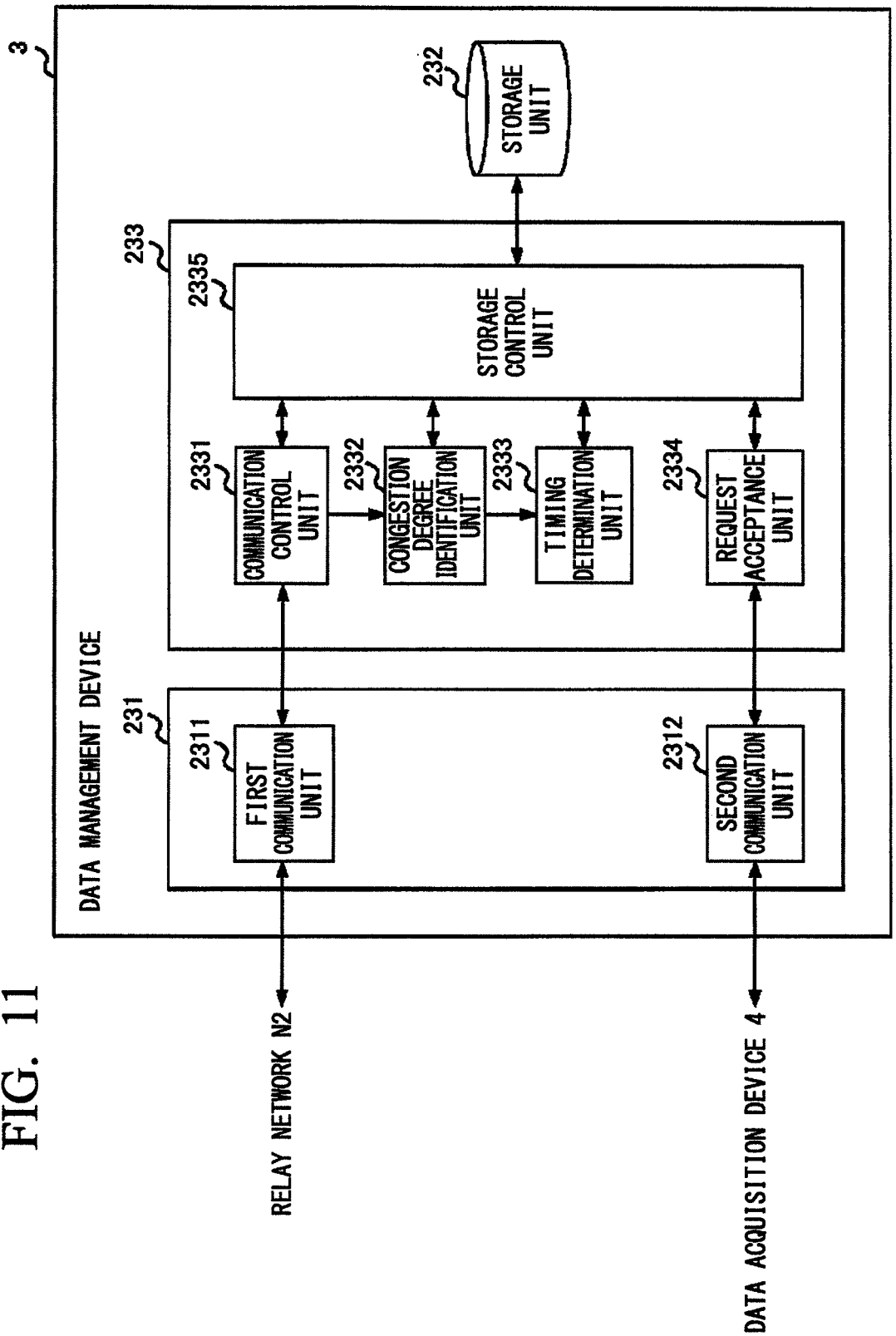
FIG. 11 is a diagram showing a configuration of a data management device according to the second embodiment.

FIG. 11 is a diagram showing a configuration of the data management device 3 according to the second embodiment. The data management device 3 includes a communication unit 231, a storage unit 232, and a control unit 233.

The communication unit 231 includes a first communication unit 2311 and a second communication unit 2312. The first communication unit 2311 is a communication interface for transmitting and receiving data to and from the communication terminal 2 via the communication network N1 and has, for example, a termination interface of a portable phone network. The first communication unit 2311 may have a LAN interface for connecting with a termination device of the portable phone network.

The second communication unit 2312 has a communication interface for transmitting and receiving data to and from the data acquisition device 4 via the relay network N2. The second communication unit 2312 is, for example, a LAN interface.

The storage unit 232 has storage media such as a ROM, a RAM, and a hard disk. The storage unit 232 stores a base station DB in which a base station ID of the base station 5, the number of communication terminals 2 accommodated by each base station 5, and a communication terminal ID that is identification information of the communication terminal 2 accommodated by the base station 5 are associated.

The base station DB according to the second embodiment is similar to the base station DB shown in FIG. 5 in the first embodiment. The number of accommodated terminals is the number of communication terminals 2 in a state of using the radio communication circuit provided by each base station 5. For example, the number of accommodated terminals varies with movement of the communication terminal 2 on the basis of control of a storage control unit 2335 to be described below.

Also, the storage unit 232 stores a communication terminal DB in which a communication terminal ID and a device ID that is identification information of the communication device 1 with which each communication terminal 2 can directly communicate without involving the base station 5 are associated.

A drawing showing an example of the communication terminal DB according to the second embodiment is similar to FIG. 6 according to the first embodiment. In the communication terminal DB, an application ID that is identification information of an application executable by the communication device 1 with which the communication terminal 2 can communicate and an amount of transmission data to be transmitted by each application during one data transmission operation are stored in association with a communication terminal ID.

Also, the storage unit 232 stores data transmitted by the plurality of communication devices 1 received from the communication terminal 2 in association with the device ID of the communication device 1. Furthermore, the storage unit 232 may store a data provision DB in which an acquirer ID of a data acquirer who accesses the data management device 3 via the data acquisition device 4 and a device ID and an application ID of a communication device 1 and an application registered as targets from which the data acquirer acquires the data are associated.

The control unit 233 is, for example, a CPU, and determines a timing at which each communication terminal 2 transmits data by executing a program stored in the storage unit 232.

By executing the program stored in the storage unit 232, the control unit 233 functions as a communication control unit 2331, a congestion degree identification unit 2332, a timing determination unit 2333, a request acceptance unit 2334, and a storage control unit 2335.

The communication control unit 2331 controls transmission and reception of data to and from the communication terminal 2. The communication control unit 2331 starts the reception of data from the communication terminal 2 by notifying the communication terminal 2 capable of communicating with the communication device 1 that outputs data to be provided to the data acquisition device 4 of an APN that is an address of a gateway of the communication network N1. The communication control unit 2331 acquires position information indicating a position of the communication terminal 2 from the communication terminal 2. The communication control unit 2331 may acquire position information including information indicating a direction in which the communication terminal 2 moves. The communication control unit 2331 functions as a transmission unit that transmits timing information indicating a first time and a second time determined by the timing determination unit 2333 to the communication terminal 2 via the first communication unit 2311.

The congestion degree identification unit 2332 identifies a degree of congestion in the communication network N1 on the basis of the position information indicating the position of the communication terminal 2 acquired from the communication control unit 2331. The congestion degree identification unit 2332 identifies a degree of congestion on the basis of the number of communication terminals 2 accommodated in the base station 5 corresponding to the sector to which the communication terminal 2 belongs, for example, by referring to the communication terminal DB. The congestion degree identification unit 2332 notifies the timing determination unit 2333 of the identified degree of congestion.

The timing determination unit 2333 determines a timing at which the communication terminal 2 transmits device data. For example, when the communication terminal 2 is moving, the timing determination unit 2333 determines a length of the first time that is a time from the reception of the device data by the communication terminal 2 to the transmission thereof. Also, when the communication terminal 2 is stopped, the timing determination unit 2333 determines a length of the second time that is a time from the reception of the device data by the communication terminal 2 to the transmission thereof. The timing determination unit 2333 determines the first time and the second time on the basis of a degree of congestion at a current position of the communication terminal 2 or a position of a scheduled movement destination identified by the congestion degree identification unit 2332.

The request acceptance unit 2334 accepts a request for selecting a communication device 1 and an application that are targets from which data is acquired from the data acquisition device 4. The request acceptance unit 2334 transmits a list of communication devices 1 and applications that are targets from which data is collected by the data management device 3 to the data acquisition device 4 via the second communication unit 2312.

When the data acquirer selects the communication device 1 and the application from which data is desired to be acquired from the list of communication devices 1 and applications displayed via the data acquisition device 4, the data acquisition device 4 transmits a data acquisition request including information (e.g., a device ID and an application ID) for identifying the selected communication device 1 and the selected application and an acquirer ID to the data management device 3. When the data acquisition request is received from the data acquisition device 4, the request acceptance unit 2334 performs registration in the data provision DB within the storage unit 232 by notifying the storage control unit 2335 of the acquirer ID, the device ID and the application ID included in the data acquisition request.

When a request for acquiring data from the data acquisition device 4 has been accepted, the request acceptance unit 2334 refers to the data provision DB stored in the storage unit 232 received via the communication network N1 and provides data transmitted by an application indicated in the request by transmitting the data to the data acquisition device 4. In the data provision DB, the acquirer ID corresponding to the data acquisition device 4 transmitting the data acquisition request and the device ID of the communication device that is a target from which data is provided to the data acquisition device 4 of the acquirer ID are associated. In the data provision DB, the application ID of the application that is a target from which data is provided to the data acquisition device 4 of the acquirer ID may be further associated.

The request acceptance unit 2334 may accept requests for selecting the same application to be executed by the same communication device 1 from a plurality of data acquisition devices 4. When the request acceptance unit 2334 has accepted the request for selecting the same application to be executed by the same communication device 1 from the plurality of data acquisition devices 4, the communication control unit 2331 provides the plurality of data acquisition devices 4 with data transmitted by the application indicated in the request among pieces of data received via the communication network N1.

The storage control unit 2335 writes data to the storage unit 232 or reads data stored in the storage unit 232 on the basis of instructions from the communication control unit 2331, the congestion degree identification unit 2332, the timing determination unit 2333, and the request acceptance unit 2334. For example, the timing determination unit 2333 causes the storage unit 232 to store the device data received from the communication terminal 2 by the communication control unit 2331 in association with the device ID and the application ID.

[Communication Sequence of Communication System S]

Figure 12:
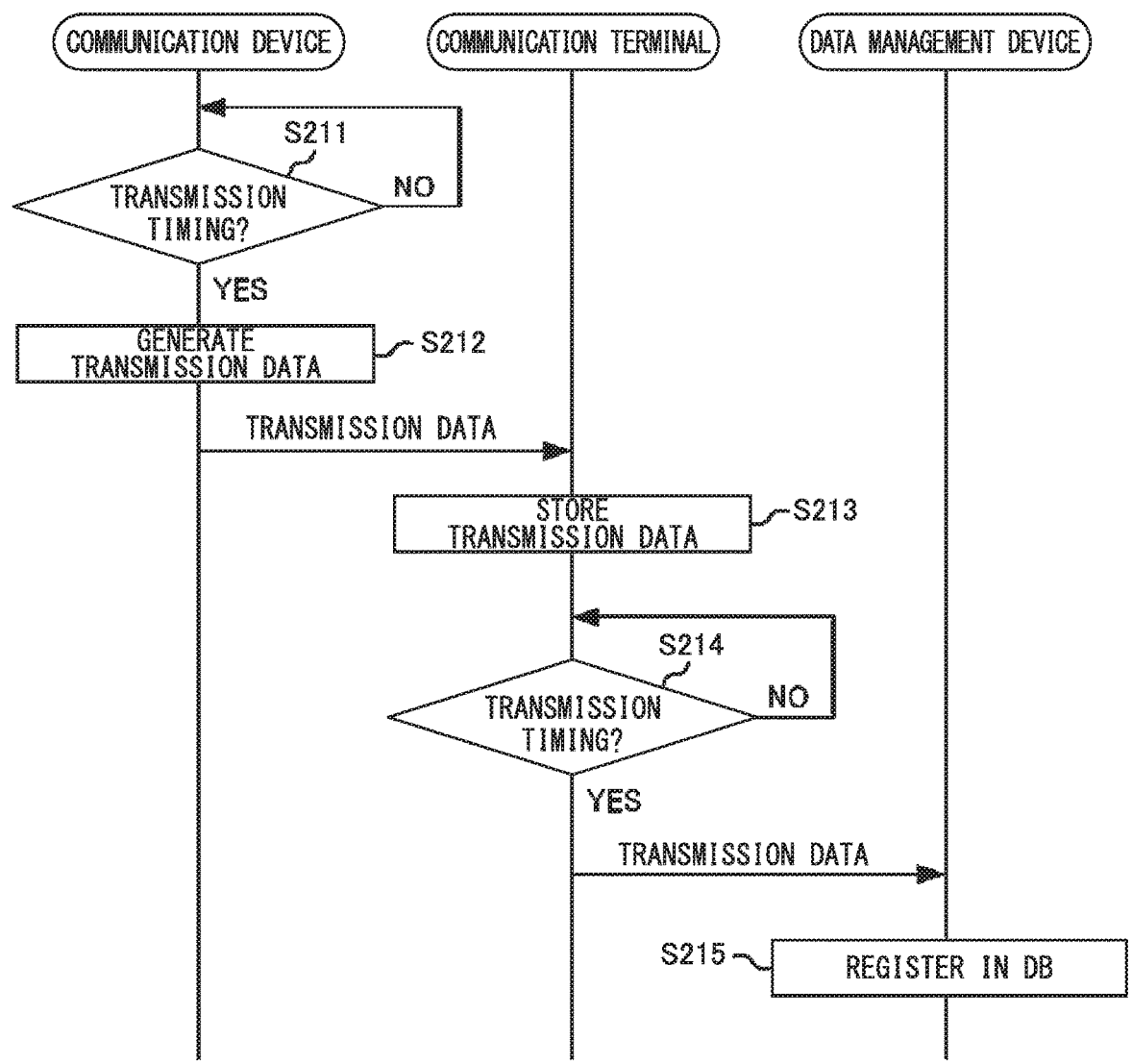
FIG. 12 is a diagram showing a communication sequence in the communication system of the second embodiment.

FIG. 12 is a diagram showing a communication sequence in the communication system S of the second embodiment.

First, when a timing at which the collected information is transmitted has been reached (YES in S211), the communication device 1 generates transmission data (S212) and the transmission data to the communication terminal 2. When the transmission data is received, the communication terminal 2 stores the received transmission data in the storage unit 224 (S213).

Subsequently, the communication terminal 2 checks whether or not a timing for data transmission to the data management device 3 has been reached (S214). Details of the processing of step S214 will be described below. When the timing for data transmission has been reached (YES in 8214), the communication terminal 2 transmits the stored data to the data management device 3. When the data is received, the communication control unit 2331 registers the received data in the data provision DB within the storage unit 232 in association with the communication terminal ID.

[Operation Flowchart of Communication Terminal 2]

Figure 13:
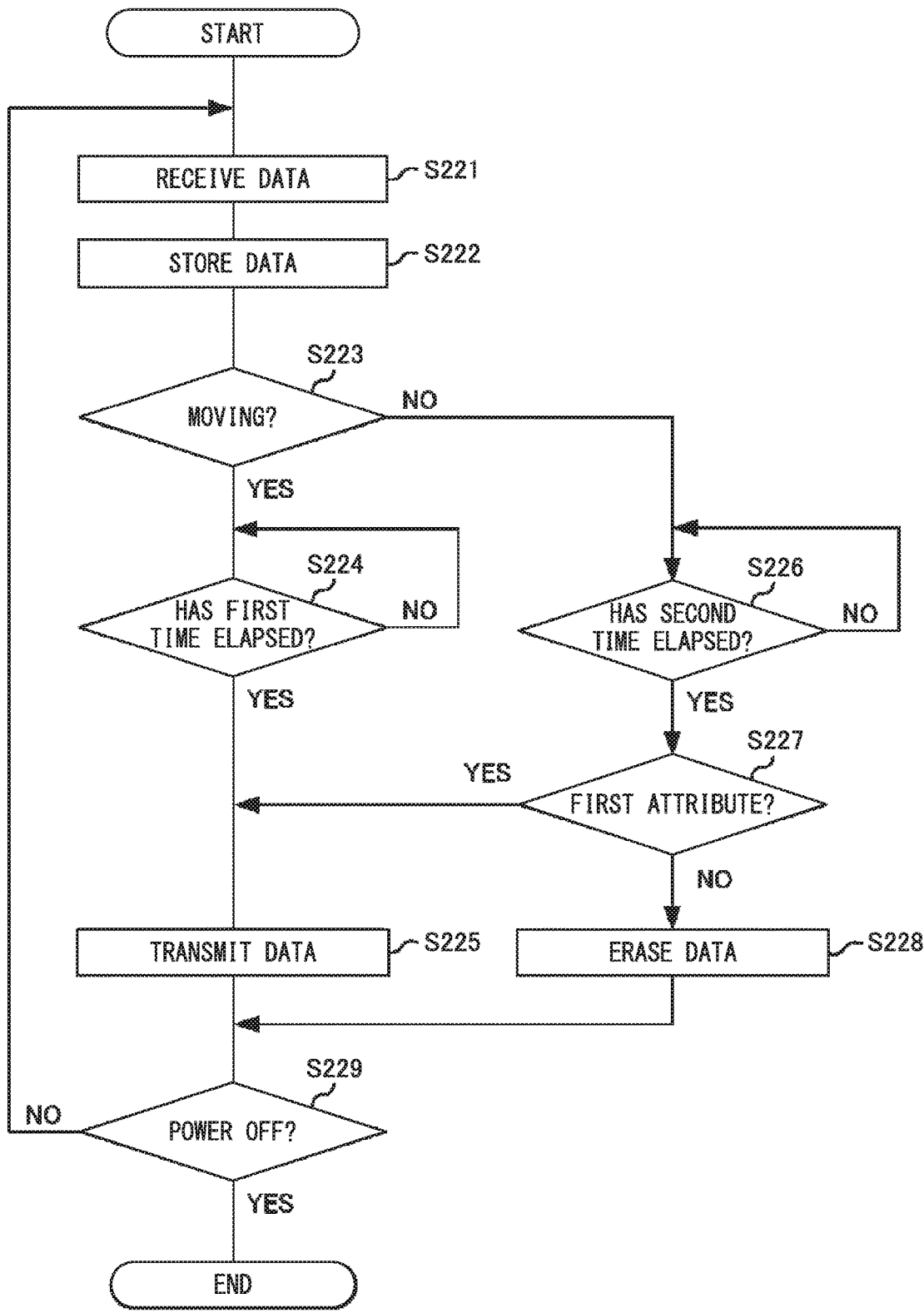
FIG. 13 is a diagram showing an operation flowchart of a communication terminal according to the second embodiment.

FIG. 13 is a flowchart of an operation of checking a timing at which the communication terminal 2 transmits data according to the second embodiment. When the device data is received from the communication device 1 (S221), the communication control unit 2252 temporarily stores the received device data in the storage unit 224 (S222).

Subsequently, the communication control unit 2252 determines whether or not the communication terminal 2 is moving on the basis of a result detected by the movement detection unit 2251 (S223). If the communication control unit 2252 determines that the communication terminal 2 is moving (YES in S223), the communication control unit 2252 monitors whether or not the first time has elapsed from reception of the device data (S224). When the first time has elapsed (YES in S224), the communication control unit 2252 transmits the device data stored in the storage unit 224 to the data management device 3 (S225).

If the communication control unit 2252 determines that the communication terminal 2 is not moving in step S223 (NO in S223), the communication control unit 2252 monitors whether or not the second time has elapsed from reception of the device data (S226). When the second time has elapsed, the communication control unit 2252 determines whether or not an attribute of the device data to be transmitted is the first attribute (S227).

If the device data to be transmitted has, for example, the first attribute in which it is necessary to transmit all data (YES in S227), the communication control unit 2252 transmits the device data to the data management device 3 (S225). If the device data to be transmitted is not the data of the first attribute (NO in S227), the communication control unit 2252 erases the device data stored in the storage unit 224 (S228). The communication control unit 2252 monitors whether or not an operation of turning off the power supply of the communication terminal 2 has been performed (S229) and the processing of steps S221 to S228 is iterated until the power is turned off (NO in S229).

[Effects of Communication System S]

In the conventional system, a case in which the sensor that transmits the data moves is not taken into consideration. A probability that a plurality of sensors will be present at the same position is lower when the sensor is moving than when the sensor is not moving. Therefore, when the sensor is moving, a probability that a large number of sensors will simultaneously transmit data to the same radio base station is relatively low. On the other hand, when the sensor is not moving, a probability that a large number of sensors will simultaneously transmit data to the same radio base station is high and a probability that a wireless communication network will be congested increases.

However, in the conventional system, a timing at which the sensor transmits data is determined without consideration of the movement of the sensor. Therefore, there is a problem in that data cannot be transmitted at a timing suitable for the state of the sensor. According to the second embodiment described above, it is possible to determine a transmission timing suitable for a case in which a communication terminal that transmits data moves.

In the communication system S of the second embodiment, the communication terminal 2 includes the movement detection unit 2251 for detecting whether or not the communication terminal 2 is moving. When the movement detection unit 2251 determines that the communication terminal 2 is moving, the communication control unit 2252 transmits the device data to the communication device 2 when the first time has elapsed from the reception of the device data transmitted by the communication device 1. Also, when the movement detection unit 2251 determines that the communication terminal 2 is stopped, the communication control unit 2252 executes the delay mode in which the device data is transmitted when the second time longer than the first time has elapsed from the reception of the device data or the erase mode in which the transmission of the device data is stopped.

Thereby, the communication terminal 2 can reduce a probability that data is transmitted while the communication terminal 2 is stopped. Therefore, in the communication system S, it is possible to reduce a probability that congestion occurs in the communication network N1 or the relay network N2 when a large number of communication terminals 2 simultaneously transmit data during traffic signal waiting or traffic congestion if the communication terminal 2 is mounted in a car.

Third Embodiment

[Configuration of Communication System S]

A drawing showing a configuration of a communication system S according to a third embodiment is similar to FIG. 1 according to the first embodiment. The communication system S includes a plurality of communication devices 1, a communication terminal 2, a data management device 3, and a data acquisition device 4. The communication terminal 2 can transmit device data received from the plurality of communication devices 1 to the data management device 3 via a communication network N1 and a relay network N2.

As described with reference to the first embodiment, the communication network N1 is a portable phone network and includes a plurality of base stations 5 (base stations 5a, 5b, and 5c in FIG. 1). Each of the plurality of base stations 5 is, for example, an eNodeB in LTE. Each of the plurality of base stations 5 is connected to a plurality of communication terminals 2 through a wireless communication circuit. The communication terminal 2 can transmit device data received from the communication device 1 to the data management device 3 using the wireless communication circuit provided from the base station 5.

The relay network N2 is a network including an EPC such as a PGW or an MME of LTE. A plurality of base stations 5 are connected to the relay network N2. For example, the relay network N2 is connected to the data management device 3 via the Internet.

The base station 5 temporarily releases the wireless communication circuit periodically so that the communication terminal 2 that does not transmit and receive data does not occupy the wireless communication circuit for a long time. Specifically, when a prescribed time (e.g., 24 hours) has elapsed from an RRC connected state after the start of wireless communication with the communication terminal 2, the base station 5 transitions to an RRC idle state. In the RRC idle state, the base station 5 cannot receive the data transmitted by the communication terminal 2 normally. Therefore, the communication system S is characterized in that control is performed so that the communication terminal 2 does not transmit the device data in the RRC idle state.

The communication device 1 is as described with reference to the first embodiment.

As described in the first embodiment, the communication terminal 2 receives a plurality of pieces of device data from a plurality of communication devices 1. The communication terminal 2 temporarily stores the received device data and transmits the stored device data to the communication network N1 at a timing indicated in a notification provided from the data management device 3, thereby transferring the device data to the data management device 3.

As described in the first embodiment, the data management device 3 is, for example, a server managed by a communication carrier that provides a service using the communication network N1. The data management device 3 provides the device data received from the communication terminal 2 to the data acquisition device 4 via the communication network N1 and the relay network N2.

The data management device 3 collects device data transmitted from the plurality of communication devices 1 via the communication terminal 2 and the communication network N1. The data management device 3 stores the received device data in a storage medium such as a hard disk, and transmits the device data itself or information generated on the basis of the device data to the data acquisition device 4 in response to a request from the data acquisition device 4 (4a, 4b, or 4c).

The data management device 3 manages a timing at which the communication terminal 2 transmits the device data. The data management device 3, for example, notifies the communication terminal 2 of a disconnection timing at which the base station 5 transitions to the RRC idle state. As will be described in detail below, the data management device 3 acquires information about a time from the RRC connected state of the plurality of base stations 5 to the RRC idle state and a period during which the RRC idle state continues and notifies the communication terminal 2 of a disconnection timing information indicating a timing at which the wireless communication circuit is disconnected on the basis of the acquired information.

The disconnection timing is, for example, a timing at which the RRC idle state starts, but may be a period from the start of the RRC idle state to the end of the RRC idle state. In this manner, the data management device 3 notifies the communication terminal 2 of the disconnection timing, so that it is possible to avoid the occurrence of packet lost because it is possible to prevent the communication terminal 2 from transmitting device data during a period when the base station 5 cannot receive the device data.

The data acquisition device 4 is as described in the first embodiment.

A flow of data in the communication system S according to the third embodiment is similar to FIG. 2 according to the first embodiment.

[Configuration of Communication Terminal 2]

Next, a configuration and an operation of the communication terminal 2 will be described.

Figure 14:
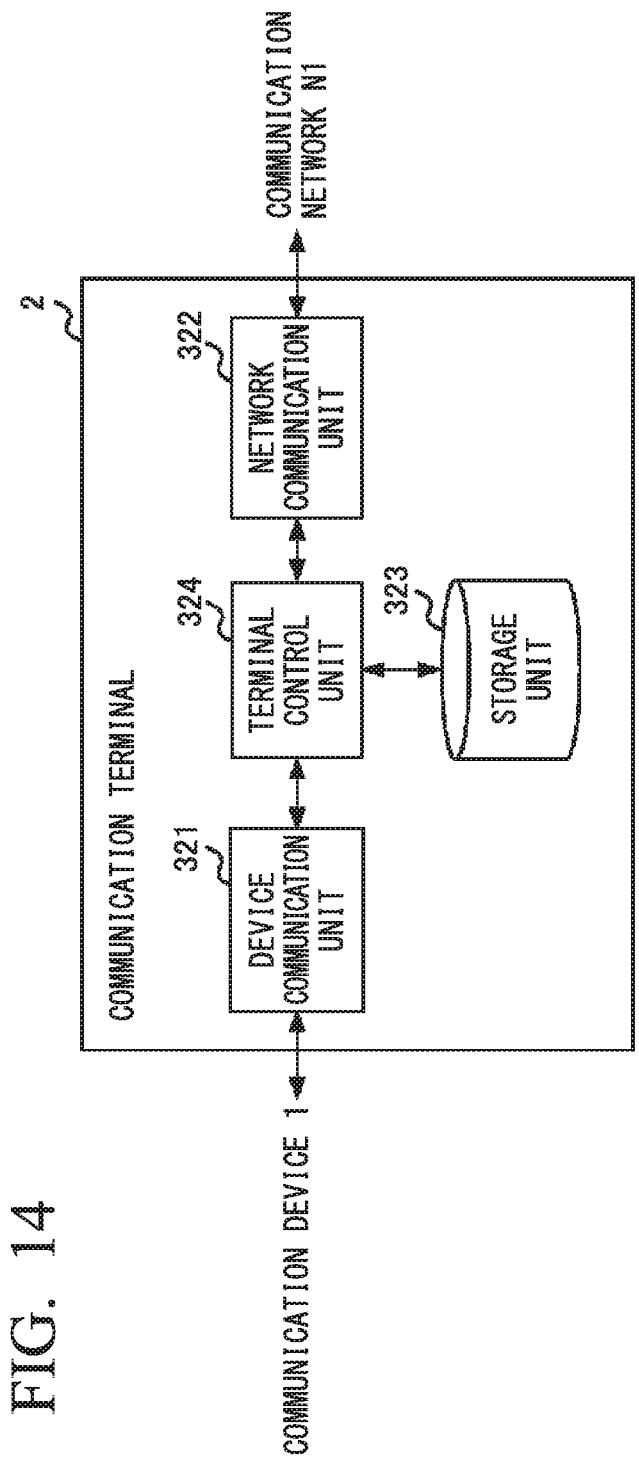
FIG. 14 is a diagram showing a configuration of a communication terminal according to a third embodiment.

FIG. 14 is a diagram showing the configuration of the communication terminal 2 according to the third embodiment. The communication terminal 2 includes a device communication unit 321, a network communication unit 322, a storage unit 323, and a terminal control unit 324.

The device communication unit 321 is a wireless communication interface for receiving data transmitted by the communication device 1.

For example, the network communication unit 322 is a wireless communication interface for exchanging data with the base station 5 of the communication network N1 in accordance with the LTE standard. For example, the network communication unit 322 transmits the data received from the communication device 1 to the communication network N1. Also, the network communication unit 322 receives timing information indicating a disconnection timing transmitted by a communication control unit 3332 (to be described below with reference to FIG. 15) via the communication network N1.

For example, the network communication unit 322 acquires a disconnection timing by receiving timing information (e.g., an inactive timer value of an eNodeB) included in signaling information that is connection processing information exchanged with the base station 5. The timing information includes, for example, a clock time at which the base station 5 is scheduled to transition to the RRC idle state. The timing information may include a period during which the RRC idle state continues after the base station 5 transitions to the RRC idle state. The communication system S can efficiently notify the communication terminal 2 of the disconnection timing by acquiring the timing information using the signaling information in this manner.

The storage unit 323 has storage media such as a ROM, a RAM, and a hard disk. The storage unit 323 stores programs to be executed by the terminal control unit 324. Also, the storage unit 323 stores the device data received from the communication device 1 in association with a device ID of the communication device 1 and a date and time received from the communication device 1 on the basis of control of the terminal control unit 324.

The terminal control unit 324 is, for example, a CPU, and executes various types of processes by executing a program stored in the storage unit 323. The terminal control unit 324 causes the storage unit 323 to store the device data received via the device communication unit 321. Also, the terminal control unit 324 also transmits the device data received by the device communication unit 321 via the wireless communication circuit at a timing other than the disconnection timing at which the base station 5 transitions to the RRC idle state received by the network communication unit 322.

Specifically, the terminal control unit 324 reads the device data stored in the storage unit 323 and transmits the read device data to the communication network N1 via the network communication unit 322 at a timing other than the disconnection timing indicated in a notification from the data management device 3. The terminal control unit 324 does not transmit the device data during a prescribed period from a clock time corresponding to the disconnection timing. When the network communication unit 322 has received information indicating a period during which the RRC idle state continues, the terminal control unit 324 causes the storage unit 323 to hold the device data without transmitting the device data during a disconnection period from the disconnection timing at which the state transitions to the RRC idle state to the end of a period during which the RRC idle state continues. Then, the terminal control unit 324 transmits the device data during a period other than the disconnection period.

To acquire the disconnection timing of the base station 5 in which the communication terminal 2 is accommodated, the terminal control unit 324 transmits sector information for identifying the base station 5 to which the communication terminal 2 belongs to the data management device 3. The terminal control unit 324 transmits sector information in accordance with a state in which the communication terminal 2 is powered on and can communicate with the base station 5 or in accordance with a change in the base station 5 accommodated by occurrence of a handover. To prevent the sector information from being frequently transmitted at a boundary position of the sector, the terminal control unit 324 transmits the sector information when a prescribed period has elapsed from switching of the sector. The prescribed period is a period determined on the basis of, for example, a moving speed or a moving direction of the communication terminal 2 and is a period when a probability that the communication terminal 2 will return to the sector before the handover is less than or equal to a prescribed threshold value.

The terminal control unit 324 may temporarily hold device data in the storage unit 323 without causing the device data received from the communication device 1 during a prescribed period before a disconnection timing received through a notification from the communication control unit 3332 (to be described below in FIG. 15) to be transmitted. The terminal control unit 324 determines the above-described prescribed period on the basis of, for example, a communication delay time between the communication terminal 2 and the base station 5.

Assuming that the disconnection timing is 00:00:00 and the communication delay time between the communication terminal 2 and the base station 5 is 500 milliseconds, the terminal control unit 324 does not transmit data during 500 milliseconds immediately before the disconnection timing of 00:00:00. Thereby, the RRC idle state is given while the device data transmitted by the communication terminal 2 is transmitted to the base station 5 and it is possible to prevent the device data from not reaching the base station 5.

The terminal control unit 324 may determine a prescribed period when no device data is transmitted before the disconnection timing on the basis of an amount of device data received from the communication device 1. For example, when the amount of device data received from the communication device 1 is 500 bytes and a transmission rate of the wireless communication circuit is 1 Mbps, $500/(1\times 106/8)=4$ milliseconds are required for transmitting 500-byte data. In this case, the terminal control unit 324 adds a communication delay time of 500 milliseconds thereto and does not transmit data for 504 milliseconds immediately before the disconnection timing of 00:00:00.

The terminal control unit 324 may determine a prescribed period during which no device data is transmitted before the disconnection timing on the basis of a total amount of device data received from all the communication devices 1 that performs direct communication. For example, the communication terminal 2 is assumed to receive device data from 100 communication devices 1. In this case, assuming that a maximum amount of device data transmitted by each communication device 1 is 500 bytes, a maximum value of the total amount of device data received from all the communication devices 1 is $500\times 100=50$ Kbytes. When the transmission rate of the wireless communication circuit is 1 Mbps, $50000/(1\times 106/8)=400$ milliseconds are required for transmitting 50-Kbyte data. In this case, the terminal control unit 324 adds a communication delay time of 500 milliseconds thereto and does not transmit data for 900 milliseconds immediately before the disconnection timing of 00:00:00.

Also, the terminal control unit 324 may determine a prescribed period with a length differing for each application in which the communication device 1 has transmitted device data. For example, if device data output by an image-related application outputting a relatively large amount of data has been received from the communication device 1, the terminal control unit 324 does not transmit device data during a first period immediately before the disconnection timing. If device data output by an application outputting a relatively small amount of data has been received from the communication device 1, the terminal control unit 324 does not transmit the device data during a second period shorter than the first period immediately before the disconnection timing. Thereby, because the terminal control unit 324 can transmit the device data at an appropriate timing in accordance with the application outputting the device data received by the device communication unit 321, it is possible to prevent a problem that the transmitted data does not reach a transmission destination from occurring while transmitting the device data as quickly as possible.

The terminal control unit 324 may transmit device data held in the storage unit 323 when a random time has elapsed from the end of the disconnection timing. For example, the terminal control unit 324 generates a random number on the basis of the communication terminal ID of the communication terminal 2 and transmits the device data when a time corresponding to the generated random number has elapsed from the end of the disconnection timing. Thereby, even when disconnection timings indicated in notifications provided to a large number of communication terminals 2 are the same timing, it is possible to avoid simultaneous transmission of information for a large number of communication terminals 2 to transition to the RRC connected state after the disconnection timing ends.

[Configuration of Data Management Device 3]

Figure 15:
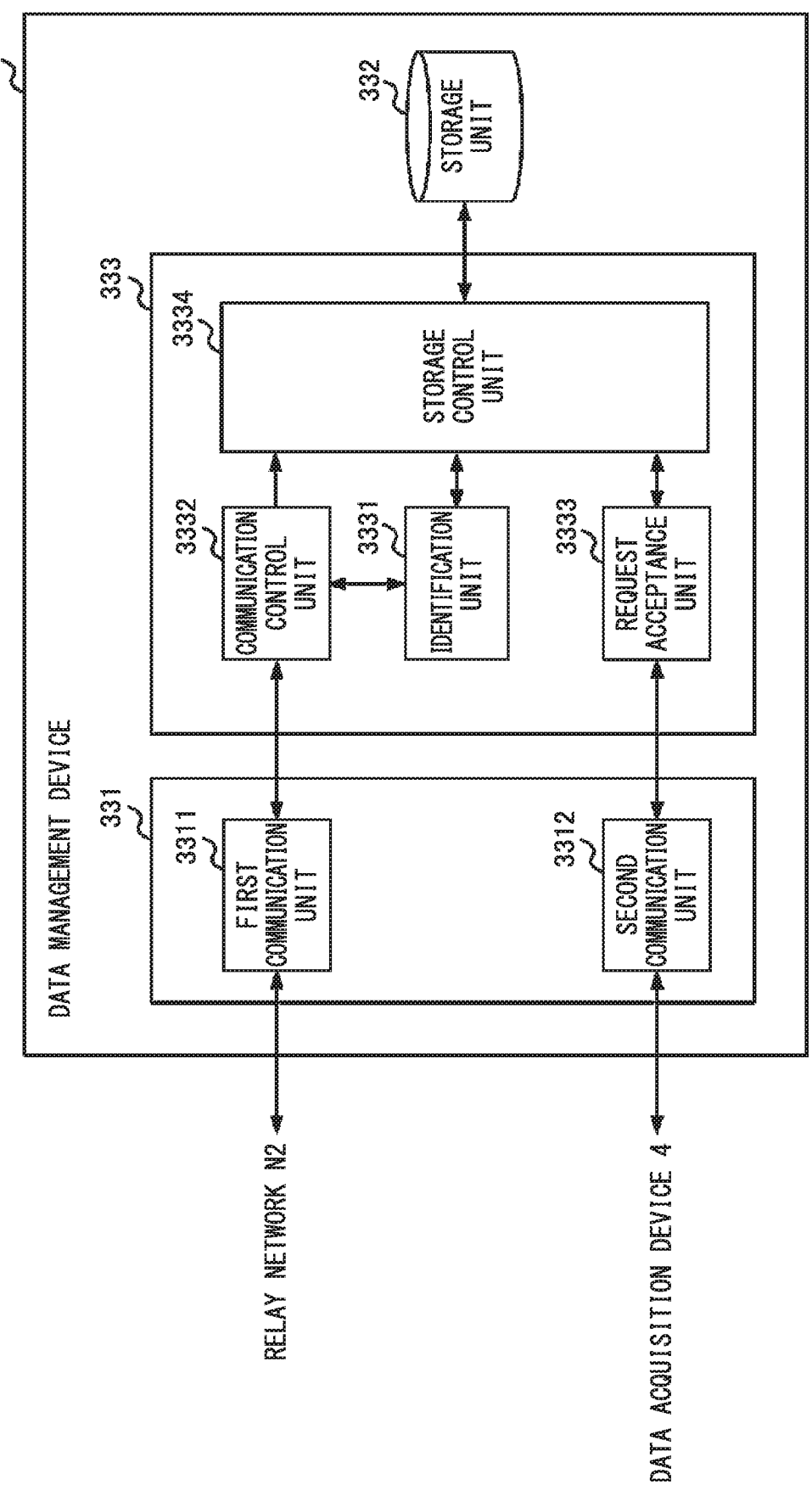
FIG. 15 is a diagram showing a configuration of a data management device according to the third embodiment.

FIG. 15 is a diagram showing a configuration of the data management device 3 according to the third embodiment. The data management device 3 includes a communication unit 331, a storage unit 332, and a control unit 333. The control unit 333 functions as an identification unit 3331, a communication control unit 3332, a request acceptance unit 3333, and a storage control unit 3334 by executing the program stored in the storage unit 332.

The communication unit 331 includes a first communication unit 3311 and a second communication unit 3312. The first communication unit 3311 is a communication interface for exchanging data with the communication terminal 2 via the relay network N2, and has, for example, a termination interface of a portable phone network. The first communication unit 3311 may have a LAN interface for connecting with a termination device of the portable phone network.

The second communication unit 3312 has a communication interface for exchanging data with the data acquisition device 4 via the relay network N2. The second communication unit 3312 is, for example, a LAN interface.

The storage unit 332 has storage media such as a ROM, a RAM, and a hard disk. The storage unit 332 stores a disconnection timing DB to be referred to when the identification unit 3331 identifies the disconnection timing.

FIG. 16 is a diagram showing an example of the disconnection timing DB according to the third embodiment. In the disconnection timing DB, identification information of the base station 5 (hereinafter referred to as a base station ID), a communication terminal ID that is identification information of the communication terminal 2 accommodated by each base station 5, a clock time at which the wireless communication circuit connected to each communication terminal 2 transitions to the RRC idle state, and a time in which the RRC idle state continues are associated. An RRC idle transition clock time is a clock time at which a prescribed time (e.g., 24 hours) determined for each base station 5 has elapsed from a clock time at which the communication terminal 2 has started communication with the base station 5.

Also, the storage unit 332 stores a communication terminal DB in which a communication terminal ID is associated with a device ID that is identification information of a communication device 1 with which each communication terminal 2 can directly communicate without involving the base station 5.

FIG. 17 is a diagram showing an example of the communication terminal DB according to the third embodiment. In the communication terminal DB, an application ID that is identification information of an application executable by the communication device 1 with which the communication terminal 2 can communicate and an amount of transmission data that is transmitted by each application during one data transmission operation are stored in association with a communication terminal ID.

In the example shown in FIG. 17, a case in which a communication terminal 2 having a communication terminal ID of 9001 receives data output by a communication device 1*a* having a device ID of 1001 and a communication device 1*b* having a device ID of 1002 is shown. The communication device 1*a* can execute an application having an application ID of a51 in which an amount of transmitted data is 10 bytes and an application having an application ID of a52 in which an amount of transmitted data is 20 bytes. The communication device 1*b* can execute an application having an application ID of a51 in which an amount of transmitted data is 10 bytes and an application having an application ID of a53 in which an amount of transmitted data is 45 bytes.

Also, the storage unit 332 stores data transmitted by the plurality of communication devices 1 received from the communication terminal 2 in association with the device ID of the communication device 1. Furthermore, the storage unit 332 may store a data provision DB in which an acquirer ID of a data acquirer who accesses the data management device 3 via the data acquisition device 4 and a device ID and an application ID of a communication device 1 and an application registered as targets from which the data acquirer acquires data are associated.

The control unit 333 is, for example, a CPU, and identifies a disconnection timing to be provided through a notification of each communication terminal 2 and notifies the communication terminal 2 of the identified disconnection timing, by executing a program stored in the storage unit 332.

For example, the identification unit 3331 requests the base station 5 to provide a clock time of transition to the RRC connected state related to the communication terminal 2 in accordance with reception of sector information for identifying the base station 5 to which the communication terminal 2 belongs from the communication terminal 2. When a clock time at which the communication terminal 2 transmitting the sector information has transitioned to the RRC connected state is acquired from the base station 5, the identification unit 3331 identifies the next clock time at which the base station 5 transitions to the RRC idle state related to the communication terminal 2 by adding a time until the base station 5 transitions to the RRC idle state to the acquired clock time. The identification unit 3331 registers the identified RRC idle transition clock time in the disconnection timing DB and notifies the communication control unit 3332 of the RRC idle transition time. The identification unit 3331 may further acquire an RRC idle duration time corresponding to the communication terminal 2 from the base station 5, register the acquired RRC idle duration time in the disconnection timing DB, and notify the communication control unit 3332 of the RRC idle duration time.

The communication control unit 3332 controls transmission and reception of data to and from the communication terminal 2. For example, the communication control unit 3332 notifies the communication terminal 2 of the RRC idle transition clock time in the base station 5 that communicates with the communication terminal 2 transmitting the sector information of the notification from the identification unit 3331. The communication control unit 3332 may further notify the communication terminal 2 of a period during which the base station 5 disconnects the wireless communication circuit with the communication terminal 2 transmitting the sector information. For example, the communication control unit 3332 provides a notification of a disconnection timing or a disconnection period using signaling information used for the connection control of the wireless communication circuit. The communication control unit 3332 starts reception of the data from the communication terminal 2 by notifying the communication terminal 2 of an APN that is an address of a gateway of the communication network N1.

The request acceptance unit 3333 accepts a request for selecting a communication device 1 and an application from which data is acquired from the data acquisition device 4. The request acceptance unit 3333 transmits a list of communication devices 1 and applications from which data is collected by the data management device 3 to the data acquisition device 4 via the second communication unit 3312.

When the data acquirer selects the communication device 1 and the application from which data is desired to be acquired from the list of communication devices 1 and applications displayed via the data acquisition device 4, the data acquisition device 4 transmits a data acquisition request including information (e.g., a device ID and an application ID) for identifying the selected communication device 1 and the selected application and an acquirer ID to the data management device 3. When the data acquisition request is received from the data acquisition device 4, the request acceptance unit 3332 performs registration in the data provision DB within the storage unit 332 by notifying the storage control unit 3334 of the acquirer ID, the device ID and the application ID included in the data acquisition request.

If a request for acquiring data from the data acquisition device 4 has been accepted, the request acceptance unit 3333 provides data transmitted by an application indicated in the request, received via the communication network N1, by transmitting the data to the data acquisition device 4 with reference to the data provision DB stored in the storage unit 332. In the data provision DB, the acquirer ID corresponding to the data acquisition device 4 transmitting the data acquisition request and the device ID of the communication device from which the data is provided to the data acquisition device 4 of the acquirer ID are associated. In the data provision DB, an application ID of an application that is a target from which data is provided to the data acquisition device 4 of the acquirer ID may further be associated.

The request acceptance unit 3333 may accept requests for selecting the same application to be executed by the same communication device 1 from the plurality of data acquisition devices 4. When the request acceptance unit 3333 has accepted requests for selecting the same application to be executed by the same communication device 1 from the plurality of data acquisition devices 4, the communication control unit 3332 provides the plurality of data acquisition devices 4 with data transmitted by the application indicated in the request among pieces of data received via the communication network N1.

The storage control unit 3334 writes data to the storage unit 332 or reads data stored in the storage unit 332 on the basis of instructions from the identification unit 3331, the communication control unit 3332, and the request acceptance unit 3333. For example, the storage control unit 3334 causes the storage unit 332 to store device data received from the communication terminal 2 by the communication control unit 3332 in association with the device ID and the application ID.

[Communication Sequence]

Figure 18:
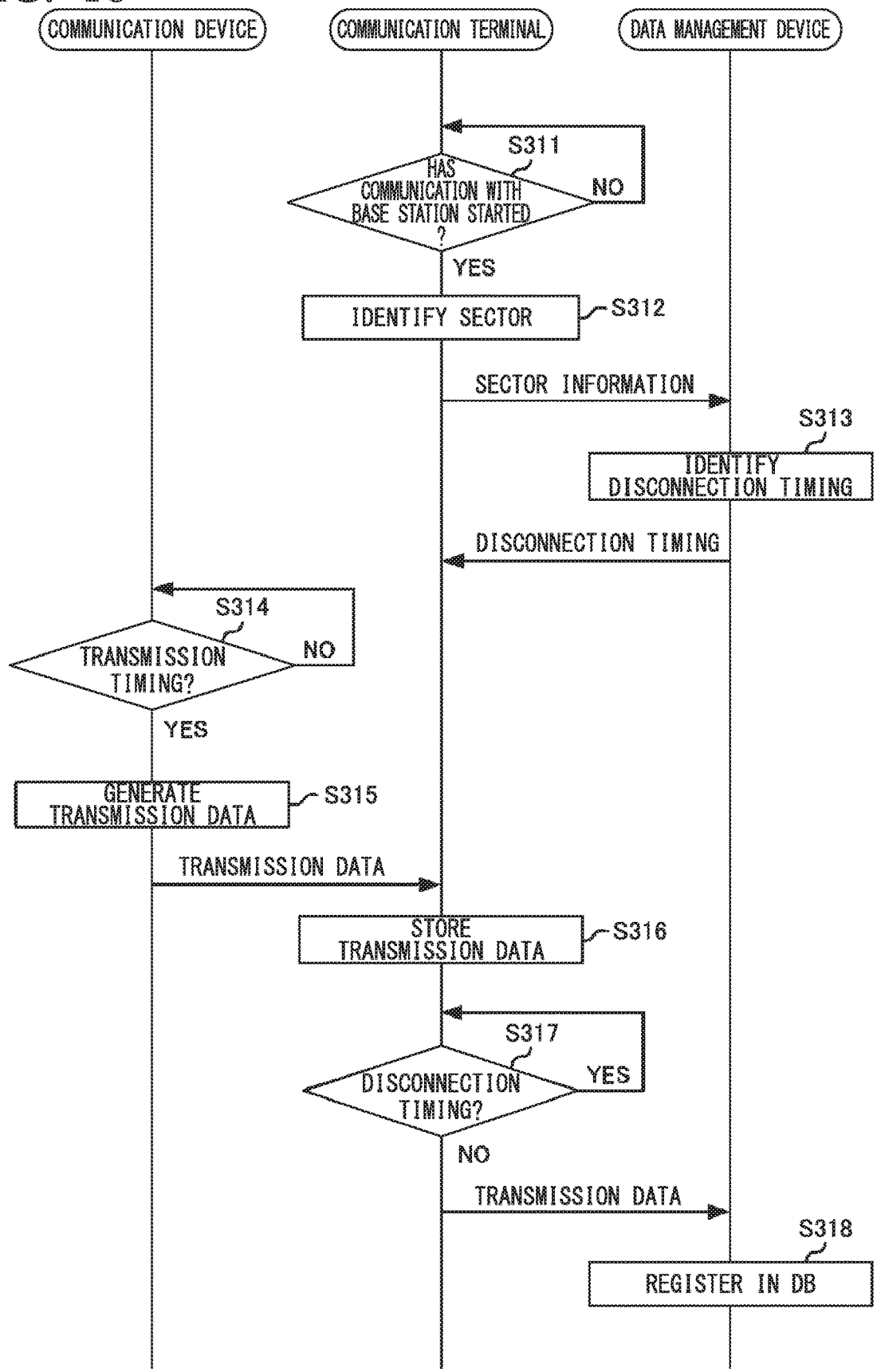
FIG. 18 is a diagram showing a communication sequence in a communication system of the third embodiment.

FIG. 18 is a diagram showing a communication sequence in the communication system S of the third embodiment.

First, the terminal control unit 324 of the communication terminal 2 monitors whether or not communication with a new base station 5 has started when the communication terminal 2 has been powered on or a handover has occurred (S311). When it is determined that the communication with the new base station 5 has started (YES in S311), the terminal control unit 324 of the communication terminal 2 identifies a sector of the base station 5 (S312) and transmits, for example, a base station ID, as information related to the identified sector to the data management device 3.

In the data management device 3, the identification unit 3331 acquires a clock time at which an RRC connected state related to the communication terminal 2 has been reached from the base station 5 and identifies a disconnection timing on the basis of acquired information (S313). The communication control unit 3332 transmits the disconnection timing identified by the identification unit 3331 to the communication terminal 2.

Thereafter, when a timing of transmission of collected information has been reached (YES in S314), the communication device 1 generates transmission data (S315) and transmits the transmission data to the communication terminal 2. When the transmission data is received, the terminal control unit 324 of the communication terminal 2 stores the received transmission data in the storage unit 323 (S316).

Subsequently, the terminal control unit 324 of the communication terminal 2 monitors whether or not a current clock time is a clock time within a prescribed range with respect to the disconnection timing (S317). When the terminal control unit 324 of the communication terminal 2 determines that the current clock time is not within the prescribed range with respect to the disconnection timing (NO in S317), the terminal control unit 324 of the communication terminal 2 transmits the transmission data stored in the storage unit 323 to the data management device 3. When the data is received, the communication control unit 3332 of the data management device 3 registers the received data in the data provision DB within the storage unit 332 in association with a communication terminal ID. When the terminal control unit 324 determines that the current clock time is within the prescribed range with respect to the disconnection timing in step S317, the terminal control unit 324 waits without transmitting the transmission data.

[Effects of Communication System S]

In a wireless communication network, a process of periodically disconnecting the wireless communication circuit is performed to prevent a state in which the wireless communication circuit is connected for a long period from continuing. In the conventional system, because the wireless communication circuit is not assumed to be disconnected in this manner, there is a problem in that data is transmitted at the timing when the wireless communication circuit is disconnected and some data cannot be collected. According to the third embodiment described above, it is possible to increase a probability that data transmitted by the communication terminal can be collected.

The data management device 3 according to the third embodiment acquires a timing related to communication of device data and transmits timing information indicating the timing to the communication terminal 2. Also, the communication terminal 2 receives the device data and the timing information and transmits the received device data via the wireless communication circuit on the basis of the timing information.

More specifically, in the communication system S of the third embodiment, the data management device 3 identifies a disconnection timing at which the communication terminal 2 and the base station 5 transition to the RRC idle state and notifies the communication terminal 2 of the identified disconnection timing. The communication terminal 2 transmits the device data received from the communication device 1 at a timing other than the disconnection timing provided through the notification. Thereby, because it is possible to prevent the loss of a packet including data transmitted by the communication terminal 2 from occurring, it is possible to increase a possibility that the data management device 3 can collect data transmitted by the communication terminal 2.

Fourth Embodiment

A fourth embodiment is different from the third embodiment in that the data management device 3 identifies a disconnection timing of the base station 5 in the third embodiment, whereas a communication terminal 2 identifies a disconnection timing of a base station 5 in the fourth embodiment.

A terminal control unit 324 of the communication terminal 2 according to the fourth embodiment identifies a disconnection timing that is a timing at which the base station 5 disconnects the wireless communication circuit and transmits device data received by the device communication unit 321 via the wireless communication circuit at a timing other than the identified disconnection timing. The communication terminal 2 identifies the disconnection timing according to the following procedure and transmits the device data at a timing other than the disconnection timing.

For example, when the RRC connected state has continued for a long time, the terminal control unit 324 acquires a time until the base station 5 transitions to the RRC idle state from the base station 5 and causes the storage unit 323 to store the acquired time. Then, the terminal control unit 324 estimates a clock time of transition to the RRC idle state as a disconnection timing by adding a time until the transition to the RRC idle state has been reached stored in the storage unit 323 to a clock time at which the RRC connected state related to the base station 5 has been initially reached after turning on a power to the communication terminal 2. The terminal control unit 324 executes a process as in the third embodiment on the basis of the estimated disconnection timing and transmits the device data at a time other than the disconnection timing.

As in the third embodiment, the terminal control unit 324 may temporarily hold the device data in the storage unit 323 without transmitting the device data received from the communication device 1 during a prescribed period before the disconnection timing and transmit the held device data after the disconnection timing ends and the RRC connected state is reached. Also, the terminal control unit 324 may determine a prescribed period on the basis of a communication delay time between the communication terminal 2 and the base station 5. Also, the terminal control unit 324 may determine a prescribed period on the basis of an amount of device data received from the communication device 1. Further, the terminal control unit 324 may determine a prescribed period as a length differing according to each application transmitting the device data in the communication device 1.

Fifth Embodiment

[Configuration of Communication System S]

The drawing showing a configuration of a communication system S according to a fifth embodiment is similar to FIG. 1 according to the first embodiment. The communication system S includes a plurality of communication devices 1, a communication terminal 2, a data management device 3, and a data acquisition device 4. The communication terminal 2 can transmit device data received from the plurality of communication devices 1 to the data management device 3 via a communication network N1 and a relay network N2.

A base station 5, the communication network N1, and the relay network N2 are as described in the first embodiment.

The communication device 1 is as described in the first embodiment.

The communication terminal 2 receives a plurality of pieces of device data from a plurality of communication devices 1. As will be described in detail below, the communication terminal 2 temporarily stores the received device data and transfers the device data to the data management device 3 by transmitting the stored device data to the communication network N1 at a timing determined on the basis of a state of the communication device 1.

As described in the first embodiment, the data management device 3 is, for example, a server managed by a communication carrier that provides a service using the communication network N1. The data management device 3 provides the device data received from the communication terminal 2 to the data acquisition device 4 via the communication network N1 and the relay network N2.

Specifically, the data management device 3 collects device data transmitted from the plurality of communication devices 1 via the communication terminal 2 and the communication network N1. The data management device 3 stores the received device data in a storage medium such as a hard disk, and transmits the device data itself or information generated on the basis of the device data to the data acquisition device 4 in response to a request from the data acquisition device 4 (4a, 4b, or 4c).

The data acquisition device 4 is as described in the first embodiment.

A flow of data in the communication system S in the fifth embodiment is similar to FIG. 2 according to the first embodiment.

Meanwhile, when there are a large number of communication terminals 2 accommodated in one base station 5 and furthermore there are a large number of communication devices 1 connected to the communication terminal 2, device data output from a large number of communication devices 1 is transmitted to the communication network N1. Because the communication network N1 is congested when a large amount of device data is transmitted at the same time, a case in which the communication terminal 2 stores the device data and transmits the stored device data during a time period when traffic of the communication network N1 is small is conceivable.

However, it is not preferable that device data required to be transmitted in real time be stored in the communication terminal 2 for a long time. For example, if there is a delay until device data related to an initial setting output by the communication device 1 is transmitted when the communication device 1 is installed and powered on, a person who monitors whether or not the installation has succeeded is required to wait for a long time until the device data is transmitted.

Therefore, the communication terminal 2 according to the present embodiment is characterized in that device data required to be promptly transmitted can be quickly transmitted, for example, as at an initial setting time, by controlling a priority for transmitting the device data in accordance with the state of the communication device 1. For example, when the communication device 1 has initially transmitted the device data to the communication terminal 2 after turning on the power, the communication terminal 2 transmits the device data initially transmitted to the communication terminal 2 after the communication device 1 is installed to the communication network N1 with a priority higher than that of device data transmitted by the communication device 1 after power failure recovery after the initial setting is completed.

Hereinafter, a configuration of the communication terminal 2 will be described in detail.

[Configuration of Communication Terminal 2]

Next, a configuration and an operation of the communication terminal 2 will be described.

Figure 19:
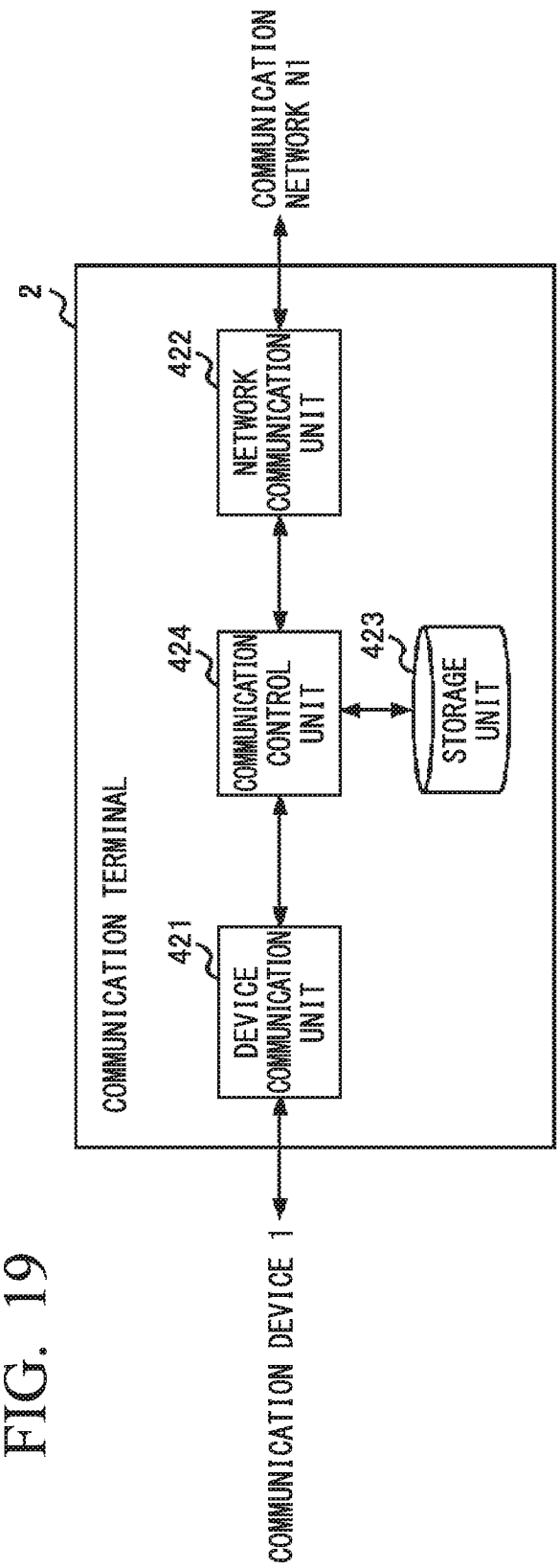
FIG. 19 is a diagram showing a configuration of a communication terminal according to a fifth embodiment.

FIG. 19 is a diagram showing the configuration of the communication terminal 2 according to the fifth embodiment. The communication terminal 2 includes a device communication unit 421, a network communication unit 422, a storage unit 423, and a communication control unit 424.

The device communication unit 421 is a wireless communication interface for receiving data transmitted by the communication device 1.

The network communication unit 422 is a wireless communication interface for transmitting data received from the communication device 1 to the communication network N1.

For example, the network communication unit 422 can transmit and receive data to and from the base station 5 of the communication network N1 in accordance with an LTE standard.

The storage unit 423 has storage media such as a ROM, a RAM, and a hard disk. The storage unit 423 stores a communication program to be executed by the communication control unit 424. Also, the storage unit 423 stores device data received from the communication device 1 in association with a device ID of the communication device 1 and a date and time received from the communication device 1 on the basis of control of the communication control unit 424.

Further, the storage unit 423 stores a reception history indicating that the device communication unit 421 has received prescribed data transmitted by the communication device 1 in an initial state.

FIG. 20 is a diagram showing an example of a reception history DB stored in the storage unit 423 according to the fifth embodiment. In the reception history DB, a state flag indicating whether or not each of a plurality of communication devices 1 with which the communication terminal 2 can communicate is in an initial state is associated with a device ID.

The storage unit 423 stores a flag of 0 indicating the initial state in association with the device ID for identifying the communication device 1 until the device communication unit 421 receives device data transmitted from the communication device 1 at the initial setting time. After the device communication unit 421 receives the device data transmitted at the initial setting time from the communication device 1, the storage unit 423 stores a flag of 1 indicating a state in which the initial setting is completed in association with the device ID.

The communication control unit 424 is, for example, a CPU, and executes various types of operations by executing a communication program stored in the storage unit 423. The communication control unit 424 identifies the state of the communication device 1. The communication control unit 424 causes the storage unit 423 to store device data received via the device communication unit 421 and transmits device data stored in the storage unit 423, i.e., device data received by the device communication unit, to the communication network N1 with a priority according to the identified state of the communication device 1.

For example, the communication control unit 424 determines whether the communication device 1 is in an initial state or a non-initial state on the basis of the device data received from the communication device 1 by the device communication unit 421. Then, when it is determined that the communication device 1 is in the initial state, the communication control unit 424 transmits the device data at a timing earlier than that when the state determination unit determines that the communication device 1 is in the non-initial state.

When a reception history indicating that the device data transmitted at the initial setting time has been received is not stored in the storage unit 423 at a point in time when the device communication unit 421 has received prescribed data from the communication device 1 (e.g., when the flag is 0), the communication control unit 424 determines that the communication device 1 is in the initial state. The communication control unit 424 may determine that the communication device 1 is in the initial state when the device ID is not stored in the storage unit 423.

The communication control unit 424 may identify the application of the communication device 1 transmitting the device data and determine that the communication device 1 is in the initial state when the identified application is an application to be executed by the communication device 1 in the initial state. The communication control unit 424 transmits the device data output by the application executed by the communication device 1 in the initial state in a priority higher than that of the device data output by the application executed by the communication device 1 in the non-initial state.

For example, when the communication control unit 424 determines that the device data received by the device communication unit 421 is data to be transmitted in the initial state, the communication control unit 424 transmits the device data within the first time from reception of the device data. When the communication control unit 424 determines that the device data received by the device communication unit 421 is data that is not transmitted in the initial state, the device data is transmitted when the second time longer than the first time has elapsed from the reception of the device data. Thereby, it is possible to preferentially transmit the device data transmitted in a state in which the initial setting of the communication device 1 is not completed and it is possible to reduce a probability that the communication network N1 will be congested.

The communication control unit 424 may determine a priority on the basis of a combination of a device ID of the communication device 1 and an application ID of the application outputting the device data. For example, when the device data output by the application to be used in the initial setting from the communication device 1 in which the device ID is not stored in the storage unit 423 has been received, the communication control unit 424 sets a priority higher than that when other device data has been received.

When it is identified that an abnormality has occurred in the communication device 1, the communication control unit 424 may increase the priority of the device data received from the communication device 1. For example, when the device data received from the communication device 1 is data indicating occurrence of an abnormal state, the communication control unit 424 transmits the received data in a priority higher than that of data that does not indicate occurrence of an abnormal state. Thereby, a manager of the communication device 1 can quickly recognize that an abnormality has occurred in the communication device 1.

The communication control unit 424 may determine the priority on the basis of a time period during which the device data is transmitted. For example, the communication control unit 424 determines whether or not to transmit the device data in a priority according to a state of the communication device 1 during each time period on the basis of a degree of congestion of each time period of the wireless communication circuit. For example, the communication control unit 424 may determine the priority on the basis of the state of the communication device 1 during a time period when a degree of congestion in the communication network N1 is greater than or equal to a prescribed value or a time period when a frequency at which transmitted data is required to be retransmitted is greater than or equal to a prescribed value and transmit device data without changing the priority according to the state of the communication device 1 during other time periods.

Furthermore, if there are a plurality of pieces of device data having the same priority during a time period when device data is transmitted in a priority according to the state of the communication device 1, the communication control unit 424 may transmit each piece of device data at a random timing within a prescribed time range. Also, when there are a plurality of pieces of device data having the same priority, the communication control unit 424 may combine a plurality of pieces of device data to transmit the device data. Thereby, for example, because it is possible to prevent a large number of packets from being transmitted to the communication network N1 when a large number of communication devices 1 in which initial settings are not completed are simultaneously activated, it is possible to minimize occurrence of congestion.

Also, the communication control unit 424 may determine the priority on the basis of a radio wave state of a frequency band used in the wireless communication circuit during a period from the reception of the device data to the transmission of the device data. For example, the communication control unit 424 determines the priority on the basis of the state of the communication device 1 when a S/N ratio of radio waves to be used is less than a prescribed threshold value and transmits device data without changing the priority according to the state of the communication device 1 during other time periods. Thereby, the communication terminal 2 can quickly transmit device data with a high priority even when the radio wave state is bad.

Also, although an example in which the communication device 1 uses the initial setting state as the state of the communication device 1 has been mainly described above, the communication terminal 2 can use various other states as the state of the communication device 1. For example, the communication terminal 2 may increase the priority when the device data indicating that the communication device 1 has moved is transmitted from the communication device 1 assumed not to have moved. Thereby, for example, a data acquirer who is monitoring the state of the vending machine can quickly detect that money within the vending machine has been stolen due to the vibration of the communication device 1 installed in the vending machine.

[Configuration of Data Management Device 3]

Figure 21:
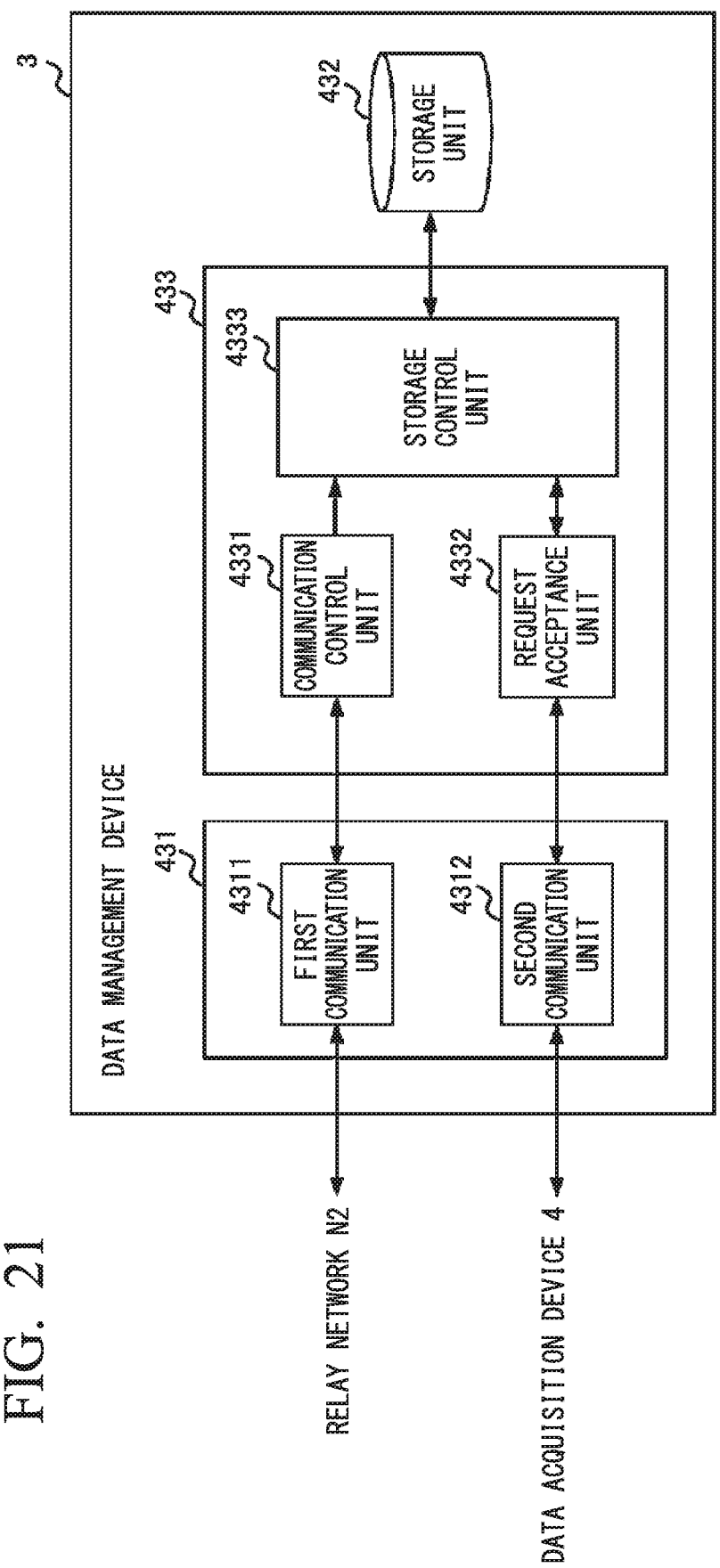
FIG. 21 is a diagram showing a configuration of a data management device according to the fifth embodiment.

FIG. 21 is a diagram showing a configuration of the data management device 3 according to the fifth embodiment. The data management device 3 includes a communication unit 431, a storage unit 432, and a control unit 433.

The communication unit 431 includes a first communication unit 4311 and a second communication unit 4312. The first communication unit 4311 is a communication interface for transmitting and receiving data to and from the communication terminal 2 via the communication network N1 and has, for example, a termination interface of a portable phone network. The first communication unit 4311 may have a LAN interface for connecting with a termination device of the portable phone network.

The second communication unit 4312 has a communication interface for transmitting and receiving data to and from the data acquisition device 4 via the relay network N2. The second communication unit 4312 is, for example, a LAN interface.

The storage unit 432 has storage media such as a ROM, a RAM, and a hard disk. The storage unit 432 stores a communication terminal DB in which the communication terminal ID is associated with the device ID of the communication device 1 with which each communication terminal 2 can directly communicate without involving the base station 5.

A drawing showing an example of the communication terminal DB according to the fifth embodiment is similar to FIG. 6 according to the first embodiment. In the communication terminal DB, an application ID that is identification information of an application executable by the communication device 1 with which the communication terminal 2 can communicate and an amount of transmission data to be transmitted by each application during one data transmission operation are stored in association with a communication terminal ID.

Also, the storage unit 432 stores data transmitted by the plurality of communication devices 1 received from the communication terminal 2 in association with the device ID of the communication device 1. Furthermore, the storage unit 432 may store a data provision DB in which an acquirer ID of a data acquirer who accesses the data management device 3 via the data acquisition device 4 and a device ID and an application ID of a communication device 1 and an application registered as targets from which the data acquirer acquires the data are associated.

The control unit 433 is, for example, a CPU, and determines a timing at which each communication terminal 2 transmits data by executing a program stored in the storage unit 432.

The control unit 433 includes a communication control unit 4331, a request acceptance unit 4332, a storage control unit 4333, and a timing determination unit 4334.

The communication control unit 4331 controls transmission and reception of data to and from the communication terminal 2. The communication control unit 4331 starts the reception of data from the communication terminal 2 by notifying the communication terminal 2 capable of communicating with the communication device 1 that outputs data to be provided to the data acquisition device 4 of an APN that is an address of a gateway of the communication network N1. Also, the communication control unit 4331 functions as a transmission unit that transmits timing information indicating a timing determined by the timing determination unit 4333 to the communication terminal 2 via the first communication unit 4311.

The request acceptance unit 4332 accepts a request for selecting a communication device 1 and an application that are targets from which data is acquired from the data acquisition device 4. The request acceptance unit 4332 transmits a list of communication devices 1 and applications that are targets from which data is collected by the data management device 3 to the data acquisition device 4 via the second communication unit 4312.

When the data acquirer selects the communication device 1 and the application from which data is desired to be acquired from the list of communication devices 1 and applications displayed via the data acquisition device 4, the data acquisition device 4 transmits a data acquisition request including information (e.g., a device ID and an application ID) for identifying the selected communication device 1 and the selected application and an acquirer ID to the data management device 3. When the data acquisition request is received from the data acquisition device 4, the request acceptance unit 4332 performs registration in the data provision DB within the storage unit 432 by notifying the storage control unit 4333 of the acquirer ID, the device ID and the application ID included in the data acquisition request.

When a request for acquiring data from the data acquisition device 4 has been accepted, the request acceptance unit 4332 refers to the data provision DB stored in the storage unit 432 and provides data transmitted by an application indicated in the request, received via the communication network N1, by transmitting the data to the data acquisition device 4. In the data provision DB, the acquirer ID corresponding to the data acquisition device 4 transmitting the data acquisition request and the device ID of the communication device that is a target from which data is provided to the data acquisition device 4 of the acquirer ID are associated. In the data provision DB, the application ID of the application that is a target from which data is provided to the data acquisition device 4 of the acquirer ID may be further associated.

The request acceptance unit 4332 may accept requests for selecting the same application to be executed by the same communication device 1 from a plurality of data acquisition devices 4. When the request acceptance unit 4332 has accepted the request for selecting the same application to be executed by the same communication device 1 from the plurality of data acquisition devices 4, the communication control unit 4331 provides the plurality of data acquisition devices 4 with data transmitted by the application indicated in the request among pieces of data received via the communication network N1.

The storage control unit 4333 writes data to the storage unit 432 or reads data stored in the storage unit 432 on the basis of instructions from the communication control unit 4331 and the request acceptance unit 4332. For example, the storage control unit 4333 causes the storage unit 432 to store the device data received from the communication terminal 2 by the communication control unit 4331 in association with the device ID and the application ID.

[Communication Sequence in Communication System S]

Figure 22:
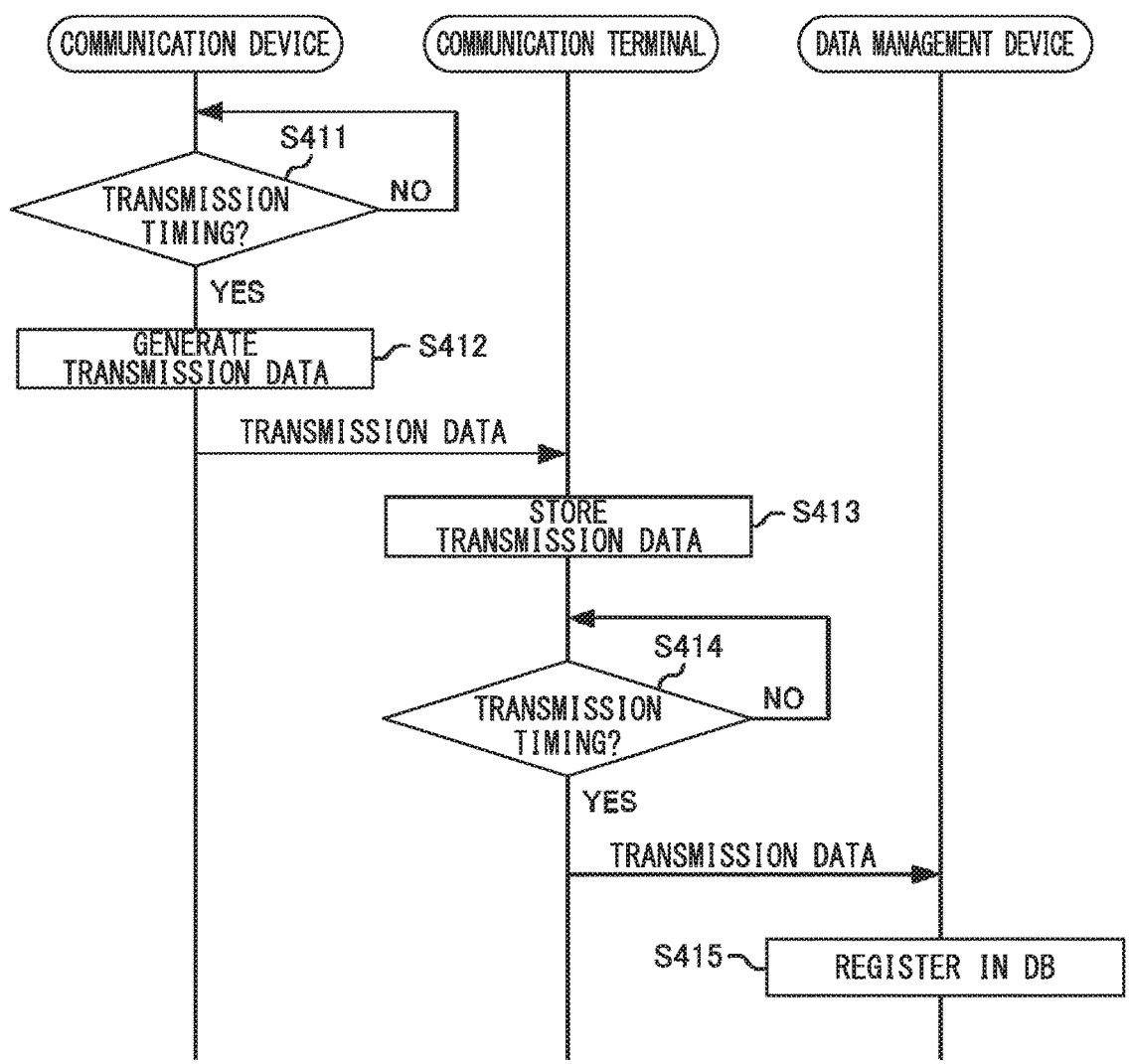
FIG. 22 is a diagram showing a communication sequence in a communication system of the fifth embodiment.

FIG. 22 is a diagram showing a communication sequence in a communication system S of the fifth embodiment.

First, when a timing of transmission of collected information has been reached (YES in S411), the communication device 1 generates transmission data (S412) and transmits the transmission data to the communication terminal 2. When the transmission data is received, the communication terminal 2 stores the received transmission data in the storage unit 423 (S413).

Subsequently, the communication terminal 2 checks whether or not a timing for data transmission to the data management device 3 has been reached (S414). Details of the processing of step S414 will be described below. When the timing for data transmission has been reached (YES in S414), the communication terminal 2 transmits the stored data to the data management device 3. When the data is received, the communication control unit 4331 registers the received data in the data provision DB within the storage unit 432 in association with the communication terminal ID.

[Operation Flowchart of Communication Terminal 2]

Figure 23:
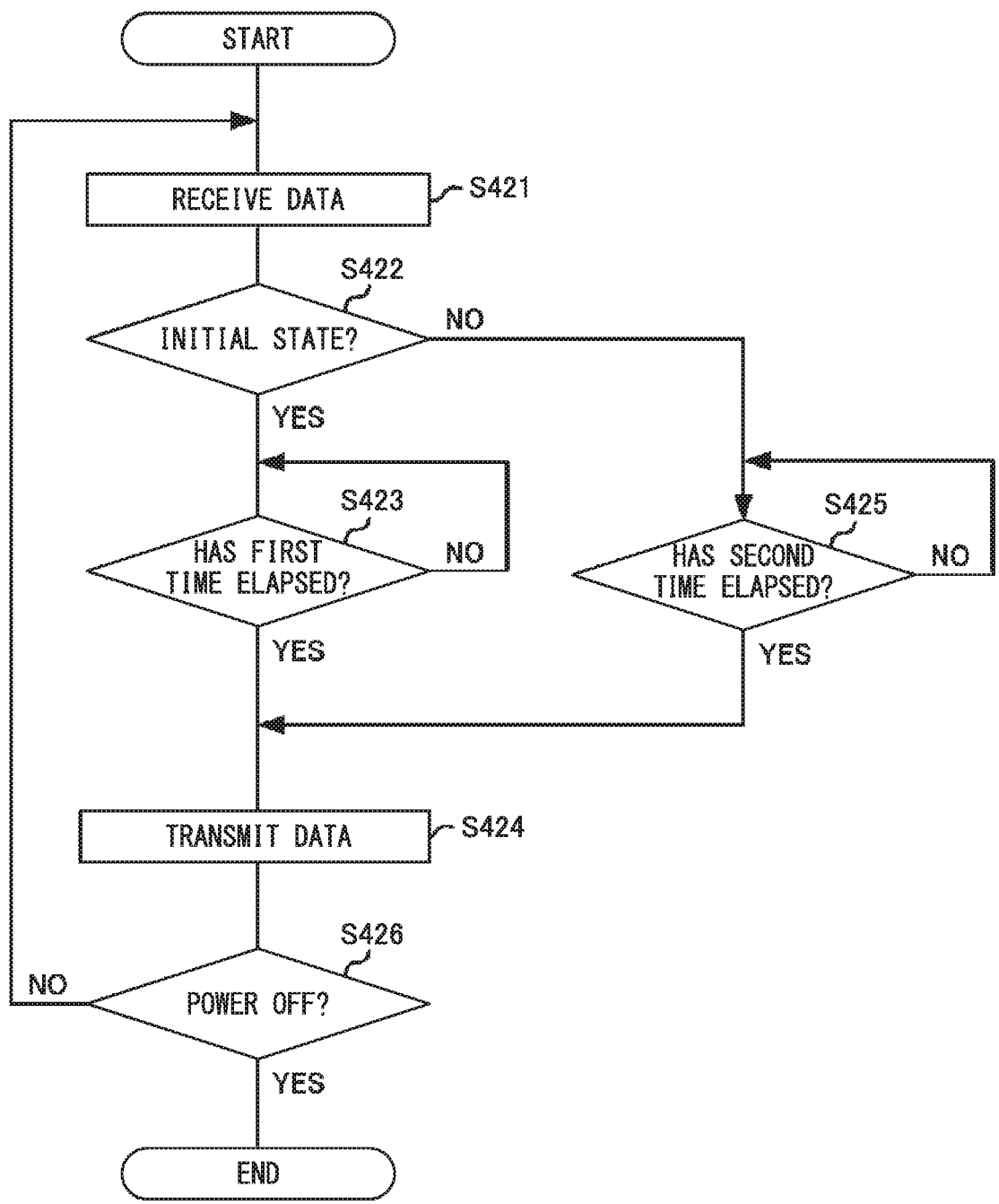
FIG. 23 is a flowchart of an operation in which a communication terminal processes device data in the fifth embodiment.

FIG. 23 is a flowchart of an operation in which the communication terminal 2 processes device data. When device data is received from the communication device 1 (S421), the communication control unit 424 identifies the state of the communication device 1 in any one of the above methods. For example, the communication control unit 424 determines whether or not the communication device 1 is in an initial state (S422).

If the communication control unit 424 determines that the communication device 1 is in the initial state (YES in S422), the communication control unit 424 monitors whether or not the first time has elapsed from reception of the device data (S423) and transmits the received device data to the communication network N1 (S424) when the first time has elapsed (YES in S423). Also, the first time may be zero. That is, when the communication device 1 is in the initial state, the communication control unit 424 may transmit the device data to the communication network N1 without waiting after reception of the device data.

If the communication control unit 424 determines that the communication device 1 is not in the initial state (NO in S422), the communication control unit 424 monitors whether or not a second time longer than the first time has elapsed from the reception of the device data (S425) and transmits the received device data to the communication network N1 (S424) when the second time has elapsed (YES in S425).

The communication control unit 424 iterates the operations of steps S421 to S425 until the operation of turning off the power supply of the communication terminal 2 is performed (NO in step S426).

[Advantageous Effects of Communication Terminal 2]

When the communication terminal transmits data to the management device that collects data, importance or a priority of the data differs according to a state of the communication terminal. For example, although the priority of data is high because it is necessary to quickly provide a notification indicating that the installation has been completed normally immediately after the communication terminal is installed, the priority of data is low while data is constantly transmitted.

However, because a case in which the priority of data differs according to the state of the communication terminal is not taken into account in the conventional system, there is a problem in that data transmission is delayed to prevent the timing from overlapping a timing at which another communication terminal transmits data even when the communication terminal intends to transmit high-priority data. According to the fifth embodiment described above, data can be transmitted at a timing suitable for the state of the communication terminal.

The communication terminal 2 according to the fifth embodiment includes a device communication unit 421 configured to receive the device data output by the communication device 1 and a communication control unit 424 configured to identify the state of the communication device 1 and transmit device data received by the device communication unit 421 in a priority according to the identified state to the wireless communication circuit. According to such a configuration of the communication terminal 2, the communication device 1 can quickly check the device data when a state in which it is necessary to quickly check the device data output by the communication device 1 is reached.

Sixth Embodiment

[Configuration of Communication System S]

The drawing showing the configuration of the communication system S according to the sixth embodiment is similar to FIG. 1 according to the first embodiment. The communication system S includes a plurality of communication devices 1, a communication terminal 2, a data management device 3, and a data acquisition device 4. The communication terminal 2 can transmit device data received from the plurality of communication devices 1 to the data management device 3 via a communication network N1 and a relay network N2.

A base station 5, the communication network N1, and the relay network N2 are as described in the first embodiment. The communication device 1 is also as described in the first embodiment.

The communication terminal 2 receives a plurality of pieces of device data from a plurality of communication devices 1. As will be described in detail below, the communication terminal 2 temporarily stores the received device data and transfers device data to the data management device 3 by transmitting the stored device data to the communication network N1 after the device data is stored until a prescribed amount set in association with at least either the communication device 1 or an attribute of the device data has been reached.

As described in the first embodiment, the data management device 3 is, for example, a server managed by a communication carrier that provides a service using the communication network N1. The data management device 3 provides the device data received from the communication terminal 2 to the data acquisition device 4 via the communication network N1 and the relay network N2.

Specifically, the data management device 3 collects device data transmitted from the plurality of communication devices 1 via the communication terminal 2 and the communication network N1. The data management device 3 stores the received device data in a storage medium such as a hard disk and transmits the device data itself or information generated on the basis of the device data to the data acquisition device 4 in response to a request from the data acquisition device 4 (4a, 4b, or 4c).

The data acquisition device 4 is as described with reference to the first embodiment.

A flow of data in the communication system S according to the sixth embodiment is similar to FIG. 2 according to the first embodiment.

Meanwhile, when there are a large number of communication terminals 2 accommodated in one base station 5 and there are a large number of communication devices 1 connected to the communication terminal 2, the device data output by a large number of communication devices 1 is transmitted to the communication network N1. When the communication terminal 2 transmits data to the base station 5, it is necessary to transmit various types of additional information such as a transmission destination address and a transmission source address in addition to data to be transmitted. Therefore, when each communication device 1 periodically outputs a small amount of device data and the communication terminal 2 transmits the received device data to the communication network N1 every time device data is received from a large number of communication devices 1, a ratio of the amount of additional information to the amount of data to be transmitted increases. As a result, even though an amount of data transmission itself is small, a resource occupancy rate of the wireless communication circuit increases. As a result, a probability that an occurring of congestion in the communication network N1 increases.

Therefore, the communication terminal 2 according to the present embodiment temporarily stores the device data received from a large number of communication devices 1, combines the stored device data into one-packet data, and then transmits the one-packet data to the base station 5. Thereby, a resource occupancy rate of the wireless communication circuit per unit amount of the device data to be transmitted is reduced and it is possible to prevent congestion from occurring in the communication network N1.

[Configuration of Communication Terminal 2]

Next, a configuration and an operation of the communication terminal 2 will be described.

Figure 24:
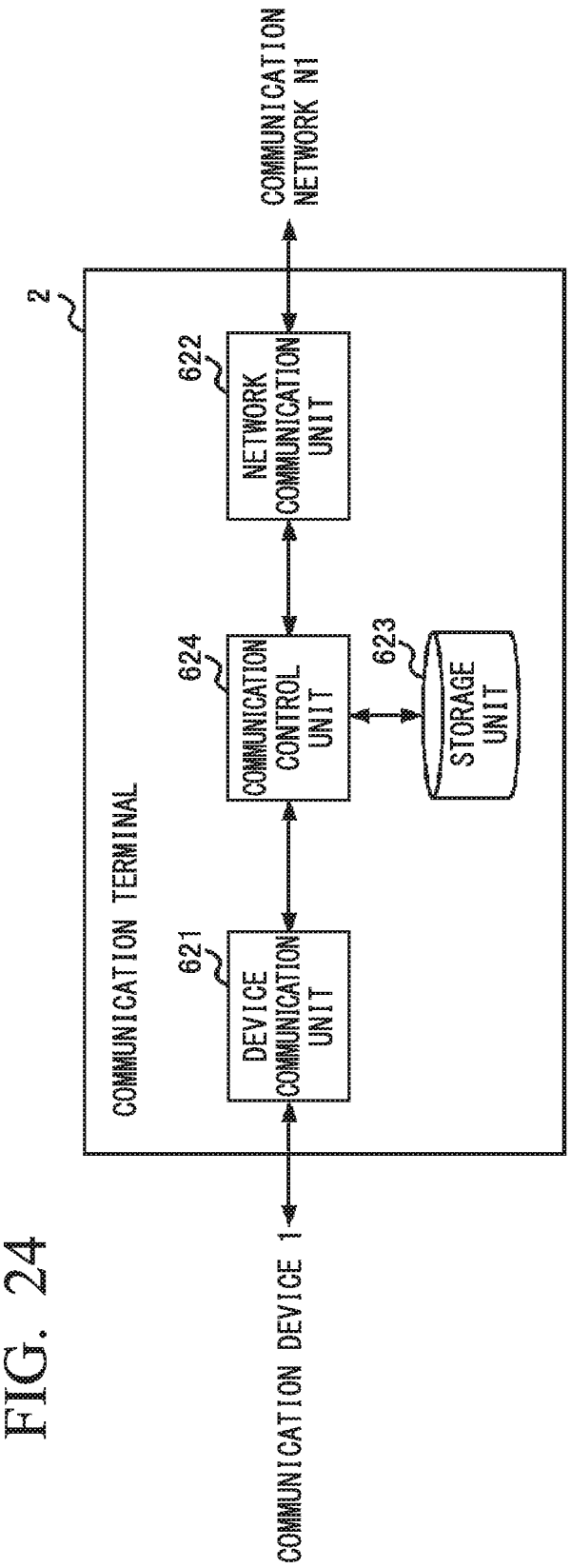
FIG. 24 is a diagram showing a configuration of a communication terminal according to a sixth embodiment.

FIG. 24 is a diagram showing the configuration of the communication terminal 2 according to the sixth embodiment. The communication terminal 2 includes a device communication unit 521, a network communication unit 522, a storage unit 523, and a communication control unit 524.

The device communication unit 521 is a wireless communication interface for receiving data transmitted by the communication device 1.

The network communication unit 522 is a wireless communication interface for transmitting the data received from the communication device 1 to the communication network N1. The network communication unit 522 can transmit and receive data to and from the base station 5 of the communication network N1 in accordance with, for example, an LTE standard.

The storage unit 523 has storage media such as a ROM, a RAM, and a hard disk. The storage unit 523 stores a program for communication to be executed by the communication control unit 524. Also, the storage unit 523 stores the device data received from the communication device 1 in association with a device ID of the communication device 1 and a date and time received from the communication device 1 on the basis of control of the communication control unit 524. Also, the storage unit 523 stores various types of information to be used by the communication control unit 524 to determine an amount of device data to be stored before the device data received from the communication device 1 is transmitted.

The communication control unit 524 is, for example, a CPU, and executes a communication program stored in the storage unit 523 to operate the communication terminal 2. The communication control unit 524 transmits the stored device data after the device data is stored in the storage unit 523 until a prescribed amount set in association with the communication device 1 outputting the device data has been reached. The prescribed amount is determined on the basis of, for example, a relationship between a resource occupancy rate of the wireless communication circuit and a transmission delay time and may be referred to as an amount of buffering in the following description. The resource occupancy rate is a ratio of an amount of transmission of the device data to an average total amount of use of the wireless communication circuit.

The communication control unit 524 transmits the stored device data to the communication network N1 after the device data is stored in the storage unit 523 until a total amount of the device data of the plurality of packets stored in the storage unit 523 or the total number of packets including the device data stored in the storage unit 523 reaches a prescribed amount.

Figures 25, 26:
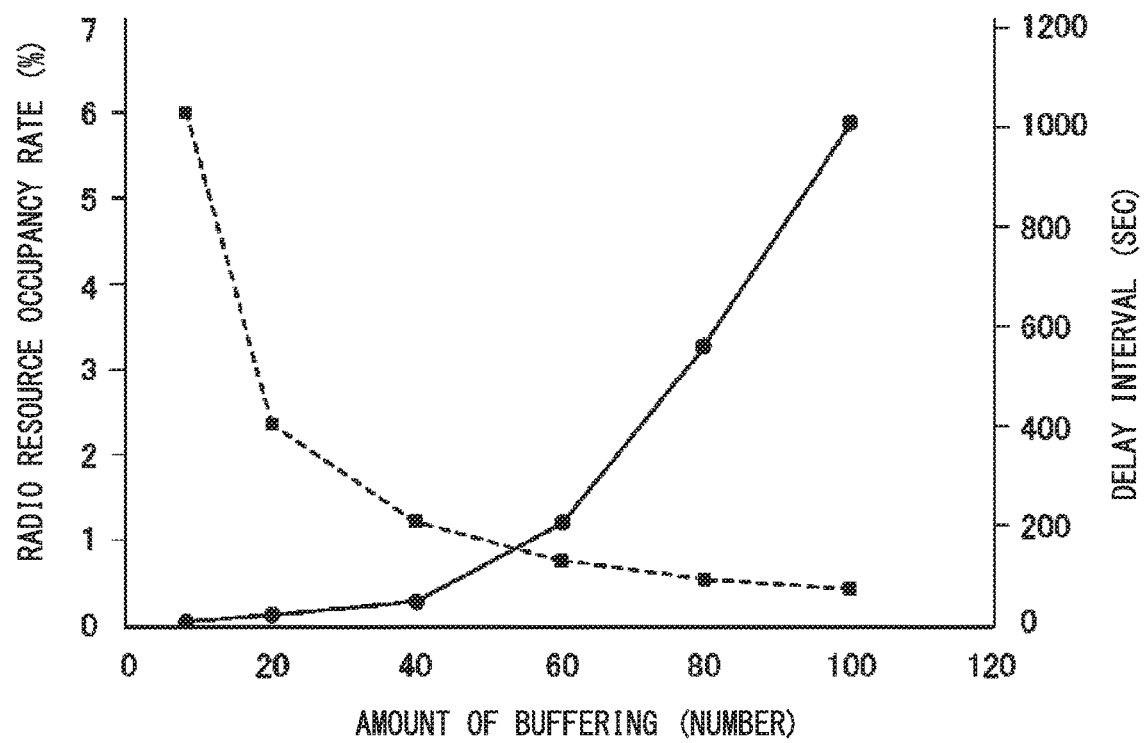
FIG. 25 is a table showing an example of a relationship between an amount of device data stored by a communication terminal 2 and a radio resource occupancy rate in the sixth embodiment.
FIG. 26 is a diagram showing an example of a relationship between an amount of buffering and a radio resource occupancy rate and a relationship between an amount of buffering and a delay time in the sixth embodiment.

FIG. 25 is a table showing an example of a relationship between an amount of device data stored by the communication terminal 2 (an amount of buffering) and a radio resource occupancy rate in the sixth embodiment. FIG. 26 is a diagram showing an example of the relationship between the amount of buffering and the radio resource occupancy rate and the relationship between the amount of buffering and the delay time according to the sixth embodiment. A solid line in FIG. 26 indicates a delay time until device data is transmitted to the communication network N1 after the communication terminal 2 receives device data. A broken line indicates a resource occupancy rate.

In FIG. 25, the amount of buffering, the transmission interval, the number of transmissions per hour, and the radio resource occupancy rate are associated. As the amount of buffering increases, an interval at which the communication terminal 2 transmits data to the communication network N1 increases and the number of transmissions per hour decreases. As a result, it can be seen that the radio resource occupancy rate decreases.

According to FIG. 26, it can be seen that the delay time exponentially increases as the amount of buffering increases. In contrast, it can be seen that the resource occupancy rate exponentially decreases as the amount of buffering increases. Therefore, the communication control unit 524 can reduce the resource occupancy rate while minimizing the delay time by using an appropriate amount of buffering determined on the basis of the resource occupancy rate and the delay time.

For example, the communication control unit 524 determines the amount of buffering on the basis of a maximum delay time indicated in a notification from the data management device 3 on the basis of a request of the data acquirer. The communication control unit 524 may determine the amount of buffering on the basis of a maximum resource occupancy rate indicated in a notification from the data management device 3 on the basis of a request of the communication carrier. The communication control unit 524 may determine the amount of buffering so that both the maximum delay time and the maximum resource occupancy rate indicated in the notification from the data management device 3 can be satisfied.

However, the attribute of the device data transmitted by the communication device 1 is not uniform and there are device data with a relatively large allowable delay time and device data with a relatively small allowable delay time. Also, there are a communication device 1 that outputs a small volume of device data at a high frequency, a communication device 1 that outputs a large volume of device data at a low frequency. Therefore, the communication control unit 524 controls the amount of buffering on the basis of the communication device 1 or the attribute of the device data and the like. Hereinafter, a method of controlling the amount of buffering in the communication control unit 524 will be described in detail.

When the frequency at which the communication device 1 outputs the device data is high and the transmission interval is short, the delay time may not excessively long even if the communication device 1 waits until a relatively large amount of device data is stored. Therefore, for example, after the device data is stored in the storage unit 523 until a prescribed amount set on the basis of the frequency at which the communication device 1 outputs the device data has been reached, the communication control unit 524 transmits the stored device data. The communication control unit 524 increases the amount of received device data stored in the storage unit 523 as the frequency at which the communication device 1 outputs the device data increases. Thereby, the communication control unit 524 can maintain the resource occupancy rate so that the resource occupancy rate is less than or equal to the prescribed value while preventing the delay time from excessively increasing.

The communication control unit 524 may transmit the stored device data after the device data is stored in the storage unit 523 until a prescribed amount set on the basis of the attribute of the device data has been reached. For example, the communication control unit 524 can make a delay time of high-priority device data less than a delay time of low-priority device data by making an amount of buffering for device data set to a high priority less than an amount of buffering for device data set to a low priority.

Here, if the device communication unit 521 receives a plurality of device data from a plurality of communication devices 1, the communication control unit 524 may transmit a plurality of pieces of device data before device data is stored until a prescribed amount has been reached when high-priority device data is included in the plurality of pieces of device data received by the device communication unit 521 within a prescribed period. For example, the communication control unit 524 sets the amount of buffering to a preset standard amount (e.g., 50) when device data that does not have high priority is received and assumes that high-priority device data has been received. In this case, even if the amount of device data stored in the storage unit 523 at that point in time is less than the standard amount, the communication control unit 524 combines the device data stored in the storage unit 523 and the received device data for transmission at a point in time when the high-priority device data has been received. Thereby, it is possible to set a delay time of high-priority device data to a minimum time while reducing the resource occupancy rate.

The communication control unit 524 may determine the amount of buffering on the basis of details of the device data received by the device communication unit 521. For example, when device data is data whose amount is less than a prescribed value as in a sensor signal, the communication control unit 524 causes the storage unit 523 to store the device data until a first amount of buffering has been reached. When device data is data whose amount is greater than a prescribed value as in image data, the communication control unit 524 causes the storage unit 523 to store the device data until a second amount of buffering less than the first amount of buffering has been reached. Because the communication control unit 524 can set a size of a packet to be transmitted to the communication network N1 within a prescribed range by performing control in this manner, it is possible to stably maintain the resource occupancy rate within the prescribed range.

The communication control unit 524 may transmit the stored device data after the device data is stored in the storage unit 523 until a prescribed amount determined for each of a plurality of applications executable by the communication device 1 has been reached. For example, the communication control unit 524 refers to a table showing a relationship between an application ID and an amount of buffering pre-stored in the storage unit 523 and causes device data to be stored until an amount of buffering corresponding to an application outputting received device data has been reached.

When a plurality of pieces of device data output by a plurality of applications from the communication device 1 have been sequentially received, the communication control unit 524 causes device data to be stored in different regions of the storage unit 523 for each application. At a point in time when an amount of device data stored for each application has reached the amount of buffering corresponding to the application, the stored device data is transmitted to the communication network N1. Thereby, the communication terminal 2 can maintain the resource occupancy rate within an appropriate range while transmitting data with a delay time suitable for the application.

Even when the amount of buffering is determined for each application, when device data output by a first application among the plurality of applications is stored in the storage unit 523 until an amount of buffering corresponding to the first application has been reached, the communication control unit 524 may be configured to transmit device data output by another second application among a plurality of applications through the same packet. At this time, the communication control unit 524 may be configured to simultaneously transmit device data of the second application on condition that a sum of a total amount of device data output by the first application and a total amount of data of the second application stored at that point in time is less than or equal to a prescribed threshold value. Thereby, the communication terminal 2 can effectively reduce the resource occupancy rate while transmitting data within a delay time range required for each application.

Meanwhile, the data acquirer may have no meaning to acquire the device data if device data output by the plurality of applications are incomplete. Therefore, when data of a plurality of applications is transmitted in one packet as described above, the communication control unit 524 may transmit device data output by two or more applications preset among a plurality of applications on condition that the device data output by the two or more applications has been stored in the storage unit 523 until amounts of buffering corresponding to each of the two or more applications has been reached.

For example, when the data acquirer requires both device data output by the sensor for detecting movement of the vending machine and device data including an image output by a monitoring camera for photographing the surroundings of the vending machine, the communication control unit 524 transmits these two types of device data after these two types of the device data is stored until a prescribed amount of buffering has been reached. Thereby, because the communication terminal 2 can avoid independent transmission of low-value device data even if the device data is independently transmitted, the resource occupancy rate can be effectively reduced.

Also, a timing at which device data is required may differ according to the data acquirer. For example, although it is preferable that device data be transmitted as quickly as possible for a data acquirer monitoring device data in real time, it is only necessary to transmit device data once a day for a data acquirer that refers to device data only once a day.

Therefore, the storage unit 523 stores a data acquirer ID, an application ID, and an amount of buffering in association and the communication control unit 524 may determine the amount of buffering on the basis of an application transmitting the device data and a transmission destination of the device data. The communication control unit 524 transmits stored device data, after the device data is stored in the storage unit 523 until the amount of buffering corresponding to a data acquirer who is a transmission destination of the device data has been reached on the basis of a relationship between the data acquirer ID and the amount of buffering stored in the storage unit 523. Thereby, the communication terminal 2 can effectively reduce the resource occupancy rate while satisfying the data acquirer's requirement.

When a plurality of data acquirers acquire device data output by one application of one communication device 1, the communication control unit 524 may determine the amount of buffering on the basis of an earliest timing among data acquisition timings desired by the plurality of data acquirers. Thereby, the communication control unit 524 can transmit the device data at a timing satisfied by all of the plurality of data acquirers.

Meanwhile, a case in which the necessity for reducing the resource occupancy rate varies with a degree of congestion in the communication network N1 is conceivable. It is preferable that the communication terminal 2 transmit device data as quickly as possible without reducing the resource occupancy rate during a time period when the communication network N1 is not congested. Therefore, for example, the communication terminal 2 acquires a statistical value of a congestion situation during each time period from the data management device 3 and stores the acquired statistical value in the storage unit 523. Then, the communication control unit 524 may transmit stored device data after the device data is stored in the storage unit 523 until an amount of buffering corresponding to a time period when device data has been received has been reached on the basis of a relationship between the time period and the amount of buffering stored in the storage unit 523. Thereby, the communication terminal 2 can prioritize reduction of the resource occupancy rate during a time period when there is a high possibility that the communication network N1 will be congested and prioritize quick transmission of device data during a time period when there is a low possibility that the communication network N1 will be congested.

[Configuration of Data Management Device 3]

Figure 27:
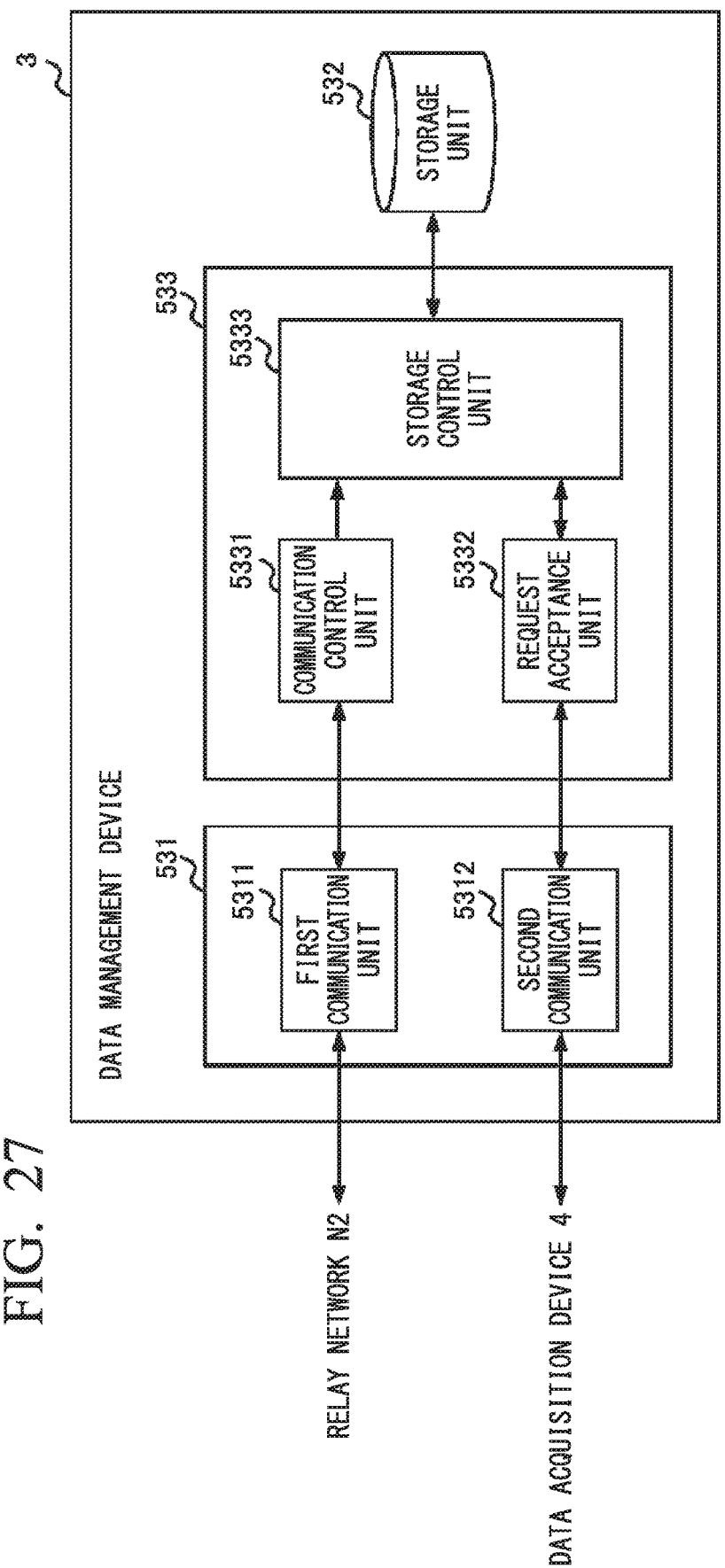
FIG. 27 is a diagram showing a configuration of a data management device according to the sixth embodiment.

FIG. 27 is a diagram showing a configuration of the data management device 3 according to the sixth embodiment. The data management device 3 includes a communication unit 531, a storage unit 532, and a control unit 533.

The communication unit 531 includes a first communication unit S311 and a second communication unit 5312. The first communication unit 5311 is a communication interface for transmitting and receiving data to and from the communication terminal 2 via the communication network N1 and has, for example, a termination interface of a portable phone network. The first communication unit 5311 may have a LAN interface for connecting with a termination device of the portable phone network.

The second communication unit 5312 has a communication interface for exchanging data with the data acquisition device 4 via the relay network N2. The second communication unit 5312 is, for example, a LAN interface.

The storage unit 532 has storage media such as a ROM, a RAM, and a hard disk. The storage unit 532 stores a communication terminal in which a communication terminal ID is associated with a device ID of a communication device 1 with which each communication terminal 2 can directly communicate without involving the base station 5.

A diagram showing an example of the communication terminal DB according to the sixth embodiment is similar to FIG. 6 according to the first embodiment. In the communication terminal DB, an application ID that is identification information of an application executable by the communication device 1 with which the communication terminal 2 can communicate and an amount of transmission data that is transmitted by each application during one data transmission operation are stored in association with a communication terminal ID.

Also, the storage unit 532 stores the data transmitted by the plurality of communication devices 1 received from the communication terminal 2 in association with a device ID of the communication device 1. Furthermore, the storage unit 532 may store a data provision DB in which an acquirer ID of a data acquirer who accesses the data management device 3 via the data acquisition device 4 and a device ID and an application ID of a communication device 1 and an application registered as targets from which the data acquirer acquires the data are associated.

The control unit 533 is, for example, a CPU, and determines a timing at which each communication terminal 2 transmits data by executing a program stored in the storage unit 532.

The control unit 533 includes a communication control unit 5331, a request acceptance unit 5332, a storage control unit 5333, and a timing determination unit 5334.

The communication control unit 5331 controls transmission and reception of data to and from the communication terminal 2. The communication control unit 5331 starts the reception of data from the communication terminal 2 by notifying the communication terminal 2 capable of communicating with the communication device 1 that outputs data to be provided to the data acquisition device 4 of an APN that is an address of a gateway of the communication network N1. Also, the communication control unit 5331 functions as a transmission unit that transmits timing information indicating a timing determined by the timing determination unit 5334 to the communication terminal 2 via the first communication unit 5311.

The request acceptance unit 5332 accepts a request for selecting a communication device 1 and an application that are targets from which data is acquired from the data acquisition device 4. The request acceptance unit 532 transmits a list of communication devices 1 and applications that are targets from which data is collected by the data management device 3 to the data acquisition device 4 via the second communication unit 5312.

When the data acquirer selects the communication device 1 and the application from which data is desired to be acquired from the list of communication devices 1 and applications displayed via the data acquisition device 4, the data acquisition device 4 transmits a data acquisition request including information (e.g., a device ID and an application ID) for identifying the selected communication device 1 and the selected application and an acquirer ID to the data management device 3. When the data acquisition request is received from the data acquisition device 4, the request acceptance unit 5332 performs registration in the data provision DB within the storage unit 532 by notifying the storage control unit 5333 of the acquirer ID, the device ID and the application ID included in the data acquisition request.

When a request for acquiring data from the data acquisition device 4 has been accepted, the request acceptance unit 5332 refers to the data provision DB stored in the storage unit 532 and provides data transmitted by an application indicated in the request, received via the communication network N1, by transmitting the data to the data acquisition device 4. In the data provision DB, the acquirer ID corresponding to the data acquisition device 4 transmitting the data acquisition request and the device ID of the communication device that is a target from which data is provided to the data acquisition device 4 of the acquirer ID are associated. In the data provision DB, the application ID of the application that is a target from which data is provided to the data acquisition device 4 of the acquirer ID may be further associated.

The request acceptance unit 5332 may accept requests for selecting the same application to be executed by the same communication device 1 from a plurality of data acquisition devices 4. When the request acceptance unit 5332 has accepted the request for selecting the same application to be executed by the same communication device 1 from the plurality of data acquisition devices 4, the communication control unit 5331 provides the plurality of data acquisition devices 4 with data transmitted by the application indicated in the request among pieces of data received via the communication network N1.

The storage control unit 5333 writes data to the storage unit 532 or reads data stored in the storage unit 532 on the basis of instructions from the communication control unit 5331 and the request acceptance unit 5332. For example, the storage control unit 5333 causes the storage unit 532 to store the device data received from the communication terminal 2 by the communication control unit 5331 in association with the device ID and the application ID.

[Communication Sequence in Communication System S]

Figure 28:
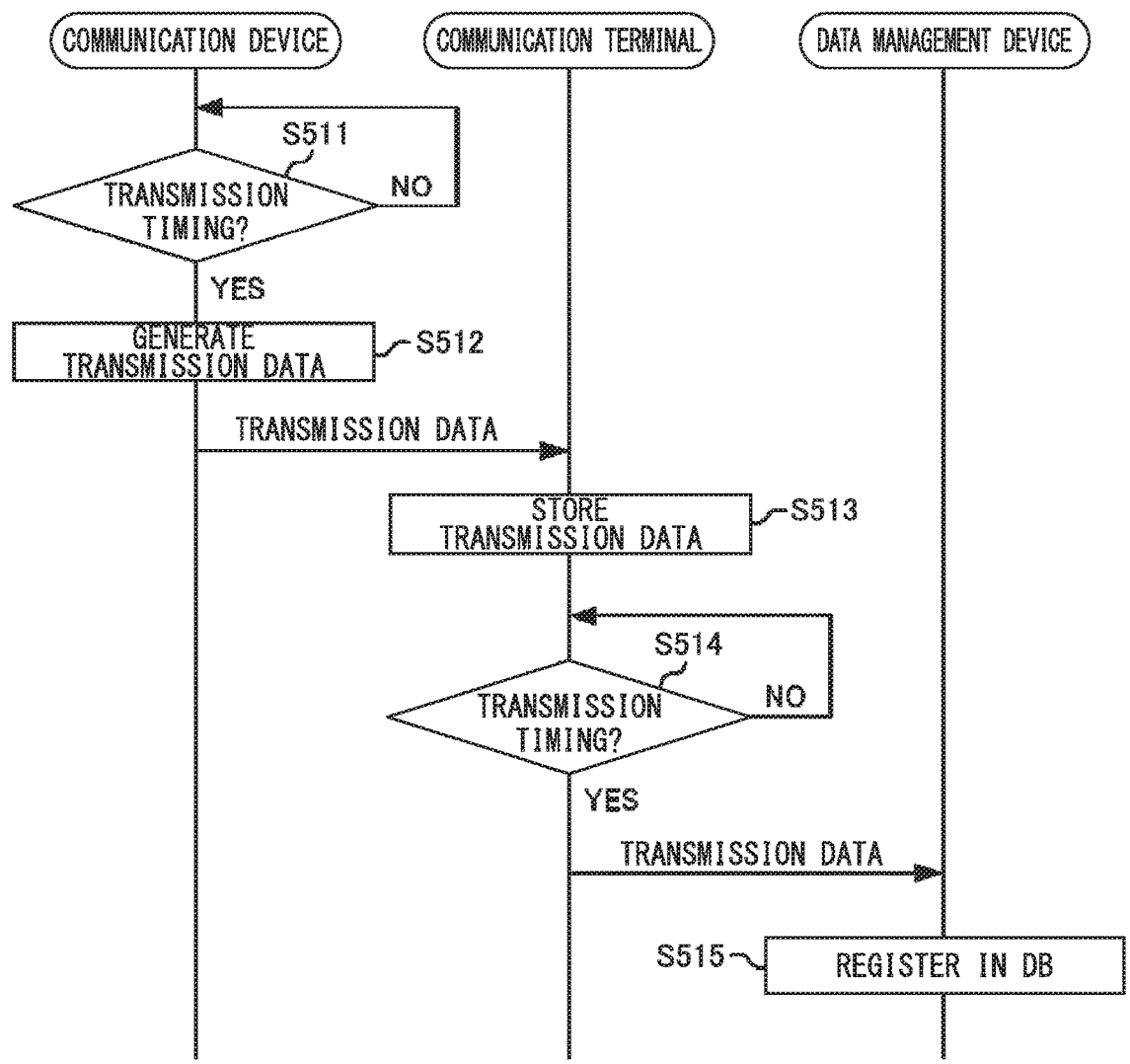
FIG. 28 is a diagram showing a communication sequence in the communication system of the sixth embodiment.

FIG. 28 is a diagram showing a communication sequence in the communication system S of the sixth embodiment.

First, when a timing at which the collected information is transmitted has been reached (YES in S511), the communication device 1 generates transmission data (S512) and transmits the transmission data to the communication terminal 2. When the transmission data is received, the communication terminal 2 stores the received transmission data in the storage unit 523 (S513).

Subsequently, the communication terminal 2 checks whether or not a timing for data transmission to the data management device 3 has been reached (S514). Details of the processing of step S514 will be described below. When the timing for data transmission has been reached (YES in S514), the communication terminal 2 transmits the stored data to the data management device 3. When the data is received, the communication control unit 5331 registers the received data in the data provision DB within the storage unit 532 in association with the communication terminal ID.

[Operation Flowchart of Communication Terminal 2]

Figure 29:
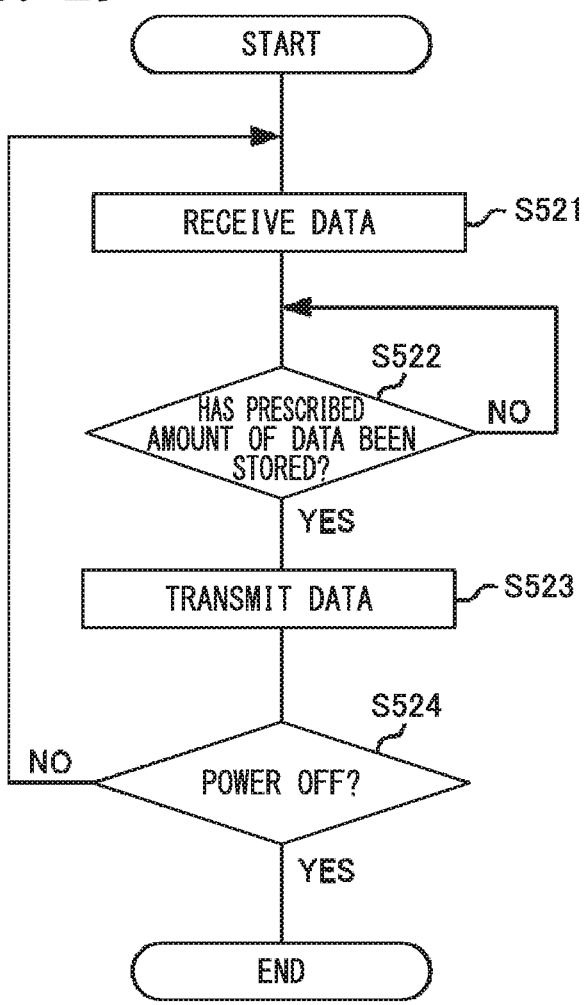
FIG. 29 is a flowchart of an operation in which a communication terminal processes device data according to the sixth embodiment.

FIG. 29 is a flowchart of an operation in which the communication terminal 2 processes device data according to the sixth embodiment. When the device data is received from the communication device 1 (S521), the communication control unit 524 causes the storage unit 523 to store the received device data until a prescribed amount (i.e., an amount of buffering) determined in any one of the above methods has been reached (S522).

When the communication control unit 524 determines that a prescribed amount of device data has been stored (YES in S522), the communication control unit 524 transmits the device data to the communication network N1 in one packet (S523). The communication control unit 524 iterates the operations of steps S521 to S523 until the operation of turning off the power supply of the communication terminal 2 is performed (NO in S524).

[Advantageous Effects of Communication Terminal 2]

In the conventional system, data indicating a detection result of a sensor at an indicated timing is transmitted. However, there is a problem in that a wireless communication circuit is congested when data is transmitted every time data to be transmitted is generated if a frequency at which data to be transmitted is generated is high. According to the sixth embodiment described above, it is possible to reduce the probability that the wireless communication circuit will be congested when a large amount of data output from a device such as a sensor is transmitted.

The communication terminal 2 according to the sixth embodiment stores the device data output by the communication device 1 and the communication control unit 524 transmits stored device data after the device data is stored in the storage unit 523 until a prescribed amount set in association with at least either the communication device 1 outputting device data or an attribute of the device data has been reached. Thereby, because the communication terminal 2 does not frequently transmit a small volume of data to the communication network N1, it is possible to reduce the resource occupancy rate of the wireless communication circuit and reduce a probability that the communication network N1 will be congested.

Seventh Embodiment

[Configuration of Communication System S]

A drawing showing a configuration of the communication system S according to the seventh embodiment is similar to FIG. 1 according to the first embodiment. The communication system S includes a plurality of communication devices 1, a communication terminal 2, a data management device 3, and a data acquisition device 4. The communication terminal 2 can transmit device data received from the plurality of communication devices 1 to the data management device 3 via a communication network N1 and a relay network N2.

A base station 5, the communication network N1, and the relay network N2 are as described in the first embodiment.

The communication device 1 is as described in the first embodiment.

The communication terminal 2 receives a plurality of pieces of device data from the plurality of communication devices 1. As will be described in detail below, the communication terminal 2 receives the received device data and transfers the device data to the data management device 3 by transmitting the received device data to the communication network N1 on condition that the received device data has changed by a prescribed amount or a prescribed proportion or more. The "change by the prescribed proportion or more" means that a ratio of an amount of change in a value of data to a value of data before the change is greater than or equal to a prescribed value.

As described in the first embodiment, the data management device 3 is, for example, a server managed by a communication carrier that provides a service using the communication network N1. The data management device 3 provides the device data received from the communication terminal 2 to the data acquisition device 4 via the communication network N1 and the relay network N2.

Specifically, the data management device 3 collects device data transmitted from the plurality of communication devices 1 via the communication terminal 2 and the communication network N1. The data management device 3 stores the received device data in a storage medium such as a hard disk, and transmits the device data itself or information generated on the basis of the device data to the data acquisition device 4 in response to a request from the data acquisition device 4 (4a, 4b, or 4c).

The data acquisition device 4 is as described in the first embodiment.

A flow of data in the communication system S according to the seventh embodiment is similar to FIG. 2 according to the first embodiment.

Meanwhile, when there are a large number of communication terminals 2 accommodated in one base station 5 and furthermore there are a large number of communication devices 1 connected to the communication terminal 2, device data output by a large number of communication devices 1 is transmitted to the communication network N1. Therefore, if each communication device 1 periodically outputs a small amount of device data, a probability that the communication network N1 will be congested may increase when the communication terminal 2 transmits the received device data to the communication network N1 every time device data is received from a large number of communication devices 1.

Therefore, the communication terminal 2 according to the present embodiment temporarily stores the device data received from a large number of communication devices 1, monitors the presence or absence of a change in the stored device data, and transmits the device data to the base station 5 in accordance with detection of the change. Thereby, because an amount of the device data to be transmitted is reduced, it is possible to prevent congestion from occurring in the communication network N1.

[Configuration of Communication Terminal 2]

Next, a configuration and an operation of the communication terminal 2 will be described.

Figure 30:
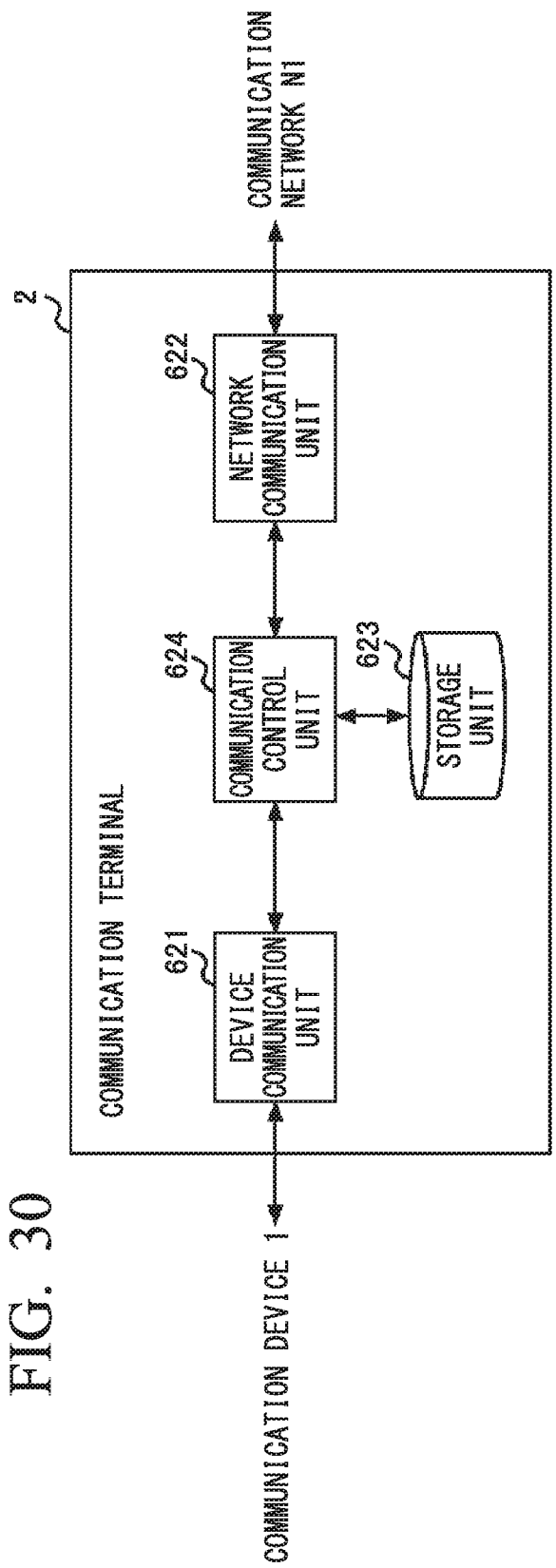
FIG. 30 is a diagram showing a configuration of a communication terminal according to a seventh embodiment.

FIG. 30 is a diagram showing the configuration of the communication terminal 2 according to the seventh embodiment. The communication terminal 2 includes a device communication unit 621, a network communication unit 622, a storage unit 623, and a communication control unit 624.

The device communication unit 621 is a wireless communication interface for receiving data transmitted by the communication device 1.

The network communication unit 622 is a wireless communication interface for transmitting the data received from the communication device 1 to the communication network N1. The network communication unit 622 can transmit and receive data to and from the base station 5 of the communication network N1 in accordance with, for example, an LTE standard.

The storage unit 623 has storage media such as a ROM, a RAM, and a hard disk. The storage unit 623 stores a program for communication to be executed by the communication control unit 624. Also, the storage unit 623 stores the device data received from the communication device 1 in association with a device ID of the communication device 1 and a date and time received from the communication device 1 on the basis of control of the communication control unit 624.

Also, the storage unit 623 stores a transmission determination threshold value for enabling the communication control unit 624 to determine that the device data received from the communication device 1 has changed. For example, the storage unit 623 stores the transmission determination threshold value in association with each of a plurality of communication devices 1. The storage unit 623 may store the transmission determination threshold value in association with each of a plurality of applications executable by the communication device 1. Thereby, the communication control unit 624 can control an appropriate amount of data transmission using the transmission determination threshold value suitable for a trend in the device data output by the communication device 1 or a trend in the device data output by the application.

The communication control unit 624 is, for example, a CPU, and causes the communication terminal 2 to operate by executing a communication program stored in the storage unit 623. The communication control unit 624 transmits, via the wireless communication circuit, latest device data received by the device communication unit 621 if a difference between latest device data and immediately previous device data, which is stored in the storage unit 623, associated with the same communication device 1 as that of the latest device data is greater than a prescribed transmission determination threshold value.

Figures 31, 32:
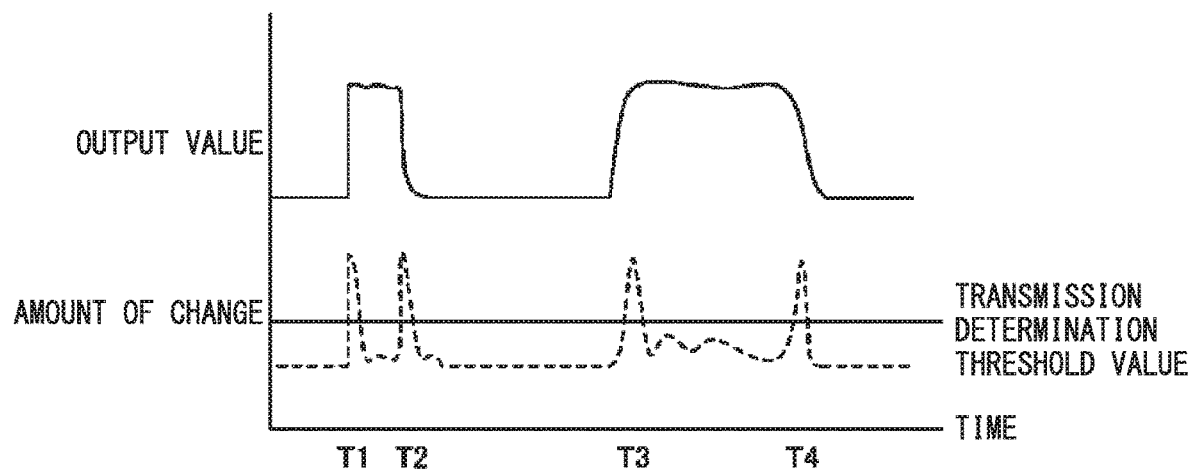
FIG. 31 is a diagram showing an operation of a communication control unit according to the seventh embodiment.
FIG. 32 is a table showing an example of relationships between a transmission method, a transmission interval, the number of transmissions per unit time, and a radio resource occupancy rate according to the seventh embodiment.

FIG. 31 is a diagram showing an operation of the communication control unit 624 according to the seventh embodiment. A horizontal axis of FIG. 31 represents time. A solid line represents a state in which a value of device data changes. The value of the device data is, for example, an output value of the sensor of the communication device 1. A broken line represents a state in which an amount of change in the device data changes. The amount of change increases at a timing when a change in the value of the device data is large and at a timing when a change in the value of the device data is small.

In the example shown in FIG. 31, the communication control unit 624 transmits data at four timings when the amount of change has exceeded the transmission determination threshold value. The communication control unit 624 pairs a value before the output value of the device data changes with a value after the output value changes at the timing when the amount of change has exceeded the transmission determination threshold value to form a single packet and transmits the single packet to the communication network N1 in association with a clock time at which the amount of change has exceeded the transmission determination threshold value.

For example, the communication control unit 624 transmits data of (T1, 0, 1) at clock time T1 of FIG. 31 and transmits data of (T2, 1, 0) at clock time T2. Also, the communication control unit 624 transmits data of (T3, 0, 1) at clock time T3 and transmits data of (T4, 1, 0) at clock time T4. Thereby, the communication control unit 624 can reduce an amount of data transmission as compared with a case in which data such as, for example, 00001111000000000111111111000, is transmitted by sampling the device data received from the communication device 1 at prescribed intervals.

The communication control unit 624 may wait for a prescribed time from the timing at which the output value of the device data has changed and transmit data indicating a change in an output value at a plurality of timings in a single packet when there is a new change in the output value during waiting. For example, when a time between clock time T1 and clock time T2 in FIG. 31 is within a prescribed time, the communication control unit 624 transmits data of (T1, 0, 1, T2, 1, 0). Thereby, the communication control unit 624 can further reduce the amount of data transmission.

When latest device data having a difference greater than the transmission determination threshold value is transmitted, the communication control unit 624 may transmit data having a difference less than or equal to the transmission determination threshold value stored in the storage unit 623 before the device data is transmitted. For example, in the example shown in FIG. 31, the communication control unit 624 transmits the device data of a period from clock time T2 to clock time T3 at clock time T3. Thereby, it is possible to transmit a large amount of device data while reducing a data transmission frequency compared to a case in which data is transmitted every time device data is generated. When the data transmission frequency is lowered, the communication control unit 624 can reduce a resource occupancy rate because a proportion of an overhead such as a transmission destination address and a transmission source address included in a packet to be transmitted is relatively small.

Meanwhile, a degree of congestion in the wireless communication circuit varies with a time period, a day of the week, a date, or the like. During a time period when the radio communication circuit is not congested, it may be preferable to transmit device data as much as possible in place of reducing an amount of data transmission. Therefore, the communication control unit 624 may determine the transmission determination threshold value on the basis of at least one of a time period, a day of the week, or a date. Also, the communication control unit 624 may acquire a degree of congestion in the wireless communication circuit or a degree of congestion in the base station 5 from the data management device 3 or the base station 5 and determine the transmission determination threshold value on the basis of the acquired degree of congestion. Thereby, it is possible to transmit device data as much as possible while preventing the wireless communication circuit from being congested.

The communication control unit 624 may determine the transmission determination threshold value on the basis of statistical values of the plurality of pieces of device data stored in the storage unit 623 in association with the same communication device 1. For example, the communication control unit 624 causes the storage unit 623 to store the device data received from the communication device 1 during a prescribed period and calculates a statistical value such as an average value or a median value of the device data within the prescribed period. Then, the communication control unit 624 sets a value in which the statistical value is not included as the transmission determination threshold value.

For example, when the statistical value is greater than or equal to 0 and less than 0.4 and is greater than or equal to 0.6 and less than or equal to 1.0, the communication control unit 624 sets the transmission determination threshold value to 0.5 that is a value greater than or equal to 0.4 and less than 0.6. In this manner, the communication control unit 624 can determine an appropriate transmission determination threshold value without being affected by noise included in device data by determining the transmission determination threshold value using the statistic value of the device data.

The communication control unit 624 may determine the transmission determination threshold value on the basis of a state of the communication device 1 indicated by the device data. The communication control unit 624 acquires information indicating the state of the communication device 1 via the device communication unit 621 and increases a frequency at which device data is transmitted by decreasing the transmission determination threshold value if the state of the communication device 1 is a state in which the data acquirer is required to check device data with high accuracy.

For example, when the communication control unit 624 has received device data indicating that the communication device 1 installed in a vending machine assumed not to be moved has been moved, a manager of the vending machine can ascertain small movement of the communication device 1 by reducing the transmission determination threshold value. Thereafter, the communication control unit 624 may increase the transmission determination threshold value when it is determined that the state of the communication device 1 has changed and the communication device 1 has not moved for a prescribed time.

The communication control unit 624 may acquire the transmission determination threshold value transmitted from the data management device 3 that manages the device data via the wireless communication circuit of the communication network N1 and the network communication unit 622. For example, the communication control unit 624 may acquire a transmission determination threshold value set by the data acquirer or a transmission determination threshold value determined by the data management device 3 on the basis of a degree of congestion in the wireless communication circuit provided by the base station 5 to the communication terminal 2 from the data management device 3 and use the acquired transmission determination threshold value. In this manner, the communication control unit 624 can use the transmission determination threshold value suitable for accuracy of data required by the data acquirer or a degree of congestion in the wireless communication circuit.

Also, the communication control unit 624 may receive a specified frequency at which the device data is transmitted via the wireless communication circuit and determine the transmission determination threshold value on the basis of the specified frequency. For example, the communication control unit 624 receives a specified allowable transmission frequency determined by the base station 5 on the basis of the degree of congestion in the wireless communication circuit. The communication control unit 624 decreases the transmission determination threshold value as the allowable transmission frequency increases and increases the transmission determination threshold value as the allowable transmission frequency decreases. Thereby, the communication control unit 624 can transmit data at a frequency suitable for the situation of the wireless communication circuit.

The communication control unit 624 may determine the transmission determination threshold value by machine learning. For example, the communication control unit 624 causes the storage unit 623 to store the device data group during a prescribed period and transmits the device data group to the data management device 3. Then, the communication control unit 624 acquires the transmission determination threshold value suitable for the device data group set by the administrator of the data management device 3 and causes the storage unit 623 to store the acquired transmission determination threshold value in association with the device data group. The communication control unit 624 associates a large number of device data groups with transmission determination threshold values by performing similar processing on various device data groups.

Thereafter, when the device data group is received during a prescribed period, the communication control unit 624 selects a transmission determination threshold value corresponding to the received device data group with reference to the storage unit 623. Thereby, the communication control unit 624 can determine the transmission determination threshold value suitable for a change pattern of the device data.

FIG. 32 is a table showing an example of relationships between a transmission method, a transmission interval, the number of transmissions per unit time, and a radio resource occupancy rate according to the seventh embodiment. The normal transmission method is a method in which the communication terminal 2 transmits all device data received from the communication device 1 without using the transmission determination threshold value. The transmission method during a change is a method of transmitting device data at a timing at which the communication terminal 2 has detected a change in the device data.

In the example shown in FIG. 32, it can be seen that the communication terminal 2 transmits device data at a timing when the change in the device data has been detected, so that the transmission interval increases and the number of transmissions per unit time significantly decreases. Then, it can be seen that the radio resource occupancy rate due to transmission of the device data also decreases greatly.

[Configuration of Data Management Device 3]

Figure 33:
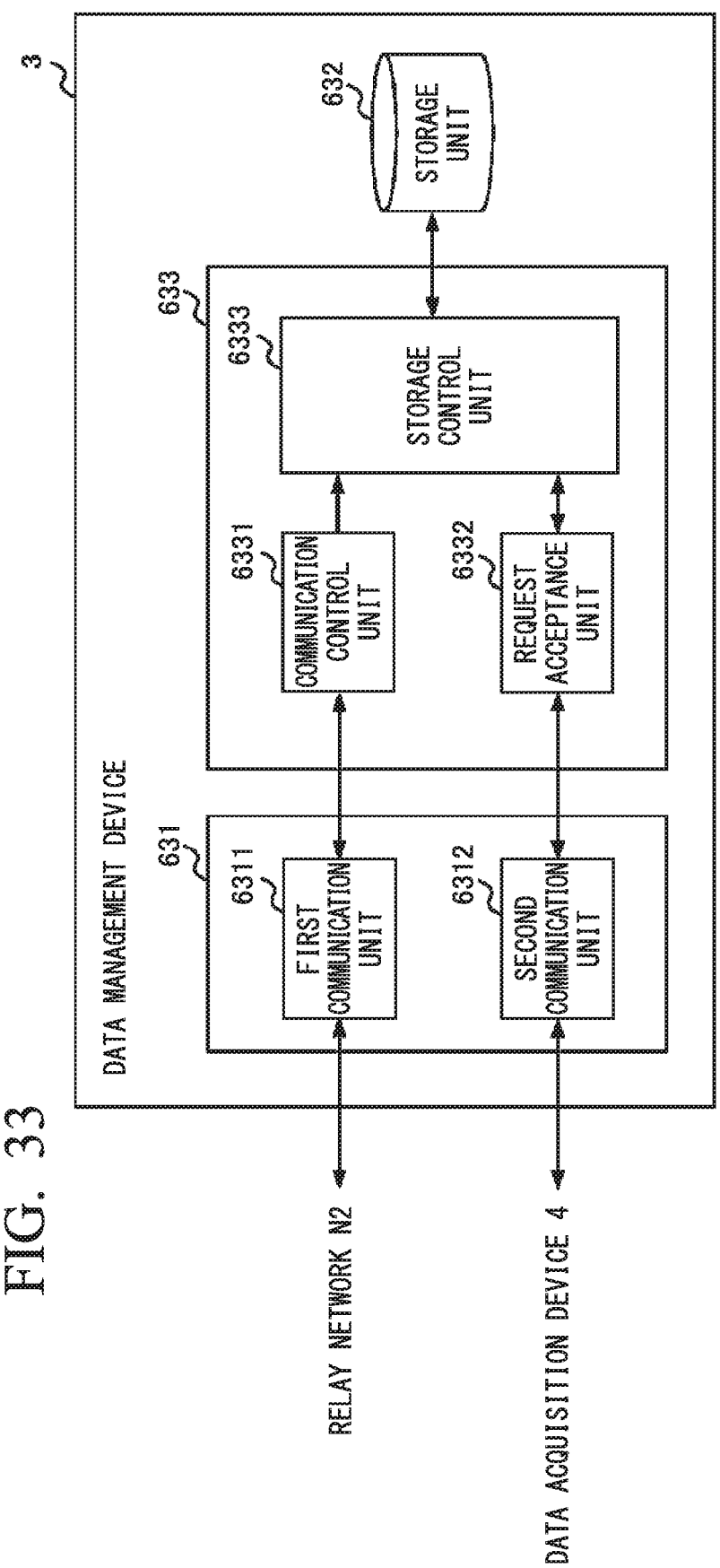
FIG. 33 is a diagram showing a configuration of a data management device according to the seventh embodiment.

FIG. 33 is a diagram showing a configuration of the data management device 3 according to the seventh embodiment. The data management device 3 includes a communication unit 631, a storage unit 632, and a control unit 633.

The communication unit 631 includes a first communication unit 6311 and a second communication unit 6312. The first communication unit 6311 is a communication interface for transmitting and receiving data to and from the communication terminal 2 via the communication network N1 and has, for example, a termination interface of a portable phone network. The first communication unit 6311 may have a LAN interface for connecting with a termination device of the portable phone network.

The second communication unit 6312 has a communication interface for exchanging data with the data acquisition device 4 via the relay network N2. The second communication unit 6312 is, for example, a LAN interface.

The storage unit 632 includes storage media such as a ROM, a RAM, and a hard disk. The storage unit 632 stores a communication terminal DB in which a communication terminal ID and a device ID that is identification information of the communication device 1 with which each communication terminal 2 can directly communicate without involving the base station 5 are associated.

A drawing showing an example of a communication terminal DB according to the seventh embodiment is similar to FIG. 6 according to the first embodiment. In the communication terminal DB, an application ID that is identification information of an application executable by the communication device 1 with which the communication terminal 2 can communicate and an amount of transmission data to be transmitted by each application during one data transmission operation are stored in association with the communication terminal ID.

Also, the storage unit 632 stores data transmitted by the plurality of communication devices 1 received from the communication terminal 2 in association with the device ID of the communication device 1. Furthermore, the storage unit 632 may store a data provision DB in which an acquirer ID of a data acquirer who accesses the data management device 3 via the data acquisition device 4 and a device ID and an application ID of the communication device 1 and the application registered as targets from which the data acquirer acquires the data are associated.

The control unit 633 is, for example, a CPU, and determines a timing at which each communication terminal 2 transmits data by executing a program stored in the storage unit 632.

The control unit 633 includes a communication control unit 6331, a request acceptance unit 6332, a storage control unit 6333, and a timing determination unit 6334.

The communication control unit 6331 controls transmission and reception of data to and from the communication terminal 2. The communication control unit 6331 starts the reception of data from the communication terminal 2 by notifying the communication terminal 2 capable of communicating with the communication device 1 that outputs data to be provided to the data acquisition device 4 of an APN that is an address of a gateway of the communication network N1. Also, the communication control unit 6331 functions as a transmission unit that transmits timing information indicating a timing determined by the timing determination unit 6334 to the communication terminal 2 via the first communication unit 6311.

The communication control unit 6331 may acquire, from the base station 5, a degree of congestion in the base station 5 that provides the wireless communication circuit used by the communication terminal 2 and determine the transmission determination threshold value used by the communication terminal 2 on the basis of the acquired degree of congestion. The communication control unit 6331 provides the determined transmission determination threshold value to the communication terminal 2.

The request acceptance unit 6332 accepts a request for selecting a communication device 1 and an application that are targets from which data is acquired from the data acquisition device 4. The request acceptance unit 6332 transmits a list of communication devices 1 and applications that are targets from which data is collected by the data management device 3 to the data acquisition device 4 via the second communication unit 6312.

When the data acquirer selects the communication device 1 and the application, from which data is desired to be acquired, from the list of communication devices 1 and applications displayed via the data acquisition device 4, the data acquisition device 4 transmits a data acquisition request including information (e.g., a device ID and an application ID) for identifying the selected communication device 1 and the selected application and an acquirer ID to the data management device 3. When the data acquisition request is received from the data acquisition device 4, the request acceptance unit 6332 performs registration in the data provision DB within the storage unit 632 by notifying the storage control unit 6333 of the acquirer ID, the device ID and the application ID included in the data acquisition request.

When a request for acquiring data from the data acquisition device 4 has been accepted, the request acceptance unit 6332 refers to the data provision DB stored in the storage unit 632 and provides data transmitted by an application indicated in the request, received via the communication network N1, by transmitting the data to the data acquisition device 4. In the data provision DB, the acquirer ID corresponding to the data acquisition device 4 transmitting the data acquisition request and the device ID of the communication device that is a target from which data is provided to the data acquisition device 4 of the acquirer ID are associated. In the data provision DB, the application ID of the application that is a target from which data is provided to the data acquisition device 4 of the acquirer ID may be further associated.

The request acceptance unit 6332 may accept requests for selecting the same application to be executed by the same communication device 1 from a plurality of data acquisition devices 4. When the request acceptance unit 6332 has accepted the request for selecting the same application to be executed by the same communication device 1 from the plurality of data acquisition devices 4, the communication control unit 6331 provides the plurality of data acquisition devices 4 with data transmitted by the application indicated in the request among pieces of data received via the communication network N1.

The storage control unit 6333 writes data to the storage unit 632 or reads data stored in the storage unit 632 on the basis of instructions from the communication control unit 6331 and the request acceptance unit 6332. For example, the storage control unit 6333 causes the storage unit 632 to store the device data received from the communication terminal 2 by the communication control unit 6331 in association with the device ID and the application ID.

[Operation Flowchart of Communication Terminal 2]

Figure 34:
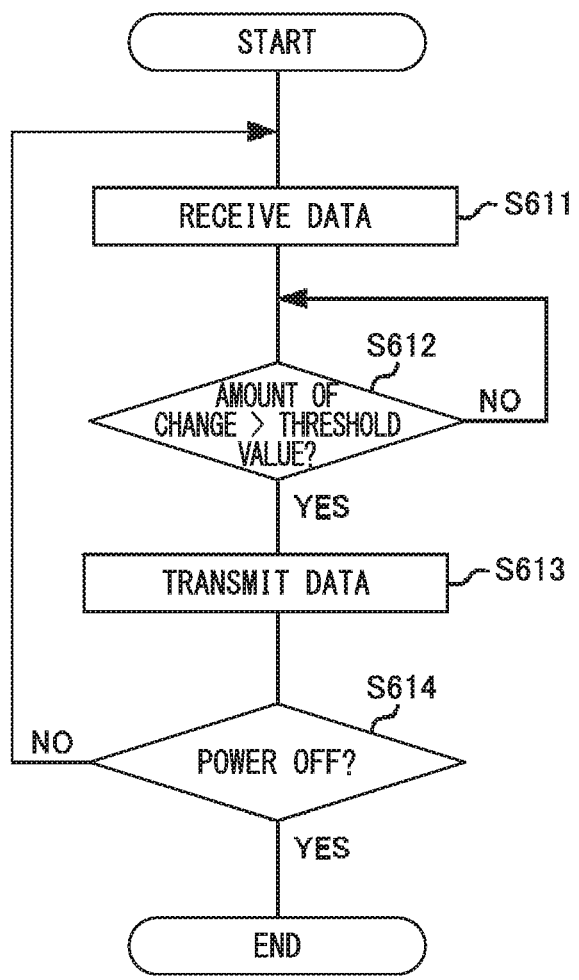
FIG. 34 is a flowchart of an operation in which a communication terminal 2 processes device data according to the seventh embodiment.

FIG. 34 is a flowchart of an operation in which the communication terminal 2 in the seventh embodiment processes device data. When device data is received from the communication device 1 (S611), the communication control unit 624 determines whether or not an amount of change in the device data is greater than the transmission determination threshold value (8612).

When it is determined that the amount of change in the device data is greater than the transmission determination threshold value (YES in S612), the communication control unit 624 transmits the device data to the communication network N1 (8613). The communication control unit 624 iterates the operations of steps S611 to S613 until the operation of turning off the power supply of the communication terminal 2 is performed (NO in 8614).

[Communication Sequence in Communication System S]

Figure 35:
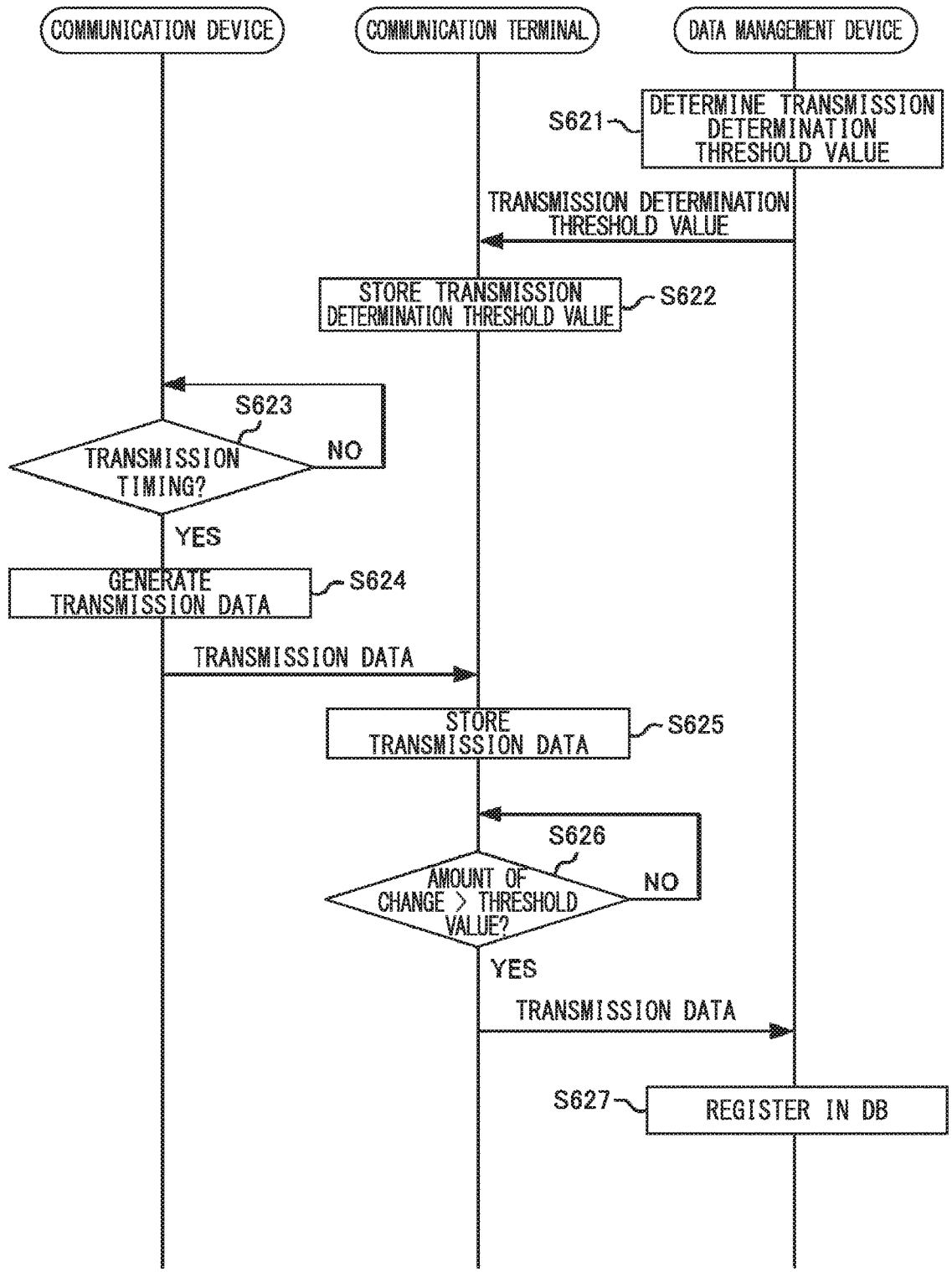
FIG. 35 is a diagram showing a communication sequence in a communication system S of the seventh embodiment.

FIG. 35 is a diagram showing a communication sequence in the communication system S of the seventh embodiment. FIG. 35 shows a communication sequence when the data management device 3 determines a transmission determination threshold value.

First, the data management device 3 determines a transmission determination threshold value used by the communication terminal 2 on the basis of, for example, the degree of congestion in the wireless communication circuit used by the communication terminal 2 acquired from the base station 5 (S621). The data management device 3 transmits the determined transmission determination threshold value to the communication terminal 2.

When the transmission determination threshold value transmitted by the data management device 3 is received, the communication terminal 2 causes the storage unit 623 to store the received transmission determination threshold value (S622).

Subsequently, when a timing at which the collected information is transmitted has been reached (YES in S623), the communication device 1 generates transmission data (S624) and transmits the transmission data to the communication terminal 2. When the transmission data is received, the communication terminal 2 stores the received transmission data in the storage unit 623 (S625).

Subsequently, the communication terminal 2 checks whether or not a timing at which the data is transmitted to the data management device 3 has been reached (S626). When the timing at which the data is transmitted has been reached (YES in S626), the communication terminal 2 transmits the stored data to the data management device 3. When the data is received, the communication control unit 6331 registers the received data in the data provision DB within the storage unit 632 in association with the communication terminal ID (S627).

[Advantageous Effects of Communication Terminal 2]

In the conventional system, all data output by the sensor is transmitted. Therefore, when the number of sensors transmitting data using the same wireless communication circuit increases, there is a problem in that the wireless communication circuit is likely to be congested. According to the seventh embodiment described above, it is possible to make the congestion in the wireless communication circuit less likely to occur.

The communication terminal 2 according to the seventh embodiment transmits, via the wireless communication circuit, latest device data received by the device communication unit 621 if a difference between the latest device data and immediately previous device data, which is stored in the storage unit 623, associated with the same communication device 1 as that of the latest device data is greater than a prescribed transmission determination threshold value. Thereby, because the communication terminal 2 does not frequently transmit a small volume of data to the communication network N1, it is possible to reduce a resource occupancy rate of the wireless communication circuit and reduce the probability that the communication network N1 will be congested.

Although the first to seventh embodiments have been described above, the plurality of embodiments described above may be combined and applied to the communication system S. Thereby, it is possible to more effectively minimize congestion in the wireless communication circuit.

According to the above-described embodiment, the communication terminal 2 receives the device data output by the communication device 1. Also, the communication terminal 2 transmits received device data to the wireless communication circuit at a timing based on a state of at least one of the communication terminal 2, the wireless communication circuit, the communication device 1 and the device data or information indicating a timing of transmission of the device data received from the management device that externally manages the communication terminal 2. Thereby, it is possible to minimize congestion in the wireless communication circuit occurring in a case in which data processing is not performed at an appropriate timing.

Although the present invention has been described with reference to the embodiments, the technical scope of the present invention is not limited to the scope described in the above embodiments. It is obvious to a person skilled in the art that various modifications or improvements can be added to the above embodiments. In particular, specific embodiments of distribution and integration of devices are not limited to the configurations shown in the drawings. It is possible to configure all or some of devices by functionally or physically distributing or integrating the devices in any units in accordance with various additions or the like or in accordance with functional loads.

INDUSTRIAL APPLICABILITY

According to the present invention, it is possible to minimize congestion in a wireless communication circuit.

REFERENCE SIGNS LIST

1 Communication device
2 Communication terminal
3 Data management device
121 Device communication unit
122 Control unit
123 Network communication unit
124 Storage unit
131 Communication unit
1311 First communication unit
1312 Second communication unit
132 Storage unit
133 Control unit
1331 Communication control unit
1332 Request acceptance unit
1333 Storage control unit
1334 Timing determination unit
221 Device communication unit
222 Network communication unit
223 Sensor
224 Storage unit
225 Control unit
2251 Movement detection unit
2252 Communication control unit
231 Communication unit
2311 First communication unit
2312 Second communication unit
232 Storage unit
233 Control unit
2331 Communication control unit
2332 Congestion degree identification unit
2333 Timing determination unit
2334 Request acceptance unit
2335 Storage control unit
321 Device communication unit
322 Network communication unit
323 Storage unit
324 Terminal control unit
331 Communication unit
3311 First communication unit
3312 Second communication unit
332 Storage unit
333 Control unit
3331 Identification unit
3332 Communication control unit
3333 Request acceptance unit
3334 Storage control unit
421 Device communication unit
422 Network communication unit
423 Storage unit
424 Communication control unit
431 Communication unit
4311 First communication unit
4312 Second communication unit
432 Storage unit
433 Control unit
4331 Communication control unit
4332 Request acceptance unit
4333 Storage control unit
521 Device communication unit
522 Network communication unit
523 Storage unit
524 Communication control unit
531 Communication unit
5311 First communication unit
5312 Second communication unit
532 Storage unit
533 Control unit
5331 Communication control unit
5332 Request acceptance unit
5333 Storage control unit
621 Device communication unit
622 Network communication unit
623 Storage unit
624 Communication control unit
631 Communication unit
6311 First communication unit
6312 Second communication unit
632 Storage unit
633 Control unit
6331 Communication control unit
6332 Request acceptance unit
6333 Storage control unit

The invention claimed is:

1. A management device, comprising:
a memory that stores a program; and
a processor that executes the program,
wherein the processor is configured to
acquire a timing at which each of a plurality of communication terminals transmits, via the wireless communication circuit, a plurality of pieces of device data corresponding to a plurality of types output by a plurality of communication devices, the plurality of communication terminals being within a sector of a same base station that is configured to provide the wireless communication circuit; and
acquire a priority of device data scheduled to be transmitted by each of the plurality of communication terminals, and transmit timing information indicating the timing that is acquired to the each of the plurality of communication terminals during a time period when a ratio of device data having the priority higher than a prescribed priority is greater than a prescribed value.

2. The management device according to claim 1, wherein the processor is configured to acquire the timing on the basis of a number of the plurality of communication terminals within the sector of the same base station.

3. The management device according to claim 1, wherein the processor is configured to acquire the timing on the basis of a number of communication devices with which the plurality of communication terminals within the sector of the same base station.

4. The management device according to claim 2,
wherein the processor is configured to acquire the timing on the basis of a priority of an application outputting device data to be transmitted, via the wireless communication circuit, by the communication device with which the communication terminal communicates.

5. The management device according to claim 1,
wherein the processor is configured to acquire a scheduled transmission clock time at which each of the plurality of communication terminals is scheduled to transmit device data and acquire the timing on the basis of the scheduled transmission clock time.

6. The management device according to claim 1,
wherein the processor is configured to acquire a scheduled transmission clock time at which each of the plurality of communication terminals is scheduled to transmit device data and a scheduled amount of transmission that is an amount of device data scheduled to be transmitted, and acquire the timing on the basis of a relationship between an allowable amount of transmission corresponding to a time period including the scheduled transmission clock time and a total value of the scheduled amount of transmission corresponding to the same time period.

7. The management device according to claim 6,
wherein the processor is configured to transmit the timing information updated in accordance with a change in the scheduled amount of transmission corresponding to the same time period to at least one communication terminal among the plurality of communication terminals.

8. The management device according to claim 1,
wherein the processor is configured to transmit the timing information to the communication terminal during a prescribed time period on condition that a prescribed number (≥2) of communication terminals or more are scheduled to transmit device data during the prescribed time period.

9. The management device according to claim 1,
wherein the processor is configured to acquire a deadline in which the communication terminal transmits device data and acquire the timing so that the communication terminal is able to transmit device data before the acquired deadline.

10. The management device according to claim 1,
wherein the processor is configured to acquire the timing on the basis of an attribute of the communication terminal.

11. The management device according to claim 1,
wherein the processor further is configured to acquire the timing on the basis of the number of communication terminals using a relay network in which a plurality of base stations are accommodated.

12. The management device according to claim 1,
wherein the processor is configured to acquire timings, at which at least two communication terminals among the plurality of communication terminals transmit device data for requesting updating of firmware, as different timings.

13. A communication terminal among a plurality of communication terminals within a sector of a same base station that is configured to provide a wireless communication circuit, the communication terminal comprising:
a memory that stores a program; and
a processor that executes the program,
wherein the processor is configured to
receive a plurality of pieces of device data corresponding to a plurality of types output by a plurality of communication devices;
receive timing information indicating a timing at which the communication terminal transmits the plurality of pieces of device data, the timing being determined for each of the plurality of communication terminals, and the timing information being transmitted during a time period when a ratio of device data, which is scheduled to be transmitted, having a priority higher than a prescribed priority is greater than a prescribed value; and
transmit, via the wireless communication circuit, the received plurality of pieces of device data on the basis of the timing information.

14. The communication terminal according to claim 13,
wherein the processor is configured to
store the plurality of pieces of device data, and
transmit the stored plurality of pieces of device data on the basis of the timing information.

15. The communication terminal according to claim 13,
wherein the timing is determined on the basis of the number of the plurality of communication terminals within the sector of the same base station.

16. The communication terminal according to claim 13,
wherein the timing is determined on the basis of a number of communication devices with which the plurality of communication terminals within the sector of the same base station.

17. A method for a communication terminal among a plurality of communication terminals within a sector of a same base station that is configured to provide a wireless communication circuit, the method comprising:
receiving a plurality of pieces of device data corresponding to a plurality of types output by a plurality of communication devices;
receiving timing information indicating a timing at which the communication terminal transmits the plurality of pieces of device data, the timing being determined for each of the plurality of communication terminals, and the timing information being transmitted during a time period when a ratio of device data, which is scheduled to be transmitted, having a priority higher than a prescribed priority is greater than a prescribed value; and
transmitting, via the wireless communication circuit, the received plurality of pieces of device data on the basis of the timing information.

18. The method according to claim 17,
wherein the receiving the plurality of pieces of device data comprises storing the plurality of pieces of device data, and
the transmitting comprises transmitting the stored plurality of pieces of device data on the basis of the timing information.

19. The method according to claim 17,
wherein the timing is determined on the basis of the number of the plurality of communication terminals within the sector of the same base station.

* * * * *